US010659485B2

(12) United States Patent
Bharrat et al.

(10) Patent No.: US 10,659,485 B2
(45) Date of Patent: May 19, 2020

(54) COMMUNICATIONS METHODS AND APPARATUS FOR DYNAMIC DETECTION AND/OR MITIGATION OF ANOMALIES

(71) Applicant: Ribbon Communications Operating Company, Inc., Westford, MA (US)

(72) Inventors: Shaun Jaikarran Bharrat, Manalapan, NJ (US); Tie Ju Chen, Piscataway, NJ (US)

(73) Assignee: Ribbon Communications Operating Company, Inc., Westford, MA (US)

(*) Notice: Subject to any disclaimer, the term of this patent is extended or adjusted under 35 U.S.C. 154(b) by 89 days.

(21) Appl. No.: 16/057,114

(22) Filed: Aug. 7, 2018

(65) Prior Publication Data
US 2019/0173898 A1 Jun. 6, 2019

Related U.S. Application Data

(63) Continuation-in-part of application No. 15/834,960, filed on Dec. 7, 2017.
(Continued)

(51) Int. Cl.
*H04L 29/06* (2006.01)
*H04L 12/24* (2006.01)
*H04L 12/26* (2006.01)

(52) U.S. Cl.
CPC ...... *H04L 63/1425* (2013.01); *H04L 41/0631* (2013.01); *H04L 43/062* (2013.01); *H04L 43/0876* (2013.01); *H04L 63/1441* (2013.01)

(58) Field of Classification Search
CPC ............. H04L 63/1425; H04L 41/0631; H04L 43/062; H04L 43/0876
(Continued)

(56) References Cited

U.S. PATENT DOCUMENTS 6,971,028 B1 11/2005 Lyle et al.
2003/0076936 A1 4/2003 Locke et al.
(Continued)

FOREIGN PATENT DOCUMENTS

CA 2301147 C 2/1999
WO 2012069094 A1 5/2012

OTHER PUBLICATIONS

Notification of Transmittal of the International Search Report and the Written Opinion of the International Searching Authority, International Search Report and Written Opinion of the International Searching Authority from PCT/US19/41727 dated Oct. 3, 2019 1-8 pages.
(Continued)

*Primary Examiner* — Ahmad F. Matar
*Assistant Examiner* — Jirapon Intavong
(74) *Attorney, Agent, or Firm* — Straub & Straub; Stephen T. Straub; Michael P. Straub

(57) ABSTRACT

The present invention relates to communications methods and apparatus dynamically detecting and/or mitigating anomalies in communications systems/networks. An exemplary embodiment includes the steps of: processing a set of call detail records (CDRS), each CDR in said set of CDRs corresponding to an individual call and including multiple information fields providing information about the individual call to which the CDR corresponds, said processing including: generating from said CDRs, on a per CDR basis one or more Field GroupIDs using a hash function; generating for CDRs corresponding to a first Field GroupID a first set of key performance indicators (KPIs), said first set of (KPIs) including one or more KPIs corresponding to the first Field GroupID, said one or more KPIs including at least a first KPI; and determining that a first KPI violation has
(Continued)

occurred for the first Field GroupID when the first KPI exceeds a dynamic performance threshold.

20 Claims, 21 Drawing Sheets

Related U.S. Application Data

(60) Provisional application No. 62/703,848, filed on Jul. 26, 2018, provisional application No. 62/697,901, filed on Jul. 13, 2018, provisional application No. 62/595,311, filed on Dec. 6, 2017.

(58) Field of Classification Search
USPC .................................................... 379/210.02
See application file for complete search history.

(56) References Cited

U.S. PATENT DOCUMENTS

| | | |
|---|---|---|
| 2010/0091671 A1 | 4/2010 | Lidstrom et al. |
| 2012/0088471 A1 | 4/2012 | Kong et al. |
| 2013/0182578 A1 | 7/2013 | Eidelman et al. |
| 2014/0192965 A1 | 7/2014 | Almeida |
| 2015/0003600 A1 | 1/2015 | Bucko |
| 2017/0019291 A1 | 1/2017 | Tapia et al. |
| 2018/0324299 A1 | 11/2018 | Sail et al. |
| 2019/0174000 A1 | 6/2019 | Bharrat et al. |

OTHER PUBLICATIONS

Notification of Transmittal of the International Search Report and the Written Opinion of the International Searching Authority, International Search Report and Written Opinion of the International Searching Authority from PCT/US19/41725 dated Nov. 1, 2019 1-14 pages.

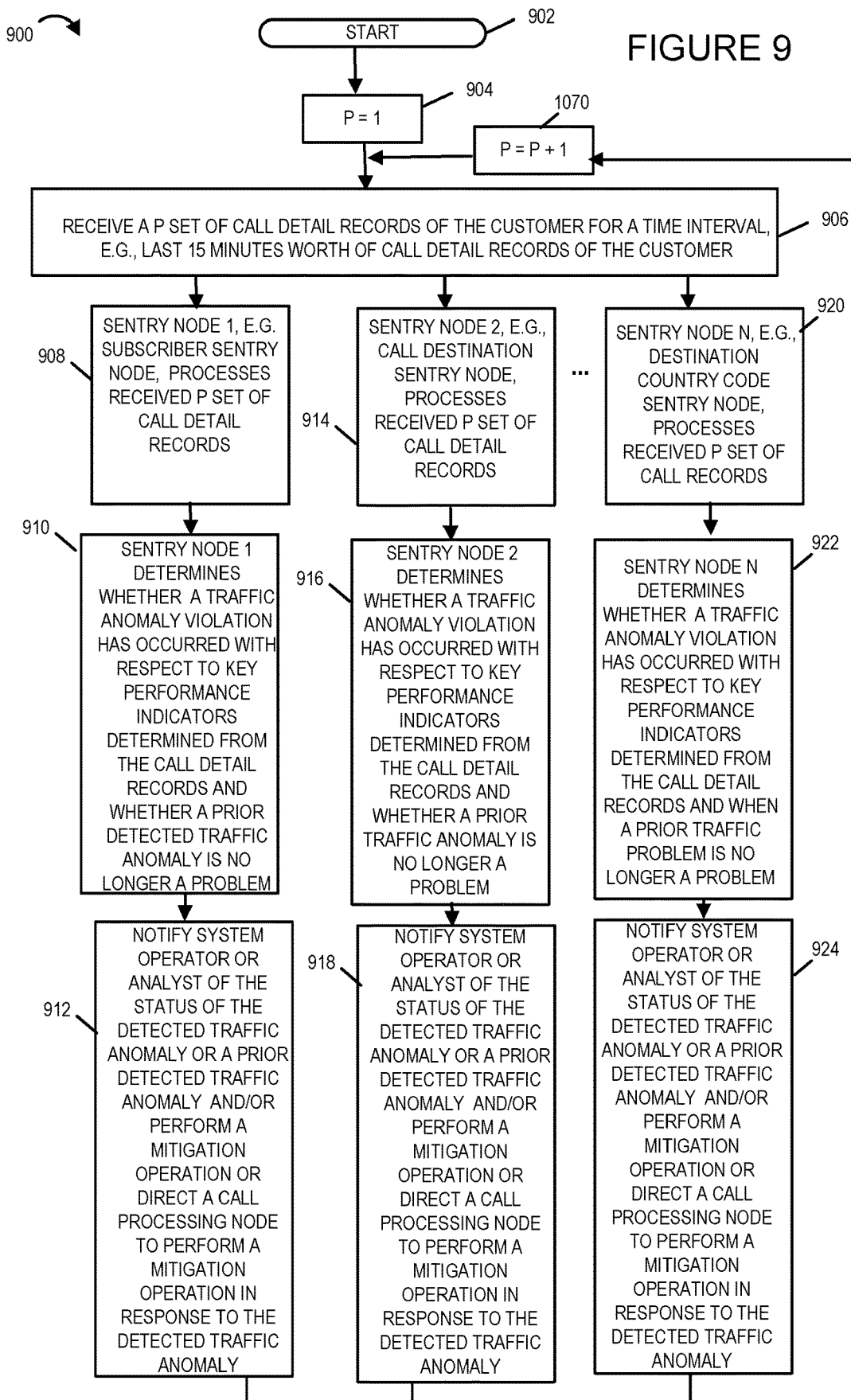

| FIGURE 10A |
| FIGURE 10B |
| FIGURE 10C |
| FIGURE 10D |

| RUN # | SUBSCRIBER GROUPID | BIDS | PREVIOUS BIDS EMA | BIDS EMA | PREVIOUS BIDS EMV | BIDS EMV | STOPS | PREVIOUS STOPS EMA | STOPS EMA | PREVIOUS STOPS EMV | STOPS EMV |
|---|---|---|---|---|---|---|---|---|---|---|---|
| 1 | 235599 | 7 | - | 7.00 | - | 0.00 | 6 | - | 6.00 | - | 0.00 |
| 2 | 235599 | 2 | 7.00 | 6.88 | 0.00 | 0.59 | 1 | 6.00 | 5.88 | 0.00 | 0.59 |
| 3 | 235599 | 6 | 6.88 | 6.86 | 0.59 | 0.59 | 3 | 5.88 | 5.81 | 0.59 | 0.77 |
| 4 | 235599 | 2 | 6.86 | 6.74 | 0.59 | 1.14 | 1 | 5.81 | 5.69 | 0.77 | 1.30 |
| 5 | 235599 | 1 | 6.74 | 6.60 | 1.14 | 1.90 | 1 | 5.69 | 5.58 | 1.30 | 1.79 |
| 6 | 235599 | 5 | 6.60 | 6.60 | 1.90 | 1.90 | 4 | 5.58 | 5.58 | 1.79 | 1.79 |
| 7 | 235599 | 2 | 6.60 | 6.56 | 1.90 | 1.91 | 2 | 5.58 | 5.54 | 1.79 | 1.81 |
| 8 | 235599 | 2 | 6.56 | 6.45 | 1.91 | 2.36 | 1 | 5.54 | 5.45 | 1.81 | 2.06 |
| 9 | 235599 | 7 | 6.45 | 6.34 | 2.36 | 2.77 | 7 | 5.45 | 5.37 | 2.06 | 2.29 |

FIGURE 12

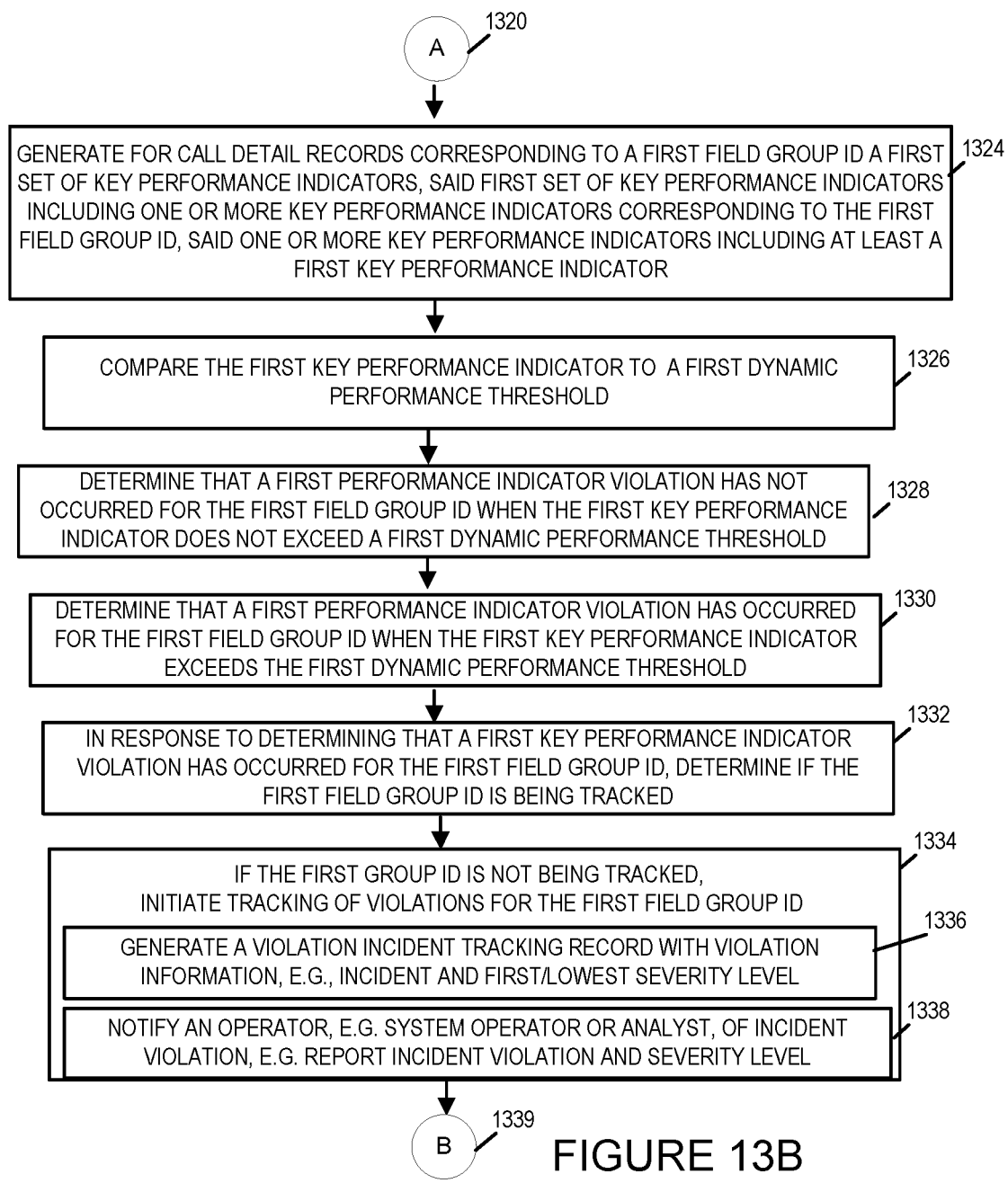

COMMUNICATIONS METHODS AND APPARATUS FOR DYNAMIC DETECTION AND/OR MITIGATION OF ANOMALIES

RELATED APPLICATIONS

The present application claims the benefit of the filing date of U.S. Provisional Patent Application Ser. No. 62/595,311 filed on Dec. 6, 2017 and U.S. Provisional Patent Application Ser. No. 62/703,848 filed on Jul. 26, 2018. The present application is also a continuation in part of U.S. patent application Ser. No. 15/834,960 filed on Dec. 7, 2017. Each of the proceeding patent applications are hereby expressly incorporated by reference in their entirety.

FIELD OF INVENTION

The present invention relates to communications methods and apparatus for processing calls and dynamically detecting and/or mitigating anomalies in communications systems/networks.

BACKGROUND

A telephony network typically handles a wide variety of traffic. A common problem in network management and security protection is detecting changes in network behavior from longer term trends. Complicating this problem is that the expected traffic patterns may vary widely by source, destination, subscriber, trunk groups, and various other possible classification groups. Modeling the entire network and checking traffic against a global model is problematic since it requires either numerous small changes or a very large change to affect the overall network traffic. On the other hand, building separate models for each instance of interesting groupings results in an explosion of model instances, often resulting in overfitting due to insufficient data. Another problem/complication with traffic anomaly detection is that the legitimate traffic continuously evolves. Consequently, static models which are not updated online often become obsolete over time and lose precision and/or recall.

From the foregoing it is apparent that there is a need for a technological solution to how to effectively, efficiently and in a cost-efficient manner monitor, detect and/or mitigate traffic anomalies in networks that solves one, some, or all of the aforementioned problems.

SUMMARY

The present invention relates to communications methods and apparatus for processing calls and for dynamically detecting and/or mitigating anomalies in communications systems/networks. Various embodiments of the present invention address and solve one or more of the technological problems discussed above.

An exemplary method embodiment of the present invention includes the steps of: processing a first set of call detail records of a customer, each call detail record in said first set of call detail records corresponding to an individual call and including multiple information fields providing information about the individual call to which the call detail record corresponds, said processing including: generating from some of said call detail records of the first set of call detail records, on a per call detail record basis one or more Field Group IDs using a hash function; generating for call detail records corresponding to a first Field Group ID a first set of key performance indicators, said first set of key performance indicators including one or more key performance indicators corresponding to the first Field Group ID, said one or more key performance indicators including at least a first key performance indicator; and determining that a first key performance indicator violation has occurred for the first Field Group ID when the first key performance indicator exceeds a first dynamic performance threshold.

In some embodiments, in response to determining that a first key performance indicator violation has occurred for the first Field Group ID, determining if the first Field Group ID is being tracked. In some of these embodiments, if the First Group ID is not being tracked, tracking of violations is initiated for the first Field Group ID while if the First Group ID is already being tracked then violation information for the first Field Group ID is updated as part of the tracking.

In some embodiments, the step of updating violation information includes modifying a severity incident level, checking if the modified severity incident level exceeds an action threshold and performing a violation mitigation operation when the modified severity level exceeds said action threshold. In some embodiments, performing a violation mitigation operation includes at least one of: i) notifying a system operator or analyst of the detected first key performance indicator violation; ii) completing future incoming calls corresponding to the first Field Group ID to a device corresponding to a called party number included in the incoming call with an indication that the incoming call corresponds to suspicious activity; iii) redirecting future incoming calls corresponding to the first Field Group ID to a validation service; iv) assigning future incoming calls corresponding to the first Field Group ID to a lower incoming call priority than an incoming call that doesn't correspond to the first Group ID when placing the incoming call in a call handling queue; v) delivering future incoming calls corresponding to the first Group ID to voice mail or vi) dropping or blocking future incoming calls corresponding to the first Group ID.

In some embodiments, the method further includes the step of updating the first dynamic performance threshold based on the first key performance indicator.

In some embodiments, the method further includes generating the first dynamic performance threshold, said generating the first dynamic performance threshold includes determining an exponentially weighted moving average (EMA) for the first key performance indicator corresponding to the first Field Group ID from said previous call detail records of said customer.

In some embodiments, the step of generating the first dynamic performance threshold further includes generating an exponentially weighted moving variance (EMV) for the first key performance indicator corresponding to the first Field Group ID from said previous call detail records of said customer.

The invention is also directed to systems and apparatus that are used to implement the various method embodiments of the invention. In some apparatus embodiments the traffic monitoring node or device, the call processing node or device, e.g., SBC, and each of the other apparatus/nodes/devices of the system include a processor and a memory, the memory including instructions when executed by the processor control the apparatus/node/device of the system to operate to perform the steps of various method embodiments of the invention.

For example, in an exemplary system embodiment, the system includes: a traffic monitoring node including: memory; and a processor that controls the traffic monitoring node to: process a first set of call detail records of a customer, each call detail record in said first set of call detail records corresponding to an individual call and including multiple information fields providing information about the individual call to which the call detail record corresponds, said processing including:

generating from some of said call detail records of the first set of call detail records, on a per call detail record basis, one or more Field Group IDs using a hash function; generating for call detail records corresponding to a first Field Group ID a first set of key performance indicators, said first set of key performance indicators including one or more key performance indicators corresponding to the first Field Group ID, said one or more key performance indicators including at least a first key performance indicator; and determining that a first key performance indicator violation has occurred for the first Field Group ID when the first key performance indicator exceeds a first dynamic performance threshold.

In some embodiments, the processing further includes: in response to determining that a first key performance indicator violation has occurred for the first Field Group ID, determining if the first Field Group ID is being tracking. In some of these embodiments, if the First Group ID is not being tracked, initiate tracking of violations for the first Field Group ID; and if the First Group ID is being tracked update violation information.

In some system embodiments, the updating violation information includes modifying a severity incident level; and checking if the modified severity incident level exceeds an action threshold; and said system further includes an enforcement node, said enforcement node including a second processor, said second processor configured to control the enforcement node to perform a violation mitigation operation when the modified severity level exceeds said action threshold.

In some system embodiments, the first dynamic performance threshold is a threshold which was generated from analysis of previous call detail records of said customer.

In some system embodiments, the traffic monitoring node processing further includes updating the first dynamic performance threshold based on the first key performance indicator.

In some system embodiments, the traffic monitoring node processing further includes generating the first dynamic performance threshold, said generating the first dynamic performance threshold includes determining an exponentially weighted moving average (EMA) for the first key performance indicator corresponding to the first Field Group ID from said previous call detail records of said customer.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 9 illustrates an exemplary high level flowchart of an exemplary method embodiment in accordance with the present invention.

FIG. 11 comprises FIGS. 11A, 11B and 11C.

FIG. 12 illustrates the computation of a model exponentially-weighted moving average and exponentially-weighted moving variance (EMA/EMV) of an exemplary key performance indicator which is a bid count in accordance with one embodiment of the present invention.

FIG. 13 illustrates the combination of FIG. 13A, FIG. 13B, FIG. 13C and FIG. 13D.

FIG. 13B illustrates the second part of a flowchart of a method in accordance with one embodiment of the present invention.

DETAILED DESCRIPTION

Figure 1:
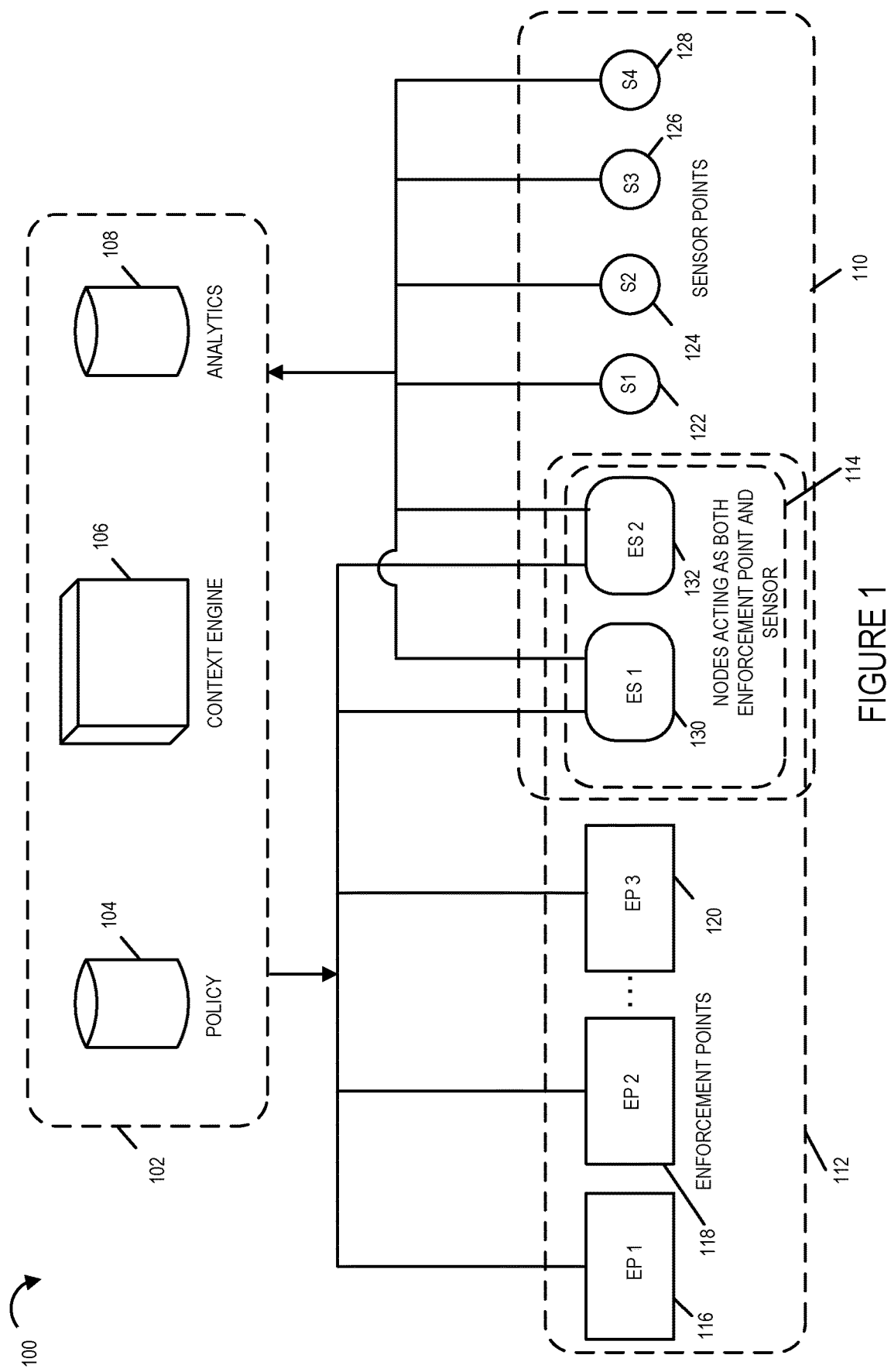
FIG. 1 illustrates an exemplary closed loop unified communications system for identifying and mitigating anomalies in accordance with an embodiment of the present invention.

Diagram 100 of FIG. 1 illustrates the key components of an exemplary dynamic system architecture for monitoring, detecting and/or mitigating traffic anomalies in a network in accordance with one embodiment of the present invention.

The system includes three main domains—the Context Domain 102, the Sensor Domain 110, and the Enforcement Domain 112. The Sensor Domain 110 is also referred to herein as the Sensor Points Domain 110 and the Enforcement Domain 112 is also referred to herein as the Enforcement Points Domain 112. Each of these three main domains includes at least one or more elements/devices of the system.

The Context Domain 102 is the decision making part of the architecture/system. In the exemplary system architecture 100, the Context Domain includes at least the following elements or components: a context engine 106, an analytics component 108, and a policy component 104. The Context Engine component 106 is an extensible engine that is responsible for digesting the feedback from the sensor points of the system and based on the feedback determining what actions to take. For example, the context engine 106 receives information from one or more sensors S1 122, S2 124, S3 126, S4 128, ES 1 node 130 and ES 2 node 132, analyzes the received sensor information and determines actions to be taken based on system policies and generates commands to send to the enforcement points/devices which implement the commands.

The analytics element or component 108 includes a database system including a processor and a storage device. In the database system is stored data/information received from the sensors of the system, e.g., from the sensor points of the sensor domain 110. The database system is in many, but not all, embodiments located in the cloud and is implemented using high-scale cloud database technology. The analytics element 108 may be, and in some embodiments is, implemented as a cloud database system as part of the same cloud platform including the context engine 106 and the policy element 108.

The policy element or component 104, similar to the analytics element 108, includes a database system including a processor and a storage device. Stored in the policy element 108 database system are user defined policies, essentially the instructions that tailor the decision process of the context engine 106. The stored polices being instructions or rules used by the context engine 106 to make decisions based on data/information received from sensors in the system and generate enforcement instructions which are communicated to and enforced at one or more enforcement points in the system.

The sensor domain or sensor points domain 110 include one or more sensor points, e.g., devices, in the network which collect data. The sensor points may be, and in some embodiments are, dedicated pieces of software such as a purpose built Session Initiation Protocol (SIP) proxy or Application Programming Interface (API) gateway, or the sensor points may be, and some are, embedded code within a larger platform or device such as for example a Session Border Controller (SBC). The sensor points of the sensor domain 110 offer and/or publish data towards the context domain 102 and the elements included in it.

The enforcement domain 112 includes one or more enforcement points EP 1 116, EP 2 118, . . . , EP 3 120 in the system network that alter the nature of the traffic in the system 100. The enforcement points include devices with existing enforcement functions such as, for example, firewalls, Session Border Controllers (SBCs), Software Defined Networking SDN switches (e.g., Open Flow switches), etc. These devices may already be deployed in an existing network and/or serve other functions in the network. Additionally, enforcement points may include dedicated devices and/or components inserted specifically as enforcement points to control the flow of traffic in the system 100.

In some embodiments, there are nodes, components or devices that are part of both the sensor domain 110 and the enforcement domain 112. These nodes, components and/or devices act as both an enforcement point and a sensor point. Region 114 of FIG. 1 illustrates components ES 1 130 and ES 2 132 which are nodes that perform as both an enforcement point and a sensor point.

Figure 2:
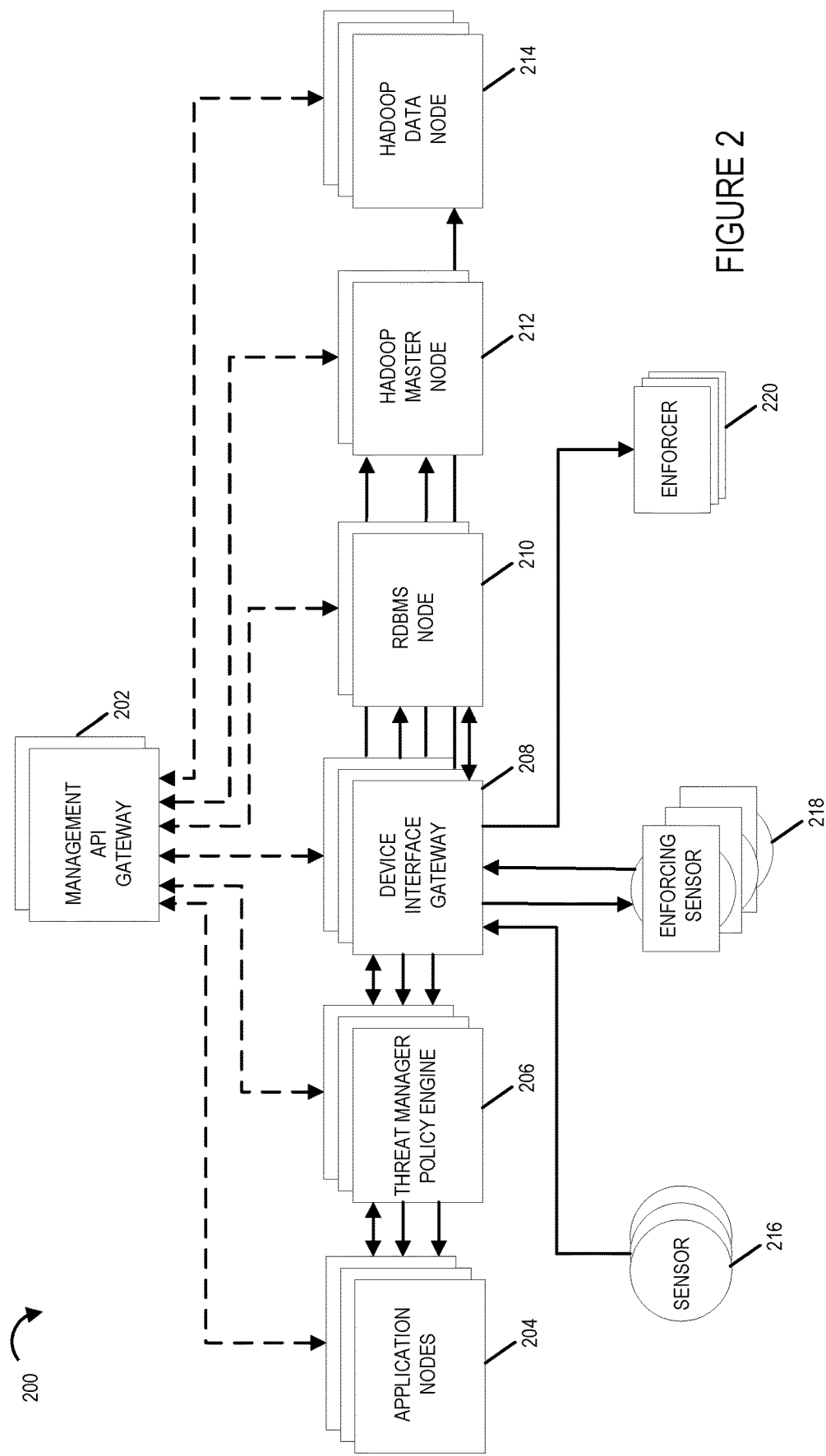
FIG. 2 illustrates details of the exemplary system illustrated in FIG. 1.

Diagram 200 of FIG. 2 illustrates internal or subcomponents of system 100. At the bottom of the system architecture are the sensors 216, enforcers 220 and equipment 218 that are both sensors and enforcers. The sensors 216 are deployed within the network and generate events of import. The enforcers 220 are network actors, e.g., devices that apply policy to control some behavior. Some equipment 218 within the network perform as both a sensor and an enforcement device. An example of such equipment includes a session border controller, e.g., SBC 404 of FIG. 4, which performs as a sensor to detect and report registration failures on a traffic flow and also performs as an enforcement device by applying an Access Control List (ACL) to block that flow.

The Device Interface Gateway (DIG) nodes 208 form the interface between the sensors 216 of the sensor domain 110 and enforcers 220 of the enforcement domain 112 in the network into the security platform. On the ingress side, the device interface gateway nodes 208 receive or collect the applicable data, parse the data, build parquet files, and write into the Hadoop Distributed File System (HDFS) cluster and relevant streaming interfaces. On the egress side, the device interface gateways (DIGs) accept configuration and status requests from the Management API Gateway (MAG) 202, enforcement requests from the Policy Engine and transform them into the appropriate device-specific commands which are communicated towards the devices.

The Hadoop Master node 212 and Hadoop Data nodes 214 together form a Hadoop cluster. This includes all the facilities for HDFS cluster storage, Hadoop map-reduce job execution, and Spark batch and streaming support. In some embodiments, standard Hadoop functionality is used in the system, so it easily supports deployments where the Hadoop cluster is provided as-a-service by the operator.

The Postgres nodes 210 supply a traditional relational DBMS service. Some applications may do batch processing of the data in the Hadoop cluster but store the data base to Postgres for certain query types. Additionally, system and application configuration will be saved in Postgres.

The Threat & Incident Manager (TIM) and the Policy Engine (PE) nodes 206 are system level components which manage threats and incidents. The Threat & Incident Manager serves as the central coordinator for incidents and tracks the overall life-cycle of incidents. It receives incidents and indications from all applications and nodes in the system, and makes decisions for the automated incident mitigations. For other incident types, it presents the incidents to the operator or analyst and accepts operator or analyst directives for actions on the incidents. The Policy Engine implements the policies, e.g., rules, of the system. This is based on directives and/or instructions from the Threat & Incident Manager coupled with the configuration and knowledge about enforcement points in the network. At a high level, the TIM deals in generic actions (such as for example, BLOCK_CALLING_NUMBER) and the PE implements this on the specific network (e.g., add calling-number block to master centralized policy server such as for example PSX 402 illustrated in FIG. 4).

The Application nodes 204 implement a variety of micro-applications (µApps) for the system. These applications are called µApps because they are not independent applications but rather live or are executed within the eco-system and rely on specialized services of the platform. These µApps could run the gamut. Exemplary µApps include µApps for chart trending, for TDoS (Telephony Denial of Service) detection, for Key Performance Indicator (KPI) monitoring, Traffic Analyzer for historical analysis, and for Robocall detection and mitigation. It is to be understood that the list of µApps is only exemplary and that various µApps may be, and in some embodiments are, included as separate licensable components for optional activation in various deployments.

The Management API gateway (MAG) 202 is the management interface to the platform. This provides a northbound REST API (Representational State Transfer Application Programming Interface) for configuring and managing the platform. MAG 202 determines whether to handle received requests directly or whether to proxy it to a particular node or node-type within the system. The MAG 202 also hosts the user interface (UI) for the system. The UI is in some embodiments implemented as a javascript program. Upon initial https connection to the MAG 202, the UI, e.g., UI javascript, is downloaded to the user's browser and executed.

Figure 3:
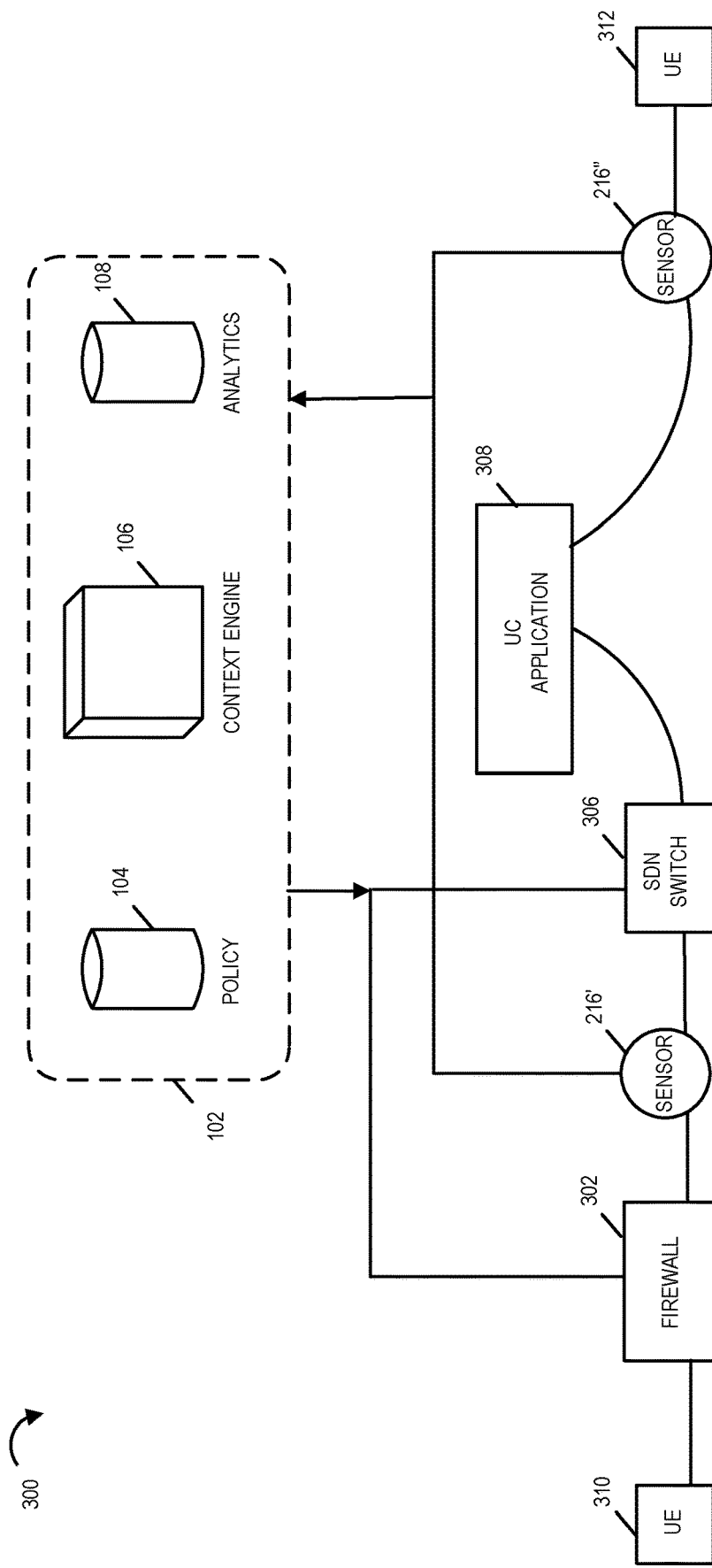
FIG. 3 illustrates an exemplary embodiment of the present invention in which a universal communications (UC) application use case is explained.

Diagram 300 of FIG. 3 illustrates an exemplary embodiment of the present invention in which a universal communications (UC) application use case is illustrated as applied to the above described system. In this example a user via a user equipment device 310 connects to a UC application 308 via a firewall 302 in an enterprise environment. The UC application 308 in turn connects to a UC user equipment device UE 312 within the enterprise itself. In order to understand the Session Initiation Protocol (SIP) flows, two sensors 216' and 216" have been included. Sensor 216' is located so as to sense information concerning UE 310 and sensor 216" is located so as to sense information concerning UE 312. The network is SDN based and the flow goes through an SDN switch 306. Although the network includes an SDN controller, for the sake of simplifying the diagram for clarity in explaining the invention, the SDN controller has not been shown. Both the firewall 302 and SDN switch 306 provide points of enforcement as each device is capable of performing one or more actions on the Internet Protocol (IP) flows passing through them, e.g., blocking the flow or limiting the flow.

As the UC flow starts the context engine 106 becomes aware of the flow via information/data communicated to the context engine 106 from the sensors 216' and 216". The context engine 106 in response to the information/data received from sensor 216' and/or sensor 216" communicates instructions to the firewall 302 to adjust its security settings (e.g., to ensure Real-time Transport Protocol (RTP) packets can flow). Furthermore, the context engine 106 communicates instructions to the SDN switch 306 to provide a specific level of Quality of Service (QoS) for the UC flow, or to do more complex actions such as for example, mirror or copy and forward the packets to another device for call analysis, tracing, lawful intercept, etc. Once the UC session is complete, the Context Engine 106 learns this from data/information communicated to it from sensor 216' and/or sensor 216". In response to learning of the completion of the UC session, the context engine 106 generates and communicates instructions to change/adjust the behavior of the firewall 302 and/or SDN switch 306 for example to adjust the rules implemented at the firewall 302 and SDN switch 306 such as for example shutting down the UC flows, closing pin holes, etc.

Figure 4:
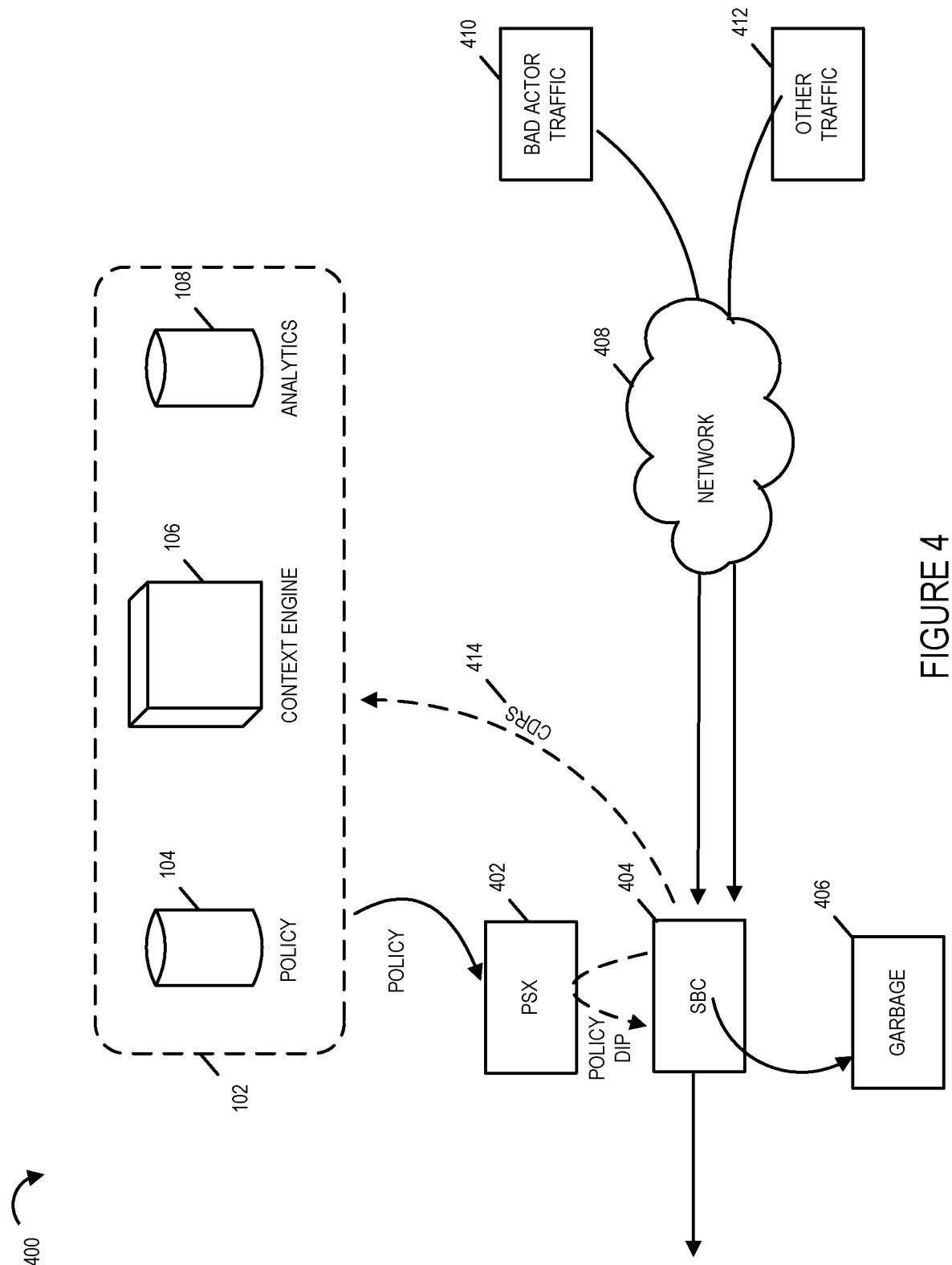
FIG. 4 illustrates another exemplary embodiment of the present invention in which a different universal communications (UC) application use case is explained.

Diagram 400 of FIG. 4 illustrates another use case. In the use case illustrated in diagram 400 the traffic stream potentially includes some bad actor traffic 410 that is received via network 408 at SBC 404 along with other traffic 412.

The type of bad actor traffic 410 includes cases such as for example robocalling traffic, exfiltration attempts traffic, Wangiri type fraud traffic, etc. Initially, the bad actor traffic 410 is normally processed by the SBC 404 since it is not known to be bad. The Call Detail Records (CDRs) 414 from the SBC 404 are sent as a matter of course to the Context Engine 106 where the CDRs 414 are processed resulting in the bad actor traffic 410 being detected through ongoing CDR 414 analysis. The Context Engine 106, based on the analytics and policy, then installs into the centralized policy server (PSX) 402 an updated policy for the call routing elements, e.g., SBC 104. From that point on, the bad actor traffic 410 is immediately directed to garbage container 406 instead of being allowed into the network while the other traffic 412 is allowed into the network.

The elements, components, nodes, data systems illustrated in FIGS. 1, 2, 3, and 4 are coupled together via communications links, e.g., bi-directional communications links. While various communications links are illustrated, other network configuration are possible and for the sake of simplicity not all of the communications links or network connections connecting the various nodes/devices have been shown.

Various kinds of monitoring and threat detection may be encompassed in different types on applications running within the contextual plane. As an example, a robo-caller application would monitor for call sources which have the characteristics of robo-calls (for example, very low Answer Seizure Rate (ASR), i.e., the ratio of successfully connected calls to attempted calls, high percentage of short calls, etc.) A traffic anomaly detector could identify bad traffic by building user profiles and then flagging traffic which falls outside the profile.

In some embodiments, one or more of the elements, nodes or components of the above mentioned systems are implemented within one or more virtual machines. The one or more virtual machines may be, and typically are, implemented on one or more compute nodes in the cloud, a compute node including a processor providing storage, networking, memory, and processing resources, e.g. one or more processors that can be consumed by virtual machine instances. In some embodiments, multiple nodes are implemented within a single virtual machine. In some embodiments, the virtual machine itself holds a container environment, with multiple containers spawned within the virtual machine to each implement a node function. In one mode of operation, the containers to be instantiated are determined at virtual machine instantiation and then stay static throughout the life of the virtual machine. In a second mode of operation, the containers instantiated within the virtual machines are completely dynamic. The virtual machine starts with some set such as for example an empty set of containers and then new containers are added and existing containers removed dynamically.

Figure 5:
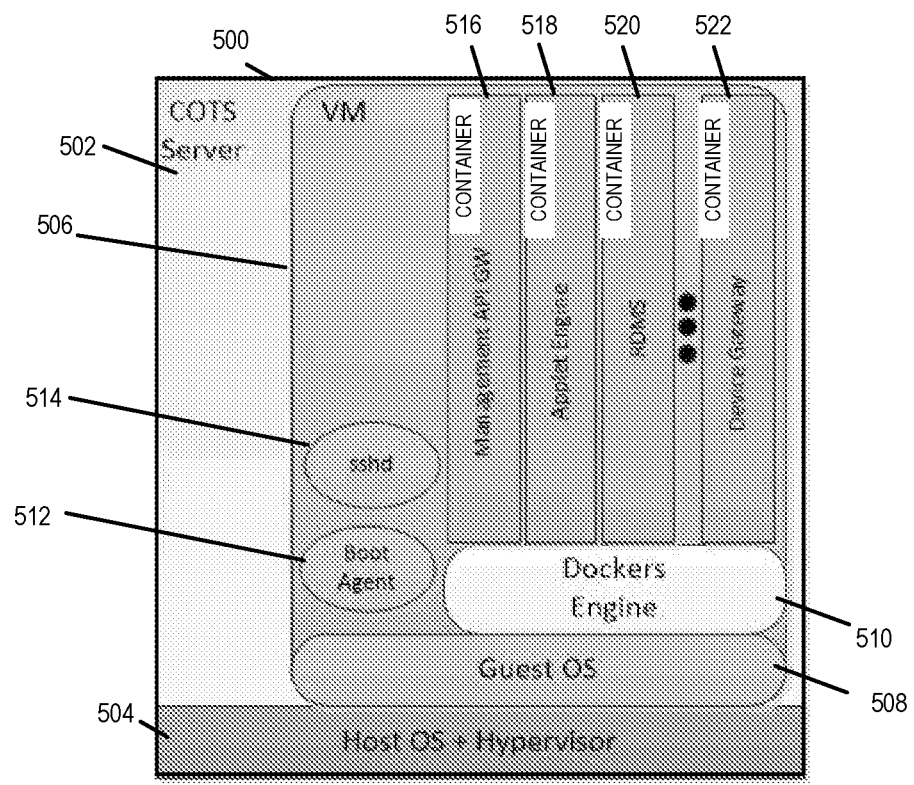
FIG. 5 illustrates an exemplary system in accordance with an embodiment of the present invention.

FIG. 5 illustrates an exemplary system 500 in accordance with an embodiment of the present invention. The exemplary system 500 includes commercial off the shelf server hardware 502 with host operating system and hypervisor software 504 that is used to virtualize the hardware resources, and a virtual machine 506. The hypervisor is software that is run on the host operating system and provides various virtualization services, such as for example I/O device support and memory management. The virtual machine 506 includes a guest operating system 508, a Dockers Engine 510, a boot agent 512, an OpenSSH server process (sshd) 514, and a plurality of exemplary containers, the plurality of exemplary containers including a Management API Gateway node container 516, an Applet Engine node container 518, RDMS node container 520, . . . , a Device Gateway node container 522.

The guest operating system (guest OS) 508 is the software installed on the virtual machine (VM) and is different than the host operating system. The dockers engine software 510 creates a server-side daemon process that hosts images, containers, networks and storage volumes. The dockers engine also provides a client-side command-line interface (CLI) that enables users to interact with the daemon through a Docker Engine API. The boot agent is software instructions that are executed during the boot up process. The sshd 514 is an OpenSSH server process that listens to incoming connections using the Secure Socket Shell (SSH) protocol and acts as the server for the protocol. It handles user authentication, encryption, terminal connections, file transfers, and tunneling.

In some system embodiments, containers are not used as shown in FIG. 5. In such systems, there is no Dockers Engine 510 and each node shown in FIG. 5 is instead implemented directly within a virtual machine. For example, the Management API Gateway node 516, an Applet Engine node 518, RDMS node 520, . . . , a Device Gateway node 522 are implemented on separate virtual machines with each node being mapped to a different virtual machine. In this way each node is implemented on a separate virtual machine.

Figure 6:
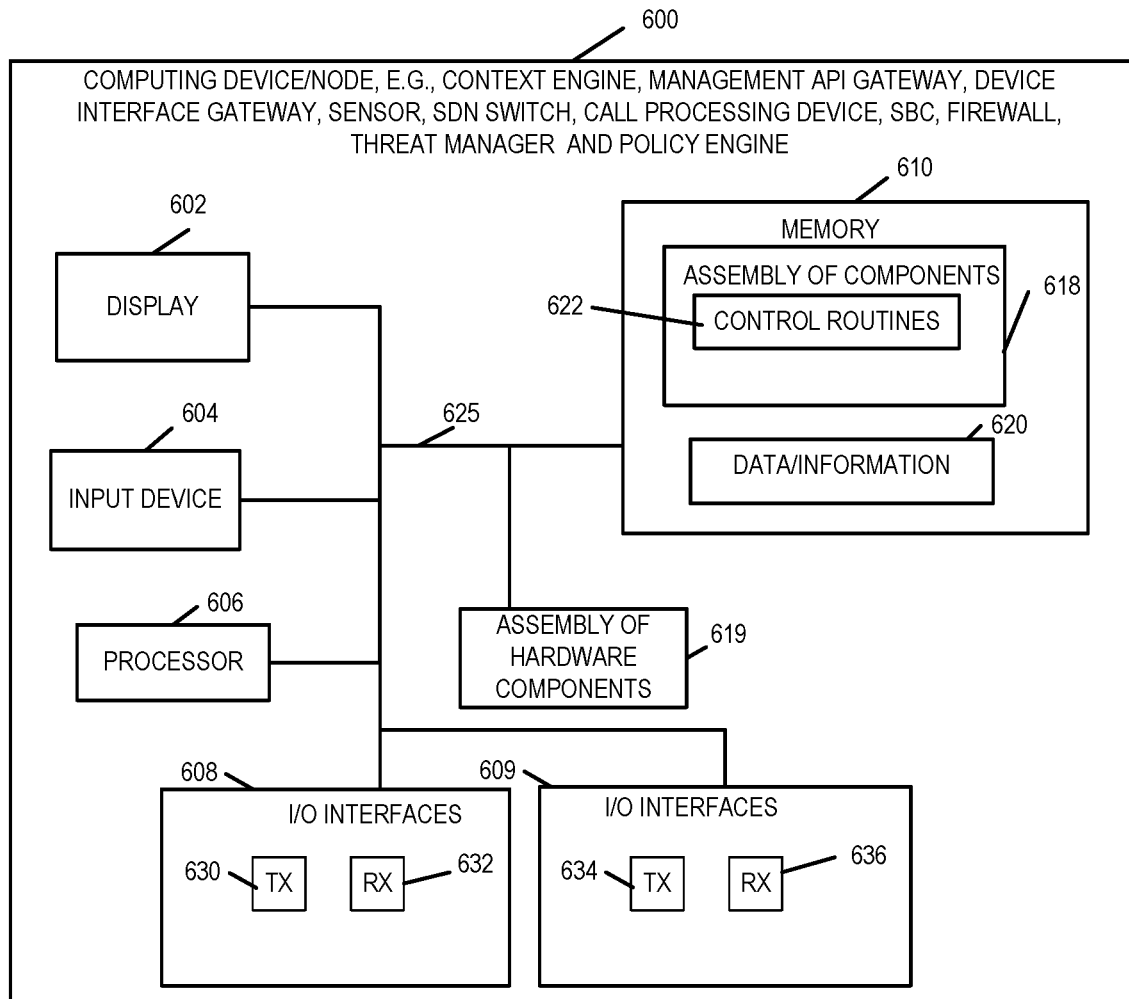
FIG. 6 illustrates an exemplary computing device/node in accordance with an embodiment of the present invention.

In some embodiments, one or more of the elements, nodes or components of the above mentioned systems are implemented in accordance with the exemplary computing device/node 600 illustrated in FIG. 6.

Exemplary computing device/node 600 includes an optional display 602, an input device 604, a processor 606, e.g., a CPU, I/O interfaces 608 and 609, which couple the computing device/node 600 to networks or communications links and/or various other nodes/devices, memory 610, and an assembly of hardware components 619, e.g., circuits corresponding to different components and/or modules, coupled together via a bus 625 over which the various elements may interchange data and information. Memory 610 includes an assembly of components 618, e.g., an assembly of software components, and data/information 620. The assembly of software components 618 includes a control routines component 622 which includes software instructions which when processed and executed by processor 606 control the operation of the computing device/node 600 to perform various functions and/or one or more steps of the various method embodiments of the invention. The I/O interface 608 includes transmitters 630 and receivers 632. The I/O interface 609 includes transmitters 634 and receivers 636. The I/O interfaces are hardware interfaces including hardware circuitry. The computing device/node 600 is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the Internet Protocol (IP), Transport Control Protocol (TCP), User Datagram Protocol (UDP), Representative State Transfer (REST) protocol, SQL (Structured Query Language) Protocol, and HDFS Hadoop Distributed File System Protocol, SQL and/or HDFS being used to interface and access information from the various databases and/or storage devices to which it may be coupled. In some embodiments, the computing device/node 600 includes a communication component configured to operate using IP, TCP, UDP, REST protocol, SQL (Structured Query Language), HDFS Hadoop Distributed File System. In some embodiments, the communications component is a hardware component, a software component or a component including hardware and software components. While only a single hardware processor is illustrated in some embodiments, it is to be understood that the computing device/node 600 can include more than one processor with the processing being distributed among the plurality of processors. In some embodiments, one or more of the following are implemented in accordance with the computing device/node 600 illustrated in FIG. 6: context engine element 106, management API gateways 202, application nodes 204, threat manager and policy engine nodes 206, device interface gateways 208, session border controller (SBC) 404, centralized policy and exchange server (PSX) 402, SDN switch 306, firewall 302, enforcer devices 220, sensors 216, sensor 216', sensor 216", enforcing sensors 218, and user equipment devices 310 and 312.

Figure 7:
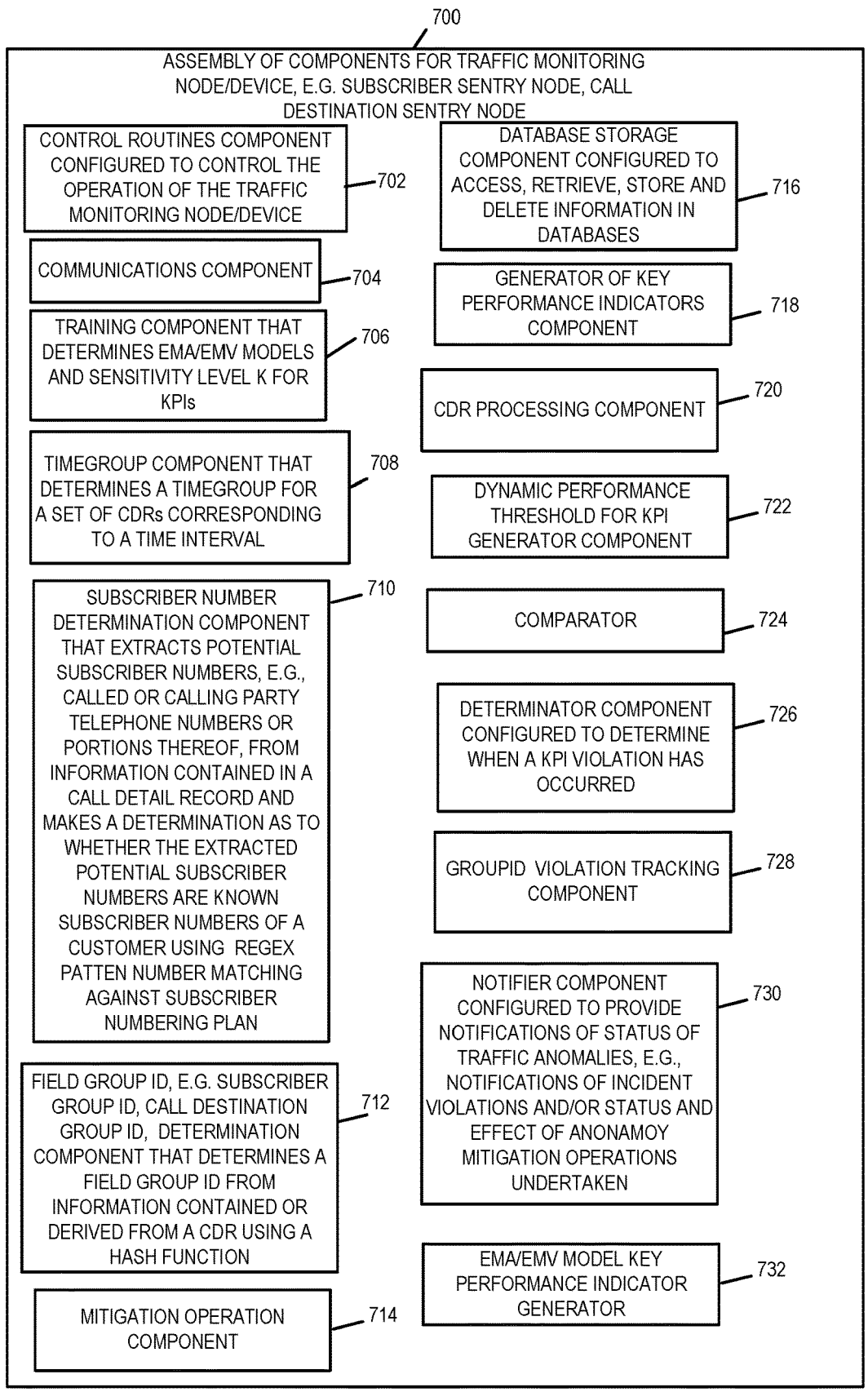
FIG. 7 illustrates an exemplary assembly of components for a traffic monitoring node or device implemented in accordance with an embodiment of the present invention.

An exemplary assembly of components 700 for a computing node 600 implemented as a traffic monitoring node or device, e.g., subscriber sentry node or call destination sentry node in accordance with an embodiment of the present invention is illustrated in FIG. 7. One or more of the assembly of components 700 may be implemented as hardware components in the assembly of hardware components 619 or as software components in the assembly of software components 618 stored in memory 610 of the exemplary computing node/device 600. The assembly of components 700 will be discussed in further detail below.

Some prior approaches to anomaly detection and/or mitigation include tools which allow for the monitoring of the network coupled with human decision making and changing policies. Furthermore, there are some Security Information and Event Management (SIEM) frameworks that perform monitoring and sometimes policy enforcement. However, the current invention addresses the aforementioned problems with these approaches by providing a novel closed loop Unified Communications (UC) protection system in which knowledge learned during monitoring is programmatically coupled into actions, e.g., enforcement actions which results in new knowledge and updated actions in a continuously evolving cycle.

This closed loop approach to UC protection provides numerous advantageous over prior systems. First, the complexity of a UC solution makes it extremely difficult, if not impossible in some situations, for human operators or analysts to understand the interactions of the system and to identify, detect and/or classify anomalies. This requires a level of UC awareness that cannot be provided by existing SIEM solutions since they consider low-level, generic events. Traffic flows which might be completely anomalous from a UC perspective will generally look like very normal IP flows en mass. For example, the calls from a robocaller are all part of the same IP packet flow with the legitimate calls from the upstream peer. Second, UC attacks often evolve at a rapid rate. A static solution involving a human-interaction for mitigation through policy will only be effective for the short time before the threat is tweaked or modified. Coupled with the lengthy time to detect and involve human decision-making in the first place, the overall period of mitigation results in an unacceptably low portion of the threat window. In contrast, various embodiments of the present invention use a closed loop approach that overcomes these problems by providing for automatic evaluation of the effect of mitigation actions implemented to address the original detected problem and to make subsequent adjustments to fine tune the mitigation actions. This happens at the speed of the automated feedback loop which is orders of magnitude faster than a human-involved loop.

Figure 8:
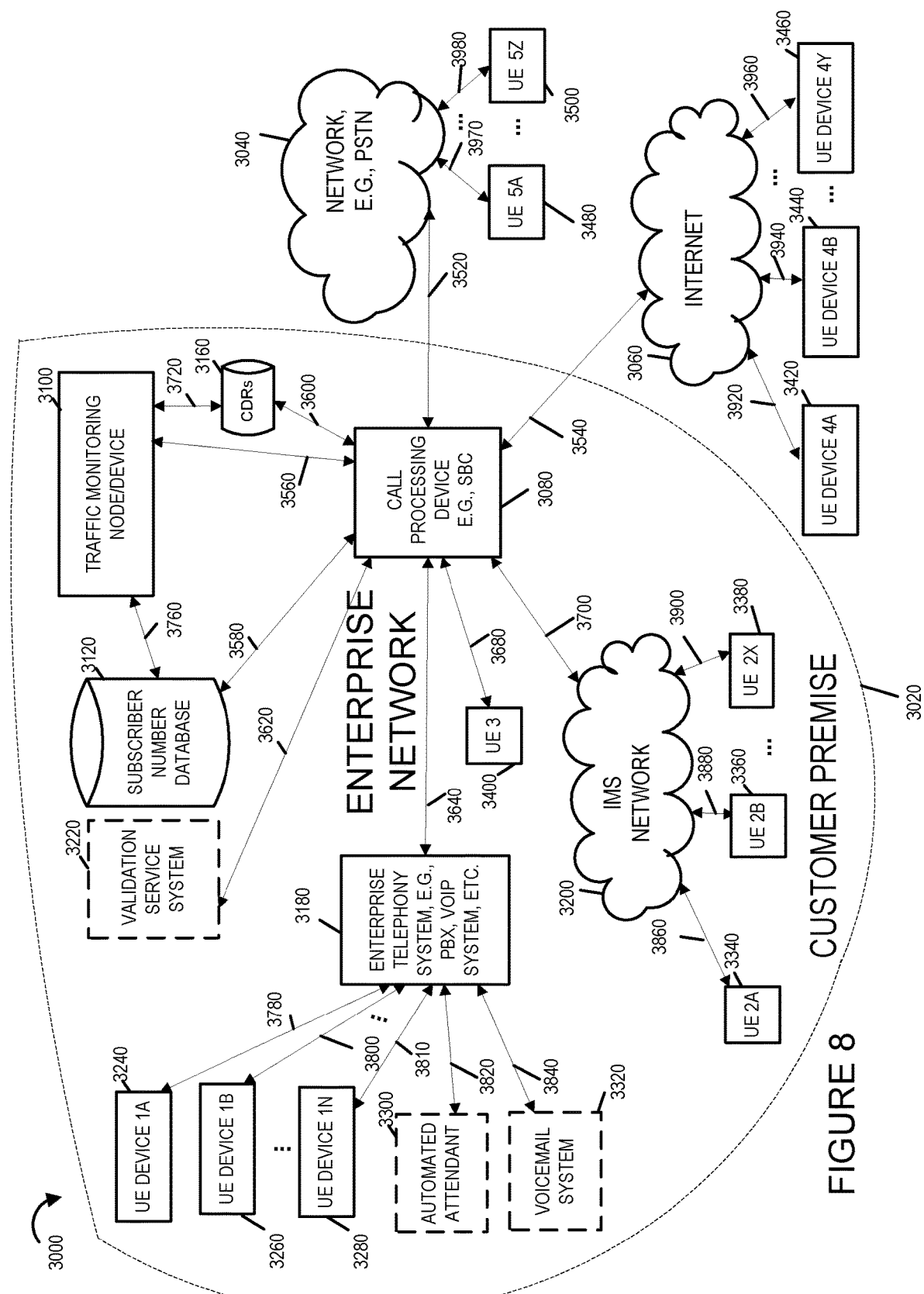
FIG. 8 illustrates another exemplary embodiment of a system in accordance with the present invention.

System 3000 of FIG. 8 illustrates another exemplary system in accordance with an embodiment of the present invention. The system 3000 includes a customer enterprise network 3020, an external network 3040, e.g., Public Switched Telephone Network (PSTN) 3040, and an external Internet Protocol network, e.g., the Internet. In the exemplary embodiment, the customer enterprise network is a private network owned for example by a customer such as business and the communications equipment is located on the customer's premises. The Internet 3060 has coupled to it a plurality of communications devices UE device 4A 3420, UE device 4B 3440, . . . , UE device 4Y 3460 where Y is a positive integer number. The communications devices UE device 4A 3420, UE device 4B 3440, . . . , UE device 4Y are coupled to the Internet 3060 via communications links 3920, 3940, . . . , 3960 respectively. Exemplary types of communications devices include phones, computers, mobile phones, internet phones, Voice Over Internet (VOIP) phones, IP phones, SIP based communications devices, laptops, tablets, smartphones, and robocallers (i.e., devices that make robocalls).

The network 3040, e.g., PSTN, is a telephony network including communications devices UE 5A 3480, . . . , UE 5Z 3500, where Z is a positive integer number. The communications devices UE 5A 3480, . . . , UE 5Z 3980 are coupled to the network 3040 via communications links 3970, . . . , 3980 respectively.

Enterprise network 3020 includes a call processing device 3080, e.g., a Session Border Controller, traffic monitoring node/device 3100, subscriber number database 3120 which holds subscriber numbers, e.g., telephone numbers assigned to the enterprise customer, customer call detail records database 3160, enterprise telephony system 3180, e.g., PBX, VOIP system, etc., an IMS network 3200, an optional call validation service system 3220, an optional automated attendant device 3300, an optional voicemail system 3320, a plurality of communications devices and communications links which couple the devices, systems and networks included in the enterprise together. For the sake of simplicity, the call processing device 3080 in the exemplary system 3000 is explained using an exemplary embodiment where the call processing device 3080 is a Session Border Controller (SBC). However, it should be understood that the invention is not limited to the call processing device 3080 being an SBC. For example, the call processing device 3080 can and in some embodiments is one of the following: an Enterprise telephony system, a Private Branch Exchange, IP to PSTN gateway, a telephony application server, or telecommunications switching equipment. Communications devices UE device 1A 3240, UE device 1B, . . . , UE device 1N, where N is a positive integer number are coupled to the enterprise telephony system 3180 via communications links 3780, 3800, . . . , 3810 respectively. The optional automated attendant device 3300 is coupled to enterprise telephony system 3180 via communications link 3820. In some embodiments, automated attendant features are included in the enterprise telephony system. In some embodiments, the automated attendant system is coupled to the Session Border Controller 3080 instead of or in addition to the enterprise telephony system 3180. The voicemail system 3320 is coupled to enterprise telephony system 3180 via communications link 3840. In some embodiments, the voicemail system features are incorporated into the enterprise telephony system. In some embodiments, the voicemail system 3320 is coupled to the SBC 3080 instead of or in addition to the enterprise telephony system 3180. The optional call validation service system 3220 is coupled to the SBC 308 via communications link 3620. In some embodiments, the call validation service system is incorporated into or coupled to the enterprise telephony system. In some embodiments, the call validation service system is operated by a third party service and is not located on the customer premises but is coupled to one of the external networks 3040 or 3060.

The enterprise telephony system is coupled to the SBC 3080 via communications link 3640, communications device UE 3 3400 is coupled to the SBC 3080 via communications link 3680.

Communications devices UE 2A 3340, UE2B 3360, . . . , UE 2X 3380 are coupled to IP Multimedia Subsystem (IMS) network 3200 via communications links 3860, 3880, . . . , 3900 respectively.

Traffic monitoring node/device 3100 is coupled to subscriber number database 3120, and customer enterprise CDRs database 3160 via communications links 3760, 3740, and 3720 respectively.

SBC 3080 is coupled to external network 3040, Internet 3060, IMS network 3200, UE 3 3400, enterprise telephony system 3180, call validation service system 3220, subscriber number database 3120, traffic monitoring node/device 3100 and enterprise customer CDRs database 3160 via communications links 3520, 3540, 3700, 3680, 3640, 3620, 3580, 3560, and 3600 respectively.

Exemplary types of communications devices include phones, computers, mobile phones, internet phones, Voice Over Internet (VOIP) phones, IP phones, SIP based communications devices, laptops, tablets, smartphones, and automated dialing devices (e.g., devices that make robocalls which can result in traffic anomalies). It is to be understood that different types of communications devices are coupled to the different networks depending on the interfaces included in the communications devices, the type of protocols supported and the type of network to which the communications device is coupled. Robocall devices are communications devices coupled to the PSTN network 3040 and/or the Internet 3060 in the present system that include automated calling devices such as telemarketers as well as electronic spammers and spoofers, e.g., communications devices that spoof (e.g., communicate under a false identity for example by assuming the identity or emulating the identity of other communications devices). These robocall devices when targeting the enterprise customer will result in traffic anomalies that the traffic monitoring node/device can detect and cause mitigation operations to be taken in response to the detection of the traffic anomalies.

While in the exemplary embodiment the SBC 3080 is located on the customer premise and is part of the enterprise network, the SBC 3080 may be, and in some embodiments is, located outside of the customer premise and part of one of the external networks. Whether the SBC 3080 is located on the customer premise as part of the enterprise network 3020 or located externally to the customer premise and is part of an external network, the SBC 3080 is a network edge device that provides ingress and egress call establishment and call termination services for the enterprise network. Incoming calls are established via the SBC 3080 with incoming calls or at least the signaling related to their establishment and termination passing through the SBC 3080. The SBC 3080 is sometimes implemented in accordance with computing device/node illustrated in FIG. 6. In some embodiments, the SBC 3080 includes a policy and routing server that communicates policies and routing decisions to other devices in the enterprise network such as for example the enterprise telephony system and network devices responsible for routing calls in the IMS network 3200. In some embodiments, the call processing device or SBC and traffic monitoring node/device are implemented as virtual machines running on one or more compute nodes with each compute node including a processor in a cloud system including memory. The subscriber number database and CDRs database may be, and in some embodiments are, cloud database systems which are located in a cloud system external to customer premise.

An exemplary embodiment of the present invention includes a method for monitoring, detecting and/or mitigating traffic anomalies based on collection and analysis of Call Detail Records. The exemplary method may be, and sometimes is, implemented in accordance with the system 100 of FIG. 1 or system 500 of FIG. 5 or system 3000 of FIG. 8. In some of these embodiments, an SBC is a sensor/enforcer node that generates the Call Detail Records which are collected and analyzed and also enforces mitigation operations determined by the system in response to detection of traffic anomalies. The method is advantageous over approaches which use a global network model in that different models are used for different groupings of categories including subscriber number, called destination groups, ingress and egress trunk groups, destination country codes, and ingress and egress IP signaling networks. As a result, the exemplary method can detect deflections along any of these dimensions, even if the changes are not significant at the overall network level. At the same time, the exemplary method is better than the typical per-group-instance models because it controls the total number of parameters in two ways. First, each individual model uses a limited number of parameters along with a global sensitivity parameter. In the present example only two parameters along with a global sensitivity parameter are used. Second, it models not on the actual instances of each group but rather on a hash of each instance value. This combination of a controllable total number of model instances along with the fixed number or parameters per model instance allows tuning based on the data volume to balance resolution against overfitting. Furthermore, the exemplary method is advantageous over static models because ongoing traffic is periodically incorporated into the model through updates to the per-model parameters. These updates are extremely low cost from a computational and model re-training perspective. In the exemplary method, the updates involve just simple arithmetic operations. Consequently, these updates can be done regularly with low time lag in contrast to approaches where updates require complex model retraining.

The present invention also includes system embodiments in which the method embodiments of the present invention are implemented. In an exemplary traffic anomaly monitoring, detecting and/or mitigation system in accordance with one embodiment of the present invention, the system is implemented in a traffic sentry application residing on a system with a processor and memory. In some embodiments, the traffic sentry is implemented on a virtual machine of a compute node located in the cloud including a processor and memory, the traffic sentry comprising a collection of traffic guards with each guard aggregating and monitoring the traffic along a particular dimension (e.g., grouping field). In one embodiment, the traffic sentry monitors by two groupings. The first grouping monitored is by subscriber number and the second grouping is by called party. In other embodiments, additional groupings or dimensions are monitored including by trunk groups, signaling IP networks, and country codes.

Key performance indicators are computed by aggregating the calls in an interval by group. For certain dimensions, the method of mapping calls to groups is obvious. As an example, consider the mapping by ingress trunk group (TG). In such a case, calls are grouped together based on the ingress TG value from the Call Detail Report (CDR). For some dimensions, while the mapping seems to be obvious, the naïve approach is not practical. Take for example, the grouping by subscriber. In such a case, calls should be grouped by the subscriber number. However, this has practical difficulty in that the potential number of subscribers can be overwhelming. In order to overcome this problem, the mapping space needs to be compacted through, for example, hashing. While hashing solves the problems associated with groups with excessively large numbers of different members (e.g., subscriber numbers), it turns out that it is advantageous to always hash the instances for all grouping types because this then results in complete predictability of the maximum number of separate instance entries to be handled by the system.

The expected behavior for each instance of a grouping is captured by an exponentially-weighted moving average (EMA) and an exponentially-weighted moving variance (EMV). The EMV and the EMV are the two parameters associated with each model instance. The sensitivity is governed by sensitivity parameters which are effectively a threshold number of standard deviations (i.e., the $\sqrt{EMV}$).

However, analysis of historical telephony network anomalies indicates that time also needs to be taken into account. The time-of-day and day-of-week need to be a factor in this behavior for the model to work properly. For example, a pattern that is valid during the work week is often an anomaly when it occurs over a weekend, and in fact it is often the case that fraud events occur on weekends or off-hours since it is less likely to be detected in a timely manner. The system needs to account for this and therefore models time of day and day of week into the expected behavior. However, to avoid overly expanding the number of dimensions, time is incorporated using the notion of a "timegroup". Every event is placed into one of two timeblocks: a "busy-hour" timegroup, or an "off-hour" timegroup. The starting hour and ending hour for the busy-hour timegroup, the "weekend" days, and the dates of holidays are configurable. Separate models are built for each timegroup of a group instance.

One of the objectives or goals of the system is to provide useful indications of potential problems based on detected anomalies without overwhelming the human operator or analyst with noisy indications. In the case of the traffic sentry system, this requires determining the appropriate threshold bounds for each key performance indicator. One approach is to make this threshold configurable, for example, in terms of the number of standard deviations to check against. However, this simply pushes the problem to the human operator or analyst who is the typical customer. The customer however often does not have the requisite information or experience to set these thresholds. As a result, to address this problem, in various embodiments of the present invention a different approach is utilized. The approach taken includes a "training" step as part of the traffic sentry's application setup. In this training step, the traffic sentry performs the steps of its anomaly monitoring and detection method on historical data, e.g., CDRs, using multiple levels of sensitivity (i.e., number of standard deviations). Each level of sensitivity results in some number of triggers, e.g. alarms indicating an anomalous event, with higher levels of sensitivity producing more triggers. This information is then used to determine an initial sensitivity level which produces an expected non-zero but reasonable rate of violations resulting in triggers. This sensitivity level, which can be updated by the operator or analyst, and the initial moving average and variance from the setup training are then used for the run-time operation.

The run time operation is executed every interval, e.g., with an interval being 15 minutes. The interval is configurable. In some embodiments, the interval may be changed during run time operation. The various key performance indicators along the various dimensions are determined or computed for each instance/timegroup combination of the relevant group. This value is then compared against the moving average adjusted by the chosen number of standard deviations. If the key performance indicator value exceeds the threshold, tracking starts for the offending instance and the event is reported to the incident manager. The key performance value is then folded into the moving average for that key performance indicator and that instance. Monitoring continues for subsequent intervals. For each interval that the key performance indicator stays above the threshold for an instance, the severity of the incident is increased. Similarly, if the key performance indicator drops below the threshold for an instance, the severity of the incident is reduced. In this way, even a point violation is reported but the anomalies which persist get higher visibility and anomalies which go away eventually get downgraded.

The traffic sentry system maintains models along multiple groupings, but functionally, the operation for each group is similar regardless of the grouping. The functionality for an exemplary group will now be described. The exemplary group is the Subscriber-based monitoring group.

The subscriber-based monitoring functionality includes monitoring the traffic from individual subscribers and providing alerts when the traffic from a subscriber is higher-than-expected based on previous subscriber behavior. In some embodiments, when anomalies are detected the severity of the anomaly is taken into account and mitigation operations are undertaken to reduce and/or eliminate the effect of the anomaly on the network. Mitigation operations include giving calls in the future identified as corresponding to the subscriber a lower priority than other calls, directing such calls to a voicemail system, an automated attendant system and/or terminating or dropping the call. The solution to the problem requires characterizing the traffic from each subscriber by statistical metrics of mean and variance for each KPI, and then providing an alert and/or performing a mitigation operation when new traffic to or from a subscriber is significantly above the number of statistical measures for the subscriber. Scaling such a system is however problematic when the number of subscribers is large. For purposes of scalability, the system limits the number of subscribers continuously tracked by using methods and algorithms whose performance depends on the number of active subscribers rather than the total corpus of subscribers (since the former is almost always a fraction of the latter). This is achieved by tracking based on a hash of the subscriber number rather than the subscriber number itself. The monitored subscriber number is compacted into a logical subscriber group via a hashing function. The input to the hashing function will be the subscriber phone number for the subscriber traffic sentry application. In one embodiment, the detection algorithm uses an Apache Impala hashing function, i.e., fnv_hash (type v) which implements the Fowler-Noll-Vo hash function, in particular the FNV-1a variation. The hashing function returns a consistent 64-bit value derived from the input argument. It is to be understood that this is only an exemplary hashing function and that other hashing functions may be utilized. The subscriber sentry application uses the returned hash value to perform bucketing to safeguard the application with defined capacity by restricting the value to a particular range. A valid range is achieved by using an expression that includes the ABS( ) function and the % (modulo) operator. For example, to produce a hash value in the range 0-999,999, one could use the expression ABS(FNV_HASH(X))% 100000, where X is the subscriber telephone number.

The method steps of the training phase or portion for this exemplary subscriber traffic sentry application may be summarized as follows:

1. Select an initial interval time period to be used during run time operation such as for example, an interval time period of 15 minutes.
2. Select the last 1 month of Call Detail Record (CDR) data. Note that this is a minimum and provides for 2880 15 minute intervals of training assuming a 30 day month.
3. Repeat for each time period interval:
   a.) Determine the timegroup, e.g., busy-hour time group or off-hour time group, based on the starting time of the interval, the day of the week and the holiday calendar.
   b.) Repeat for all calls/CDRs in the interval:
      i) Extract potential subscriber numbers by matching the calling then called number to a configured subscriber numbering plan regular expression (regex) pattern using pattern matching.
      ii) If neither the extracted calling or called party number matches a subscriber number, the pattern matching returns a null (i.e., this call detail record does not correspond to a known subscriber call as the calling and called party numbers do not match to a subscriber of the customer), then disregard the call/CDR.
      iii) Else determine, e.g., compute, the groupid as the hash of the determined subscriber number for each of the matched subscriber numbers (i.e., if the calling party number is matched to a subscriber number then determine a groupid for the calling party number and similarly if the called party number is matched to a subscriber number then determine a groupid for the called party number.
   c.) Repeat for each groupid
      i) Determine, e.g., compute, the Key Performance Indicator (KPI) variables for the (groupid, timegroup) tuple
      ii) If the EMA, EMV for the (groupid, timegroup) exists and covers at least 10 samples, then check whether the determined KPI exceeds EMA+$K*\sqrt{EMV}$ for this (groupid, timegroup), where $1 \leq K \leq 10$ for each of the KPI variables
      iii) Else, if the EMA, EMV for the global (*, timegroup) exists and covers at least 100 samples, then check whether the generated KPI exceeds EMA+$K*\sqrt{EMV}$ for this (*, timegroup), where $1 \leq K \leq 10$ for each of the KPI variables, and * is a wildcard representing all subscriber groups. In some embodiments, this step is performed regardless of whether the EMA, EMV for the (groupid, timegroup) exists and covers at least 10 samples.

iv) Fold the current values of the KPI into the EMA, EMV for (groupid, timegroup)

v) Fold the current values of the KPI into the EMA, EMV for the (*, timegroup)

d.) For each threshold K in EMA+K*√EMV across all KPI variables, determine, e.g., compute the total number of violations by KPI variable across all (groupid, timegroup) tuples.

When the end of the training phase completes, these violation counts for each K by KPI variable are added to violation counts by KPI variable for other modules of the traffic sentry such as the destination traffic sentry module. The violation counts are then used to determine an initial sensitivity level that is expected to produce a non-zero but reasonable number of daily violation, such as for example on a scale of 1 to 10 violations. The overall statistics are available to the analyst and the analyst can change this sensitivity level either before starting the run-time monitoring or after the run-time monitoring has begun.

The method steps of the run-time phase or portion for the subscriber traffic sentry module is executed at the end of every time period interval, e.g., 15 minutes. The steps for the run-time phase are the same or similar to the steps for time period interval of the training phase discussed above with the following exceptions which are summarized below.

1. Only calls in the previous time period interval are considered.

2. The KPI metrics for (groupid, timegroup) are compared against EMA+K*√EMV only for the value of K determined or selected at the end of the training phase.

3. If a groupid is in violation in the last interval, then:
   a.) Create a control block
   b.) Determine the subscriber numbers that are part of that groupid
   c.) If there are multiple subscriber numbers determined to be part of the groupid then determine the smallest set of entries comprising the aggregate majority of the metric in the last time period interval
   d.) If no severity incident exists then raise a low-severity incident alarm to the incident manager otherwise, elevate the severity for the incident and update the incident manager
   e.) If the severity exceeds a predetermined threshold level then perform an anomaly mitigation operation such as for example giving calls to or from the subscriber a lower priority than other calls
   f.) If a groupid is not in violation in the last interval, then reduce the severity and update the incident manager. If the severity level drops to "zero," delete the tracking of the violation In the subscriber sentry application one or more of the following key performance indicators may be, and in some embodiments are, utilized: Egress BIDs, Egress STOPs, Egress MOU, Ingress BIDs, Ingress STOPs, Ingress MOU, BIDs, STOPs, and MOU. It is to be understood that these key performance indicators are exemplary and other key performance indicators may also be used. Egress BIDs is the number of calls a monitored subscriber made in a given interval. Egress STOPs is the number of completed/connected calls made by a monitored subscriber in a given interval. Ingress MOU is the Minutes Of Usage from connected calls made by a monitored subscriber in a given interval. Ingress BIDs is the number of calls a monitored subscriber received in a given interval. Ingress STOPs is the number of completed/connected calls a monitored subscriber received in a given interval. Ingress MOU is the Minutes Of Usage from connected calls received by a monitored subscriber in a given interval. BIDs is the number of calls a monitored subscribe made or received in a given interval. STOPs is the number of completed/connected calls a monitored subscriber made or received in a given interval. MOU is the Minutes of Usage from connected calls made or received by a monitored subscriber in a given interval.

FIG. 9 illustrates a flowchart 900 of an exemplary method of the present invention. The flowchart 900 illustrates how in at least one embodiment a plurality of N sentry nodes process call detail records to monitor for, detect and take actions to mitigate traffic anomalies. The method of FIG. 9 may be implemented with various systems including those described in connection with FIGS. 1, 5 and 8. The method begins in start step 902 after a training routine has been run and EMA/EMV models and values have been generated for various key performance indicators as well as a global sensitivity threshold, e.g., K in the above discussion. Operation proceeds from start step 902 to step 904.

In step 904, P is set to the value of 1. P is merely used for explanatory purposes to indicate what set of call detail data is being processed. Operation proceeds from step 904 to step 906. In step 906, the traffic monitoring system receives the P set of call detail records of the customer for a time interval, e.g., last 15 minutes worth of call detail records of the customer. Operation proceeds from steps 908, 914, ..., 920. The traffic monitoring system includes a plurality of different sentry nodes 1, 2, ..., N which concurrently or in parallel monitors different grouping categories such as for example, subscriber number, called destination groups, ingress and egress trunk groups, destination country codes, and ingress and egress IP signaling networks.

In step 908, sentry node 1, e.g., a subscriber sentry node, processes the P received set of call detail records. Operation proceeds from 908 to step 910.

In step 910, the sentry node 1 determines whether a traffic anomaly violation has occurred with respect to key performance indicators being monitored on a group basis from the call detail records and whether a prior detected traffic anomaly is no longer a problem. While a single anomaly is discussed for the sake of simplicity it should be understood that the sentry node 1 in practice will determine whether one or more traffic anomalies has occurred and whether one or more prior detected traffic anomalies are no longer a problem. Operation proceeds from step 910 or step 912.

In step 912, the sentry node 1 notifies the system operator or analyst of the status of the detected traffic anomaly or a prior detected traffic anomaly and/or performs a mitigation operation or directs a call processing node to perform a mitigation operation in response to the detected anomaly.

In step 914, sentry node 2, e.g., a call destination sentry node, processes the P received set of call detail records. Operation proceeds from 914 to step 916.

In step 916, the sentry node 2 determines whether a traffic anomaly violation has occurred with respect to key performance indicators being monitored on a group basis from the call detail records and whether a prior detected traffic anomaly is no longer a problem. As previously explained with respect to step 910 while a single anomaly is discussed for the sake of simplicity it should be understood that the sentry node 2 in practice will determine whether one or more traffic anomalies has occurred and whether one or more prior detected traffic anomalies are no longer a problem. Operation proceeds from step 916 to step 918.

In step 918, the sentry node 2 notifies the system operator or analyst of the status of the detected traffic anomaly or a prior detected traffic anomaly and/or performs a mitigation operation or directs a call processing node to perform a mitigation operation in response to the detected anomaly.

The . . . between sentry node 2 and sentry node indicates that there are a plurality of different sentry nodes monitoring different category groups which have not been shown for the sake of simplicity.

In step 920, sentry node N, e.g., a destination country code sentry node, processes the P received set of call detail records. Operation proceeds from 920 to step 922.

In step 922, the sentry node N determines whether a traffic anomaly violation has occurred with respect to key performance indicators being monitored on a group basis from the call detail records and whether a prior detected traffic anomaly is no longer a problem. As previously explained with respect to steps 910 and 916 while a single anomaly is discussed for the sake of simplicity it should be understood that the sentry node N in practice will determine whether one or more traffic anomalies has occurred and whether one or more prior detected traffic anomalies are no longer a problem. Operation proceeds from step 922 to step 924.

In step 924, the sentry node N notifies the system operator or analyst of the status of the detected traffic anomaly or a prior detected traffic anomaly and/or performs a mitigation operation or directs a call processing node to perform a mitigation operation in response to the detected anomaly.

Operation proceeds from step 912, 918 and 924 to step 926 where P is incremented by one. Operation proceeds from step 926 to step 906 where the process continues as previously described with the receipt of the P=2 set of call detail records which is for last 15 minutes of the customer call detail records that is the subsequent 15 minutes worth of call detail records after the P=1 set of call detail records.

As described above and in connection with flowchart 900 of FIG. 9, the monitoring of the traffic is performed off line from the calling processing in near real time with only a slight delay. The monitoring occurs in a closed loop wherein the effect of mitigation operations to address detected traffic anomalies can be monitored and reported to analyst and additional mitigation operations can be performed until the monitoring indicates that the detected traffic anomaly has been addressed. More detailed aspects of various exemplary methods in accordance with the present invention will now be discussed.

Figures 10, 10A:
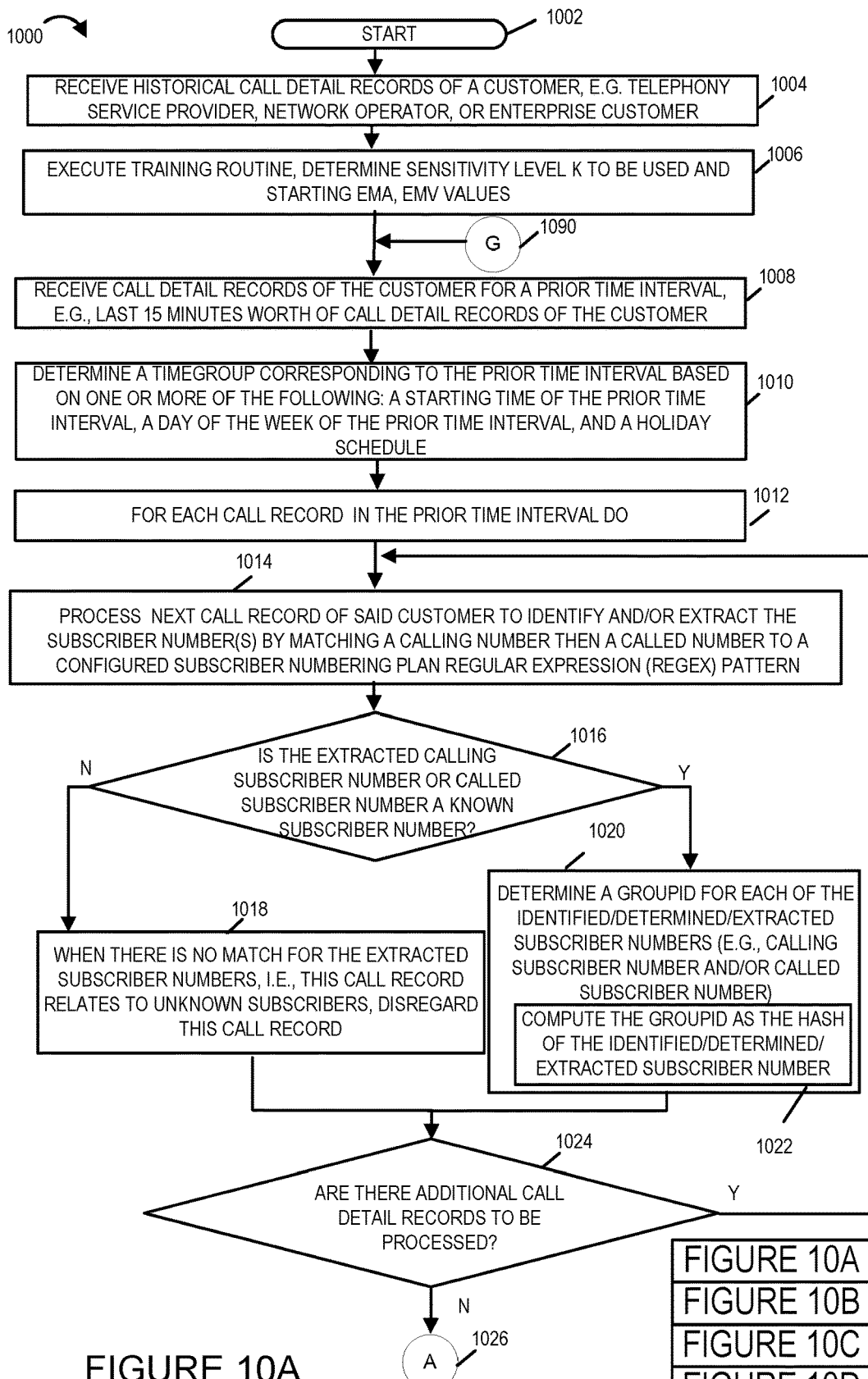
FIG. 10 comprises FIGS. 10A, 10B, 10C and 10D.
FIG. 10A illustrates the first part of a flowchart of a method in accordance with one embodiment of the present invention.
Figure 10B:
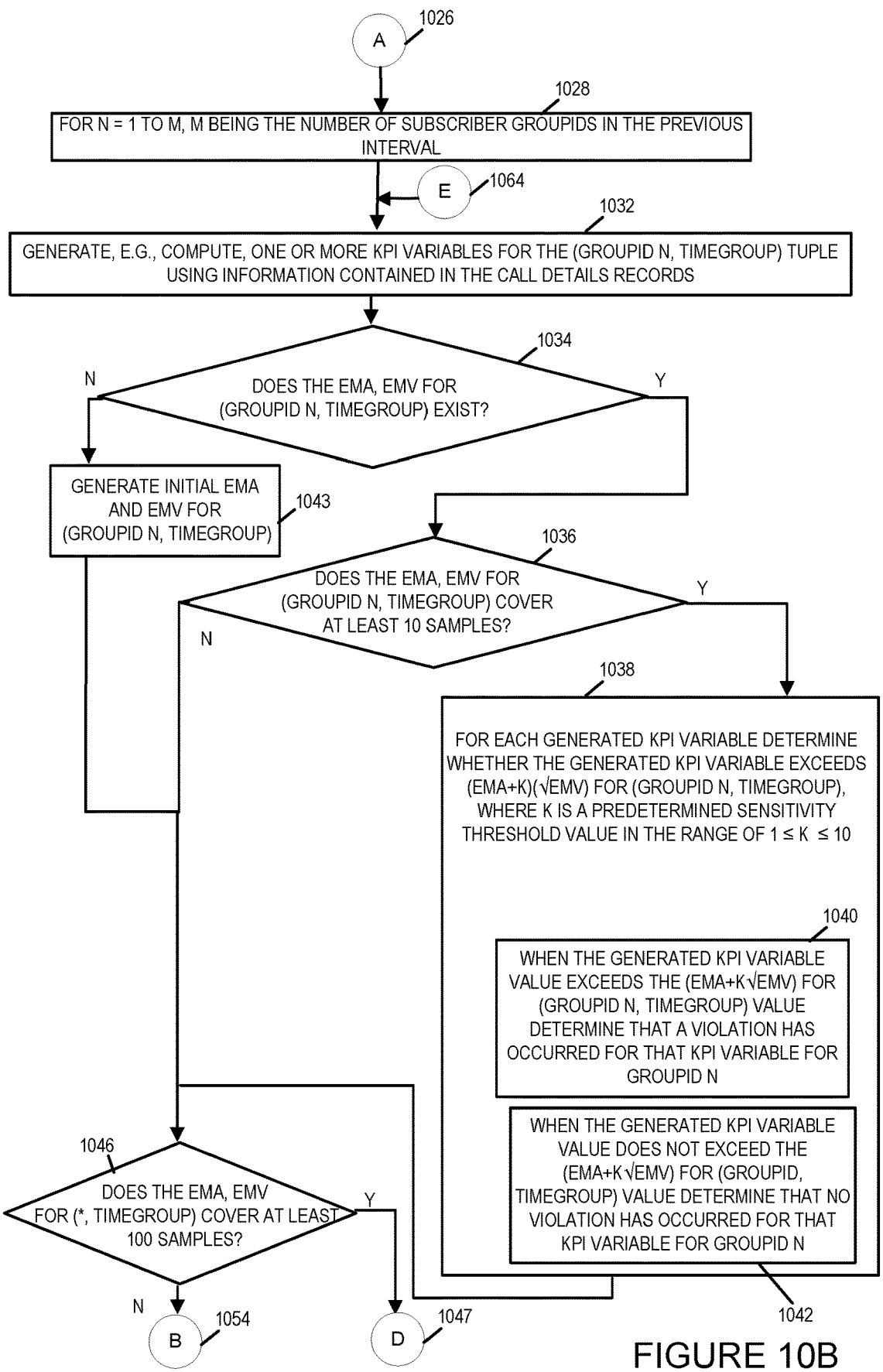
FIG. 10B illustrates the second part of a flowchart of a method in accordance with one embodiment of the present invention.
Figure 10C:
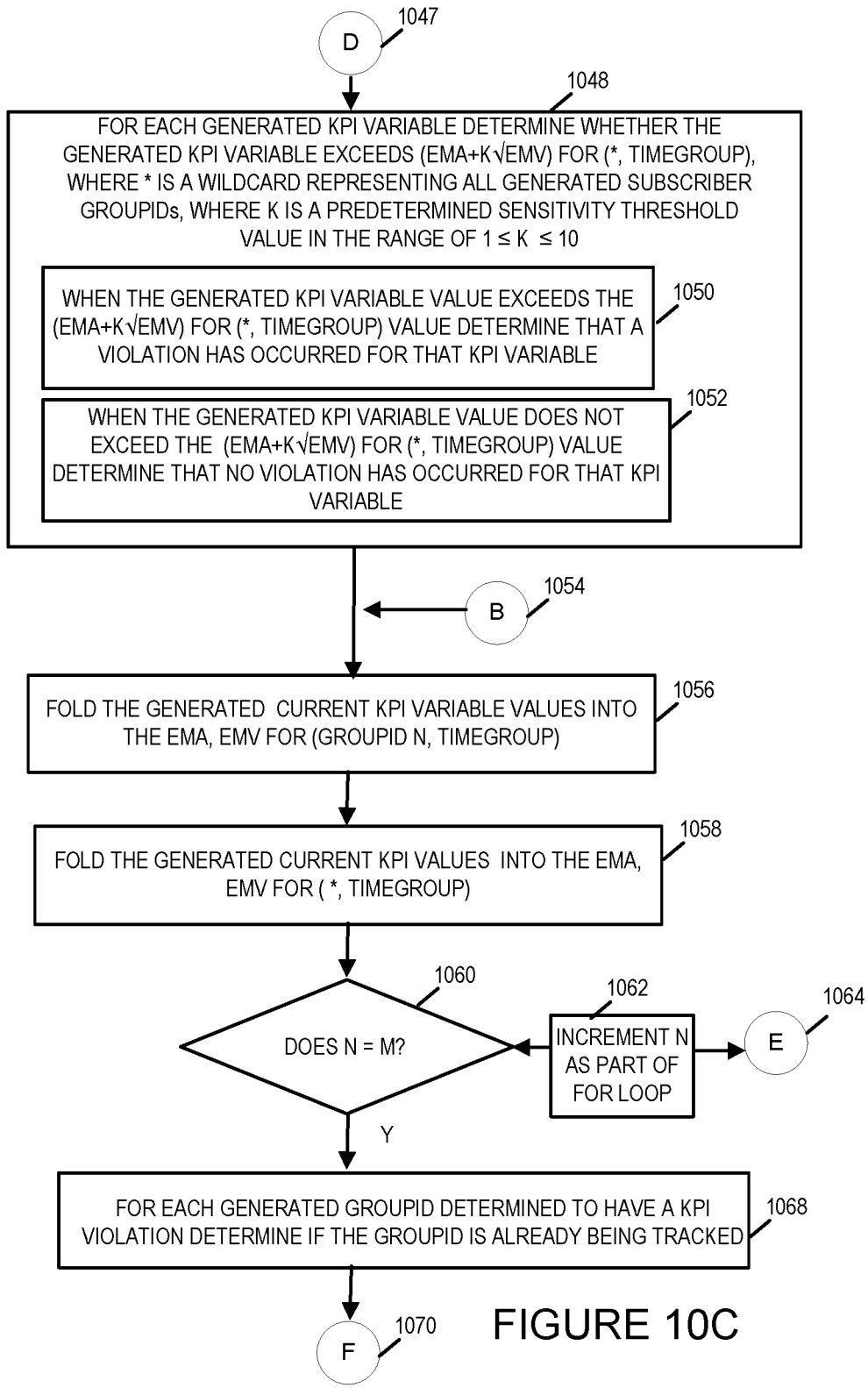
FIG. 10C illustrates a third part of a flowchart of a method in accordance with one embodiment of the present invention.
Figure 10D:
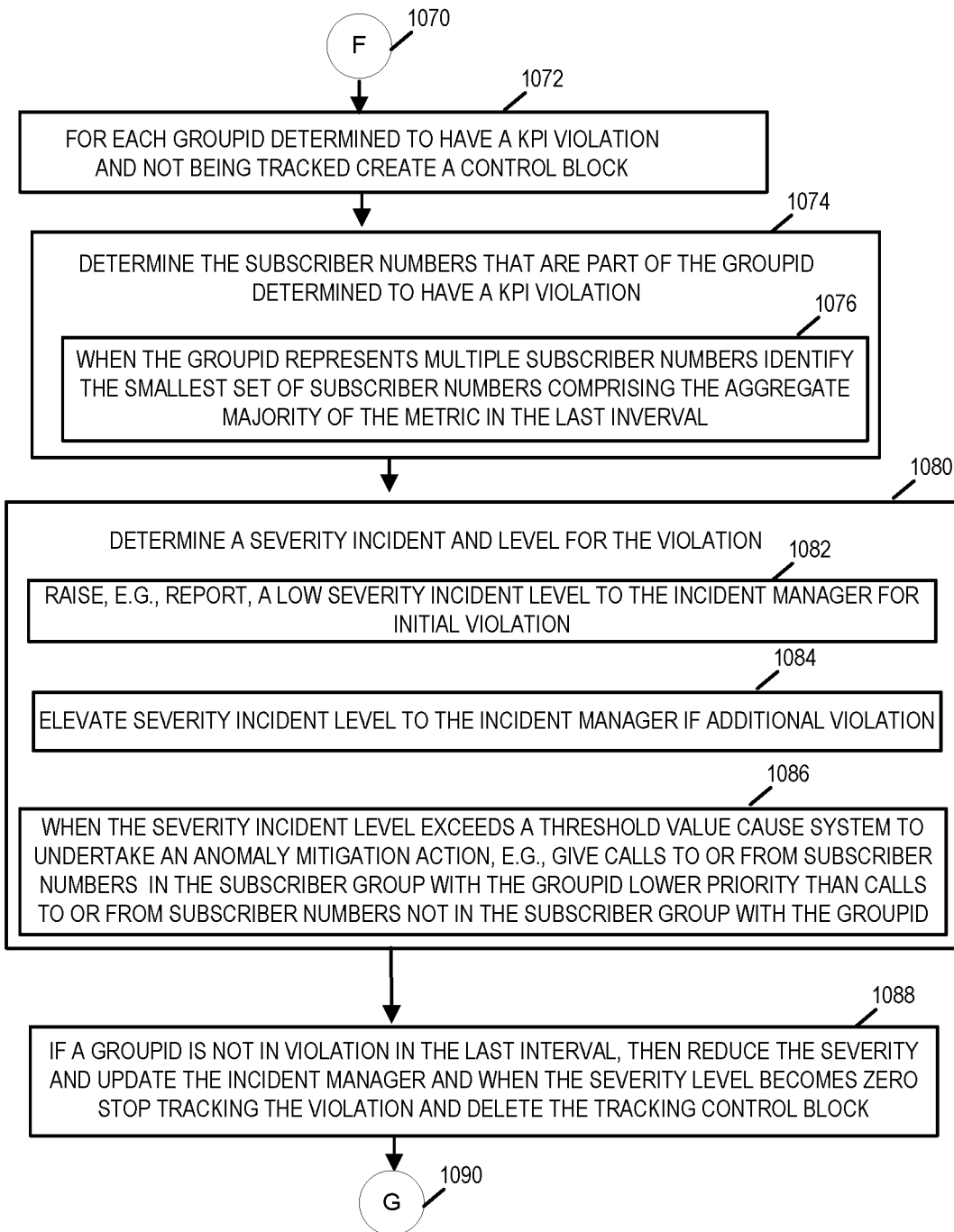
FIG. 10D illustrates a fourth part of a flowchart of a method in accordance with one embodiment of the present invention.

FIG. 10 comprises FIGS. 10A, 10B, 10C and 10D. FIG. 10A illustrates the first part of a flowchart of an exemplary method in accordance with one embodiment of the present invention. FIG. 10B illustrates the second part of a flowchart of the exemplary method in accordance with one embodiment of the present invention. FIG. 10C illustrates a third part of a flowchart of a method in accordance with one embodiment of the present invention. FIG. 10D illustrates a fourth part of a flowchart of a method in accordance with one embodiment of the present invention. The flowchart shown in FIG. 10 illustrates the steps of an exemplary method embodiment with respect to subscriber group monitoring and/or mitigation of traffic anomalies. The method 1000 may be implemented on various systems including the exemplary systems described in FIGS. 1, 4, 5, and 8.

The communications method 1000 starts in start step 1002. Operation proceeds from start step 1002 to step 1004.

In step 1004, the subscriber sentry application node receives and/or accesses a dataset of historical call detail records of a customer, e.g., an enterprise customer, a telephony service provider or a network operator. A call detail record (CDR) dataset is a dataset containing information about each call processed including timing of the call, whether it was successful or not, the calling and called parties, the call duration, the ingress and egress paths utilized, and other call details. An exemplary call detail record (CDR) and the data fields/information contained therein is illustrated in the Sonus Networks, Inc. SBC Core 5.1X documentation published on Apr. 27, 2016 and which is incorporated in its entirety by reference. The historical CDR dataset includes a large and long-term call detail record (CDR) dataset containing a reasonable totality of calls, e.g., at least one month's worth of call detail records.

The subscriber sentry application may be, and in some embodiments is, a unified communications application implemented as part of the context engine 106. The CDRs of the historical dataset are typically generated by a sensor or enforcer/sensor node such as a call or session processing node or device. In the present example, a session border controller (SBC) generates the call detail records but other call processing devices may be, and in some embodiments are, used. For example, a Private Branch Exchanges (PBX), IP to PSTN gateway, telephony application server or other telephony call processing device may be, and in some embodiments are, used to process calls and/or sessions and generate call detail records corresponding to the processed calls and/or sessions. Once the call detail records have been generated they are stored in a database, e.g., a CDR database. In some embodiments, the call processing device, e.g., SBC, stores the CDRs records in the analytics database 108 making the CDRs accessible to the subscriber sentry application of the context engine 106. Operation proceeds from step 1004 to step 1006.

In step 1006, the subscriber sentry application executes a training routine in which the sensitivity level K to be used during run time operation and the starting EMA, EMV values are determined. FIG. 11 includes a flowchart 1100 of the method steps of an exemplary training routine in accordance with one embodiment of the present invention. The exemplary training routine 1100 will now discussed before proceeding with the discussion of the steps of method 1000.

Figure 11A:
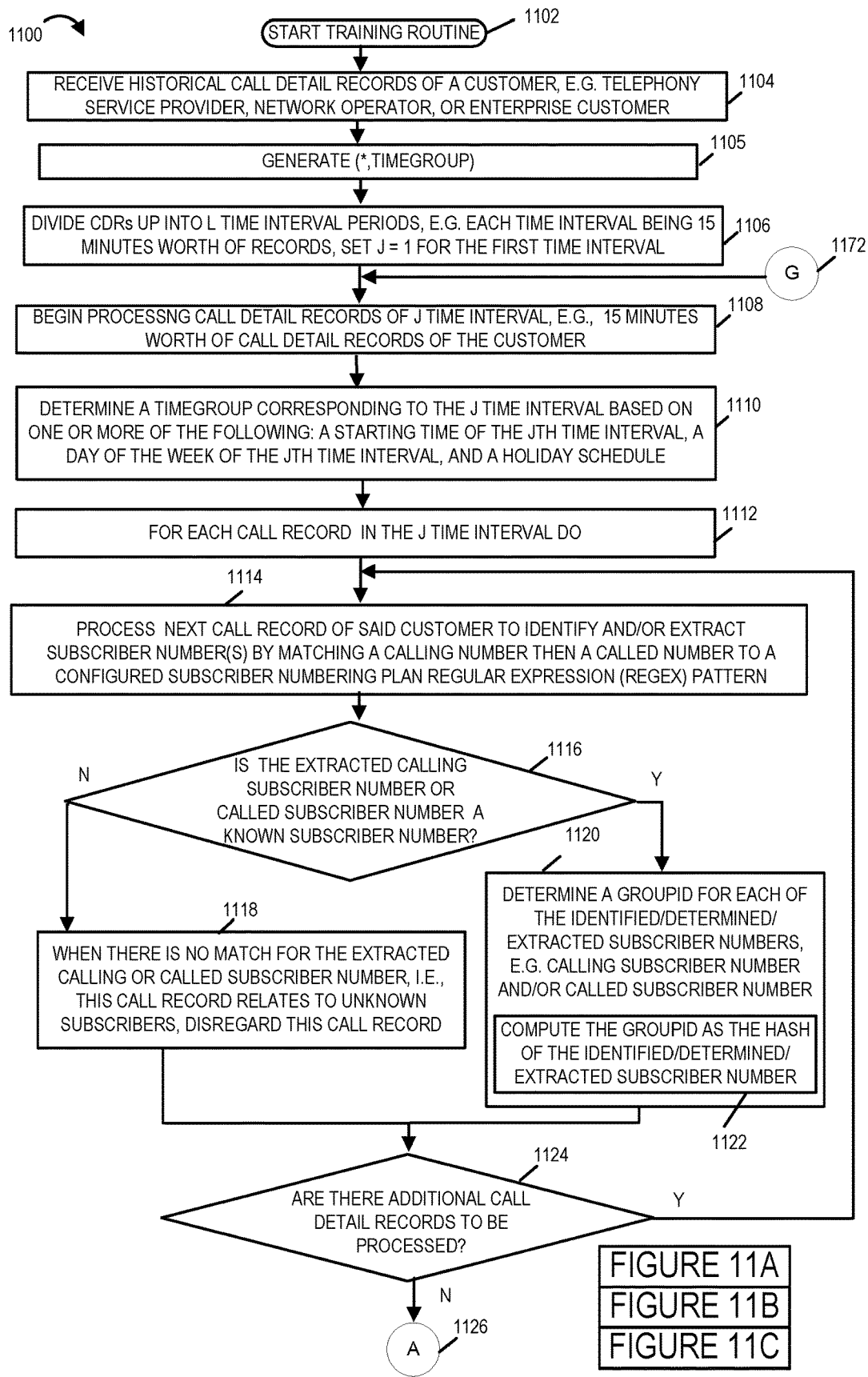
FIG. 11A illustrates the first part of a flowchart of a training routine in accordance with one embodiment of the present invention.
Figure 11B:
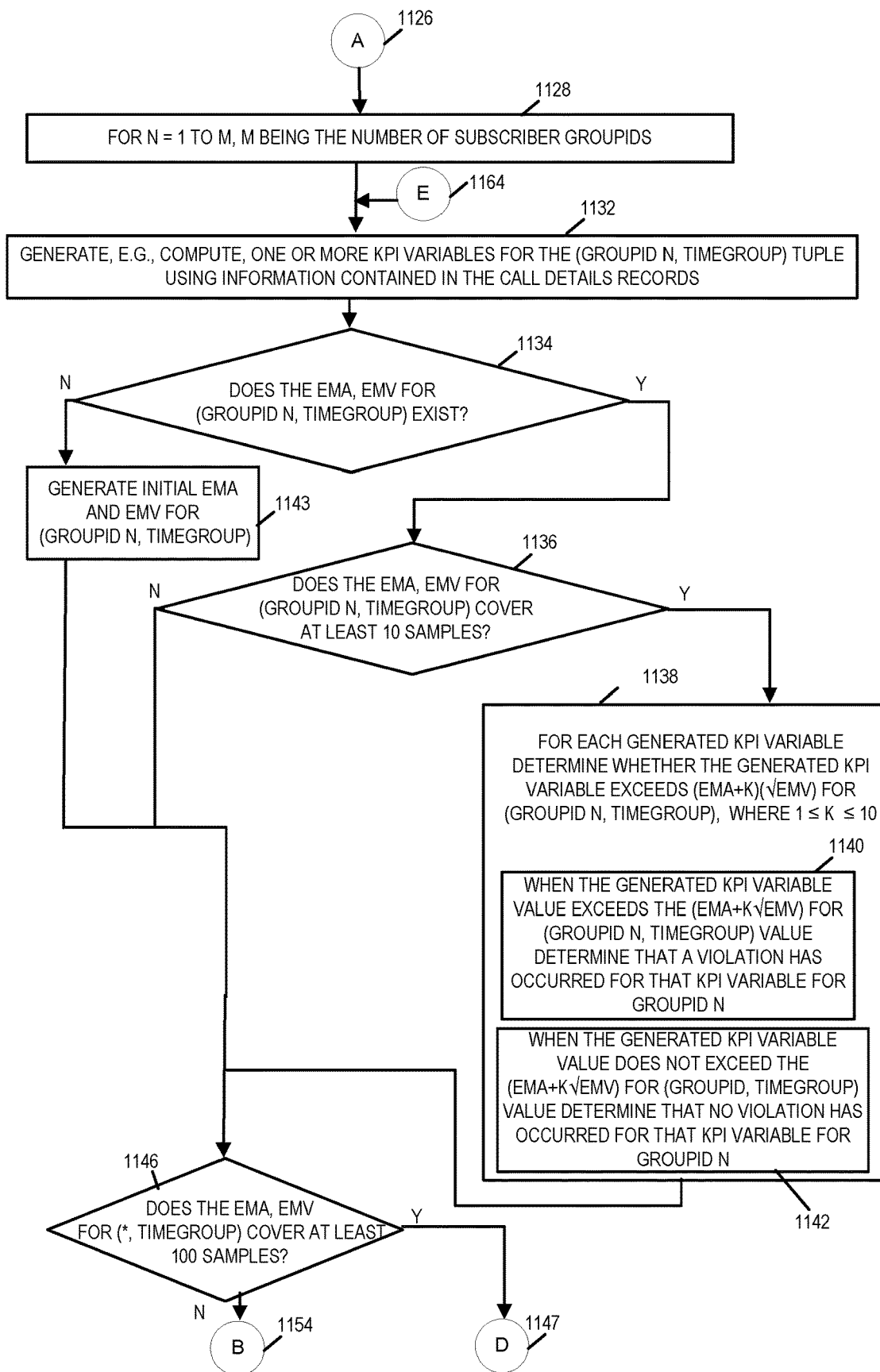
FIG. 11B illustrates the second part of a training routine in accordance with one embodiment of the present invention.
Figure 11C:
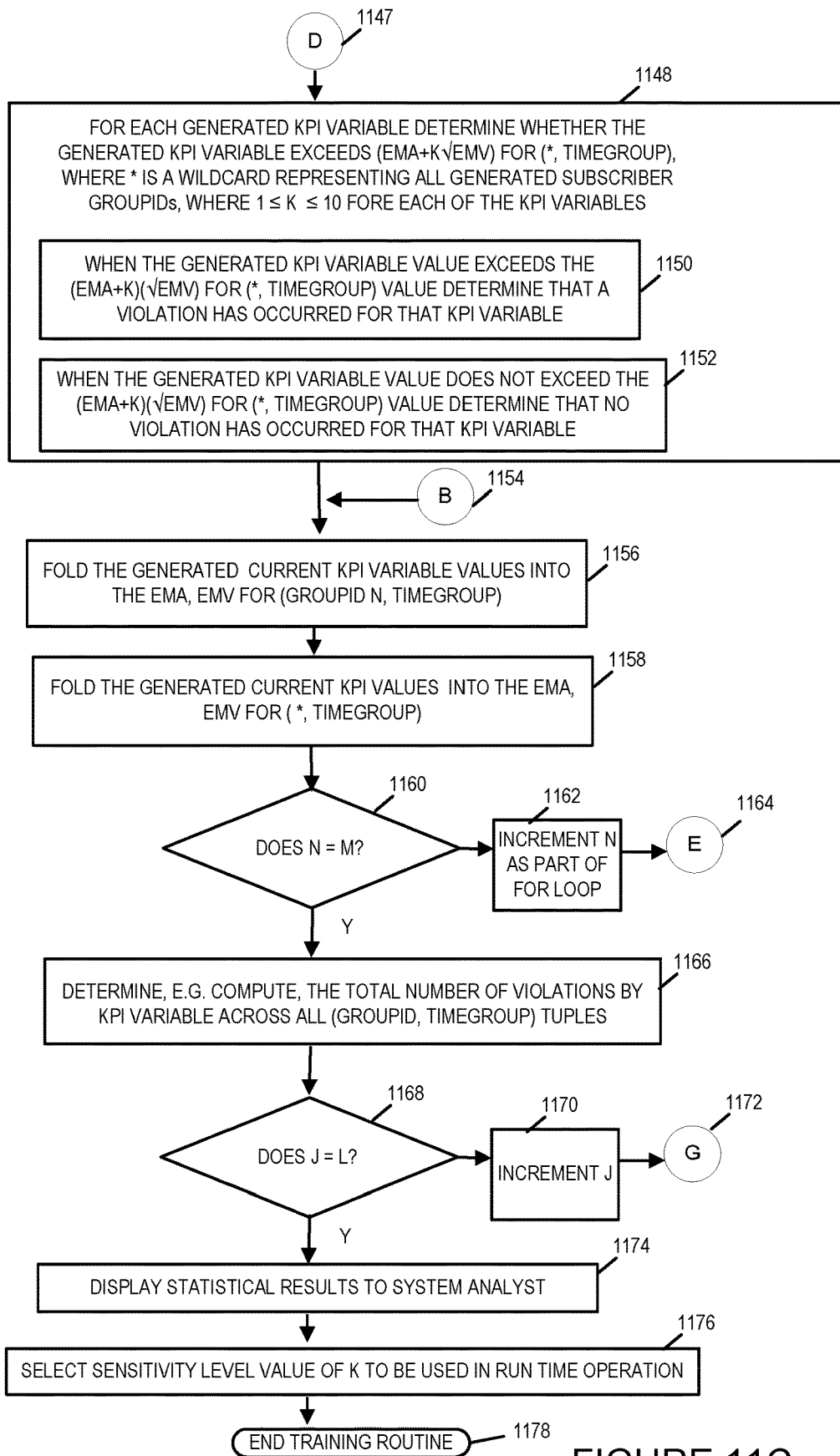
FIG. 11C illustrates a third part of a flowchart of a training routine in accordance with one embodiment of the present invention.

FIG. 11 comprises FIGS. 11A, 11B and 11C. FIG. 11A illustrates the first part of a flowchart of a training routine in accordance with one embodiment of the present invention. FIG. 11B illustrates the second part of a training routine in accordance with one embodiment of the present invention. FIG. 11C illustrates a third part of a flowchart of a training routine in accordance with one embodiment of the present invention. The method 1100 may be implemented on various systems including the exemplary systems described in FIGS. 1, 4, 5, and 8.

The subscriber group sentry training routine starts in start step 1102. Operation proceeds from step 1102 to step 1104.

In step 1104, the subscriber sentry application receives and/or accesses historical call detail records of a customer, e.g. enterprise customer, telephony service provider, or network operator. This is the historical CDR datasheet which was generated and stored in a CDR database as discussed in connection with step 1004 of method 1000. Operation proceeds from step 1104 to step 1105.

In step 1105, the subscriber sentry application generates a subscriber group (*, timegroup) where * indicates the group's members include all subscriber groupids. In the example where there are two timegroups a "busy-hour" timegroup and a "off-hour timegroup) two subscriber groups are created (*, timegroup=busy hour) and (*, timegroup=off-hour). Operation proceeds from step 1105 to step 1106.

In step 1106, the subscriber sentry application divides up or apportions the CDRs of the received or accessed CDR dataset into L time interval periods. For example, if each time interval is 15 minutes and there are 30 days worth of CDRs then L will include CDRs for (30 days)(24 hours/day)(60 minutes/hour)(1 time interval/15 minutes)=2880 time intervals. The time interval of 15 minutes is only exemplary and other time intervals may be used. The time interval period is typically chosen to be the time interval period to be used during run time operation for monitoring of traffic anomalies. It is a short period of time during which calls are processed typically less than an hour. In step 1106, the subscriber sentry application also sets the variable counter J=1 for the first time interval. The variable J will be used in the start training routine to identify the time interval CDR data records be analyzed. Operation proceeds from step 1106 to step 1108.

In step 1108, the subscriber sentry application begins processing call detail records of the Jth time interval, e.g., 15 minutes worth of call detail records of the customer. In this first pass through the loop J=1 and this is the first time interval. Operation proceeds from step 1108 to step 1110.

In step 1110, the subscriber sentry application determines a timegroup corresponding to the Jth time interval based on one or more of the following: a starting time of the Jth time interval, a day of the week of the Jth time interval, and a holiday schedule. In some embodiments, the timegroup includes two groups a "busy-hour" timegroup and an "off-hour" timegroup. For example, when the subscriber sentry application is analyzing CDRs for an enterprise customer, the busy-hour timegroup includes time intervals with a starting time which occurs during 8 a.m. to 6 p.m. on Monday to Friday excluding holidays when the enterprise customer's business is in operation while the "off-hours" timegroup includes the rest of the time intervals. The off-hours timegroup would include time intervals with the starting time during when the business is closed such as for example 6:01 p.m. to 7:59 a.m. on Monday to Friday, any time on Saturday, Sunday or holidays. While in the exemplary embodiment, two timegroups are used, in some embodiments more than two timegroups are used or the manner of the grouping of time intervals to timegroup may be different. In one such embodiment three timegroups are used, "work hours", "non-work hours", and "holiday hours". The interval time period may, and in some embodiments is, selected so that the start time of each time interval of CDR records to be analyzed occurs so that all CDRs within the interval are in the same timegroup, i.e., each time interval includes CDRs from the same timegroup. Operation proceeds from step 1110 to step 1112.

In step 1112, a for loop is initiated for processing each call record in the J time interval. Operation proceeds from step 1112 to step 1114.

In step 1114, the subscriber sentry application processes the next call record of said customer in the Jth interval to identify, determine, and/or extract subscriber numbers by matching a called number then a called number from the next call record to a configured subscriber numbering plan regular expression (REGEX) pattern. Operation proceeds from step 1114 to decision step 1116.

In decision step 1116, if the extracted calling subscriber number or the extracted called subscriber number is a known subscriber number then operation proceeds to step 1120 otherwise operation proceeds to step 1118. When the customer is an enterprise the subscriber numbers are the public numbers associated with the members, i.e., subscribers, of the enterprise. When the customer is a telephony network operator or network provider, the subscriber numbers are the telephone line numbers provided by the carrier to the subscriber. In the exemplary embodiment, the subscriber numbers can often be recognized by a pattern match. Taking for example the case where the customer is an enterprise, it is possible for a single call to match two subscribers, i.e., both the caller and called parties are subscribers. In such a case, the metrics associated with the call would be counted as an egress call metric for the calling subscriber and an ingress call metric for the called subscriber. For a call from a subscriber to a non-enterprise party, then the call would be counted once as egress metric for the subscriber identified by the calling party number. Similarly, for a call to a subscriber from a non-enterprise party, the call would be counted once as an ingress metric for the subscriber identified by the called party number. In the case in which the customer is a telephony service provider or network operator, e.g., a carrier, the same logic applies. However, the method of identifying subscribers sometimes differs than that used for enterprise customers. In such cases, the subscriber numbers are typically identified via a database merge against the telephone service provider or network operator's subscriber database. Additionally, when the calling party is a subscriber, the telephony service provider or network operator will typically assert the calling identity through P-Asserted-ID when Session Initiation Protocol (SIP) is used or other related signaling information.

In step 1118, when there is no match for the extracted calling or called number to a subscriber number, i.e., the call record relates to unknown subscribers, the subscriber sentry application disregards the call record. Operation proceeds from step 1118 to step 1124.

In step 1120, the subscriber sentry application determines and/or generates a groupid for each of the identified/determined/extracted subscriber numbers. For example, if the calling number of the call record is matched to a subscriber number then a groupid for the matched subscriber calling number is determined/generated and if a called number of the call record is matched to a subscriber number then a groupid for the matched subscriber called number is determined/generated. In some embodiments, step 1120 includes sub-step 1122. In sub-step 1122 the subscriber sentry application determine or generates the subscriber groupid using a hash function, e.g., a Fowler_Noll-Vo hash function. In one embodiment the hash of the identified/determined/extracted subscriber telephone number or a portion of it is used as the groupid. In another embodiment, the subscriber sentry application uses the return value of the hash function to perform bucketing to safe guard the application with defined capacity by restricting the value to a particular range. In some embodiments, a valid range is achieved by using an expression that includes ABS( ) function and the % (module) operator. For example, to produce a hash value in the range of 0-999,999, the expression ABS(FNV_HASH(X))% 100, 000 may be, and in some embodiments is used wherein the FNV_HASH is the Fowler-Noll_Vo hash function and X is the extracted/identified/determined subscriber telephone number or a portion of the subscriber telephone number. Operation proceeds from step 1120 to step 1124.

In decision step 1124, a determination is made by the subscriber sentry application as to whether there are additional customer call detail records to be processed in the Jth time interval. When the determination is that the there are additional call detail records to be processed operation returns to step 1114, wherein processing of the next call record proceeds as previously discussed. When the determination is that there are no additional customer call detail records to be processed operation proceeds via connection node A 1126 to step 1128 shown on FIG. 11B.

In step 1128 a for loop is initiated by the subscriber sentry application where N=1 to M, M being the number of subscriber groupids determined in the Jth time interval. Operation proceeds from step 1128 to step 1132.

In step 1132, the subscriber sentry application generates, e.g., computes, one or more subscriber Key Performance Indicator (KPI) variables for the (groupid N, timegroup) tuple for the (groupid N, timegroup) tuple using the information contained in the call detail records of the Jth time interval and wherein the groupid N is the Nth groupid. Where N is 1, the groupid N is the first of the 1 to M groupids. Operation proceeds from step 1132 to decision step 1134.

In decision step 1134, if an EMA, EMV exist for (groupid N, timegroup) then operation proceeds to decision step 1136 otherwise operation proceeds to step 1143.

In decision step 1136, the subscriber sentry application determines whether the EMA, EMV for (groupid N, timegroup) covers at least a predetermined number samples, in the example, the predetermined number of samples is 10. When it is determined that the (groupid N, timegroup) covers at least 10 samples operation proceeds from step 1136 to step 1138. When it is determined that the (groupid N, timegroup) does not cover at least 10 samples operation proceeds to decision step 1146.

In step 1138, for each generated KPI variable value generated, the subscriber sentry application determines whether the KPI variable value exceeds (EMA+K$\sqrt{\text{EMV}}$) for (groupid N, timegroup, where $1 \leq K \leq 10$, K being a sensitivity value. While the range 1 to 10 has been used in this example other sensitivity ranges may be used such as for example $1 \leq K \leq 5$. Step 1138 includes sub-steps 1140 and 1142.

In sub-step 1140 when the generated KPI variable value generated exceeds the (EMA+K$\sqrt{\text{EMV}}$) for (groupid N, timegroup) value, the subscriber sentry application determines that a violation has occurred for that KPI variable for (groupid N, timegroup) tuple. The count of the number of violations is increased by one for the KPI variable for the (groupid N, timegroup) tuple and stored in memory. Operation proceeds from step 1138 to decision step 1146.

In sub-step 1142 when the generated KPI variable value generated does not exceed the (EMA+K$\sqrt{\text{EMV}}$) for (groupid N, timegroup) value, the subscriber sentry application determines that a violation has not occurred for the KPI variable for (groupid N, timegroup) tuple. Operation proceeds from step 1138 to decision step 1146.

Returning to step 1134, when in step 1134, it is determined that the EMA, EMV does not exist for the (groupid N, timegroup) tuple operation proceeds from step 1134 to to step 1143 wherein the subscriber sentry application generates initial EMA and EMV for (groupid N, timegroup). Operation proceeds from step 1143 to decision step 1146.

In decision step 1146, the subscriber sentry application determines whether the EMA, EMV for (\*, timegroup) covers at least a predetermined number of samples. In this example, the predetermined number of samples is 100. If the subscriber sentry application determines that the EMA, EMV for (\*, timegroup) covers at least 100 samples then operation proceeds via connection node D 1147 to step 1148 shown on FIG. 11C. If the subscriber sentry application determines that the EMA, EMV for (\*, timegroup) does not cover at least 100 samples then operation proceeds from step 1146 via connection node B 1154 to step 1156 shown on FIG. 11C.

In step 1148, for each generated KPI variable value the subscriber sentry application determines whether the generated KPI variable value exceeds the (EMA+K$\sqrt{\text{EMV}}$) for (\*, timegroup) value where \* is a wildcard representing all generated subscriber groupids and where $1 \leq K \leq 10$, K being a sensitivity level value. While the range 1 to 10 has been used in this example other sensitivity ranges may be used such as for example $1 \leq K \leq 5$. Step 1148 includes sub-steps 1150 and 1152.

In sub-step 1150 when the generated KPI variable value generated exceeds the (EMA+K$\sqrt{\text{EMV}}$) for (\*, timegroup) value, the subscriber sentry application determines that a violation has occurred for that KPI variable for (\*, timegroup) tuple. The count of the number of violations is increased by one for the KPI variable for the (\*, timegroup) tuple and stored in memory. Operation proceeds from step 1148 to decision step 1156.

In sub-step 1152 when the generated KPI variable value generated does not exceed the (EMA+K$\sqrt{\text{EMV}}$) for (\*, timegroup) value, the subscriber sentry application determines that a violation has not occurred for the KPI variable for (\*, timegroup) tuple. Operation proceeds from step 1148 to step 1156.

In step 1156, the subscriber sentry application folds the generated current KPI variable values into the EMA, EMV for (groupid N, timegroup), e.g., it re-generates or re-computes the EMA, EMV values for (groupid N, timegroup) using the determined KPI variable values and previously generated EMA, EMV values for (groupid N, timegroup). Operation proceeds from step 1156 to step 1158.

In step 1158, the subscriber sentry application folds the generated current KPI variable values into the EMA, EMV for (\*, timegroup), e.g., it re-generates or re-computes the EMA, EMV values for (\*, timegroup) using the determined KPI variable values and previously generated EMA, EMV values for (\*, timegroup). Operation proceeds from step 1158 to decision step 1160.

In decision step 1160, the subscriber sentry application determines if N=M to determine whether there are additional subscriber groupids. If N does not equal M then there are additional subscriber groupids and operation proceeds from step 1160 to step 1162. In step 1162, N is incremented by one as part of the for loop for N=1 to M. Operation proceeds from step 1162 via connection node E 1164 to step 1132 shown on FIG. 11B where processing continues with respect to the (groupid N, timegroup) as previously described. If in decision step 1160, the subscriber sentry application determines that the N=M then there are no additional subscriber groupids to be processed and operation proceeds from step 1160 to step 1166.

In step 1166, the subscriber sentry application determines, e.g., computes, the total number of violations by KPI variable across all (groupid, timegroup) tuples. Operation proceeds from step 1166 to decision step 1168.

In decision step 1168, the subscriber sentry application determines that if J does not equal L, then there are additional time interval period CDRs to be processed. Operation proceeds from step 1168 to step 1170 wherein J is incremented by one. Operation proceeds from step 1170 via connection node G 1172 to step 1108 shown on FIG. 11A wherein operation proceeds as previously described. In decision step 1168 if it is determined that J=L then there no addition time interval period CDRs that have not been processed and operation proceeds from step 1168 to step 1174.

In step 1174, the subscriber sentry application displays statistical results determined from the training routine to an analyst. The subscriber sentry application also stores the statistical information determined from the training routine in memory so it is accessible for later use. Operation proceeds from step 1174 to step 1176.

In step 1176, the subscriber sentry application selects a sensitivity level value of K to be used during run time operation. The sensitivity level value is selected so that the number of detected traffic anomalies displayed/alarmed during a 24 period does not overwhelm the operator or analyst. In one embodiment, a sensitivity level of K is chosen which results in less than 10 traffic anomalies being reported via audible or visual alarms or reports occur in a 24 hour. The sensitivity level K is also configurable such that the analyst can adjust the value of K from the selected value to another value which the analyst determines to be more suitable. Operation proceeds from step 1176 to end training routine step 1178.

When the training route ends, the sensitivity level value K to be used during the run time operation has been determined and the starting EMA, EMV values have been determined to be used during the run time operation have also been determined and are passed back to the method 1000.

Returning to the method 1000 step 1006 shown on FIG. 10A upon the completion of the training routine, operation proceeds from step 1006 to step 1008. The run time method operation of subscriber sentry application is similar to the training routine but occurs with respect to the CDRs for a single time period.

In step 1008, the subscriber sentry application receives and/or accesses call detail records of a customer, e.g. enterprise customer, telephony service provider, or network operator, for a prior time interval period, e.g., the last 15 minutes of call detail records. The CDRs were generated and stored in a CDR database for access by the subscriber sentry application or provided directly to the subscriber sentry application by the call or session processing node which in this example is an SBC. This time interval period used for monitoring of traffic anomalies is typically the same as time interval period used for training run time operation. However, the time interval period may be, and is, changeable so that other time interval periods other than the time interval period used in the training routine may be used. Operation proceeds from step 1008 to step 1010.

In step 1110, the subscriber sentry application determines a timegroup corresponding to the prior time interval period of the received or accessed CDRs based on one or more of the following: a starting time of the prior time interval, a day of the week of the prior time interval, and a holiday schedule. The time interval of the CDRs is referred to as a prior time interval because the call processing device generated the CDRs in the prior time interval period from the current time interval period in which the CDRs are being processed in the exemplary embodiment. The process is continuous wherein each prior time interval is processed as the current time interval call detail records are being generated. This results in dynamic monitoring of call traffic by the subscriber sentry application which is near real time with one time interval delay. In some embodiments including the exemplary embodiments as previously explained in connection with the training routine, the timegroup includes two groups a "busy-hour" timegroup and an "off-hour" timegroup. For example, when the subscriber sentry application is analyzing CDRs for an enterprise customer, the busy-hour timegroup includes time intervals with a starting time which occurs during 8 a.m. to 6 p.m. on Monday to Friday excluding holidays when the enterprise customer's business is in operation while the "off-hours" timegroup includes the rest of the time intervals. The off-hours timegroup would include time intervals with the starting time during when the business is closed such as for example 6:01 p.m. to 7:59 a.m. on Monday to Friday, any time on Saturday, Sunday or holidays. While in the exemplary embodiment, two timegroups are used, in some embodiments more than two timegroups are used or the manner of the grouping of time intervals to timegroup may be different. In one such embodiment three timegroups are used, "work hours", "non-work hours", and "holiday hours". The interval time period may, and in some embodiments is, selected so that the start time of each time interval of CDR records to be analyzed occurs so that all CDRs within the interval are in the same timegroup, i.e., each time interval includes CDRs from the same timegroup. Operation proceeds from step 1010 to step 1012.

In step 1012, a for loop is initiated for processing each call record in the prior time interval. Operation proceeds from step 1012 to step 1014.

In step 1014, the subscriber sentry application processes the next call record of said customer in the prior time interval to identify, determine, and/or extract subscriber numbers by matching a called number then a called number from the next call record to a configured subscriber numbering plan regular expression (REGEX) pattern. Operation proceeds from step 1014 to decision step 1016.

In decision step 1016, if the extracted calling subscriber number or the extracted called subscriber number is a known subscriber number then operation proceeds to step 1020 otherwise operation proceeds to step 1018. Also as previously explained in connection with the training routine 1100, when the customer is an enterprise the subscriber numbers are the public numbers associated with the members, i.e., subscribers, of the enterprise. When the customer is a telephony network operator or network provider, the subscriber numbers are the telephone line numbers provided by the carrier to the subscriber. In the exemplary embodiment, the subscriber numbers can often be recognized by a pattern match. Taking for example the case where the customer is an enterprise, it is possible for a single call to match two subscribers, i.e., both the caller and called parties are subscribers. In such a case, the metrics associated with the call would be counted as an egress call metric for the calling subscriber and an ingress call metric for the called subscriber. For a call from a subscriber to a non-enterprise party, then the call would be counted once as egress metric for the subscriber identified by the calling party number. Similarly, for a call to a subscriber from a non-enterprise party, the call would be counted once as an ingress metric for the subscriber identified by the called party number. In the case in which the customer is a telephony service provider or network operator, e.g., a carrier, the same logic applies. However, the method of identifying subscribers sometimes differs than that used for enterprise customers. In such cases, the subscriber numbers are typically identified via a database merge against the telephone service provider or network operator's subscriber database. Additionally, when the calling party is a subscriber, the telephony service provider or network operator will typically assert the calling identity through P-Asserted-ID when Session Initiation Protocol (SIP) is used or other related signaling information.

In step 1018, when there is no match for the extracted calling or called number to a subscriber number, i.e., the call record relates to unknown subscribers, the subscriber sentry application disregards the call record. Operation proceeds from step 1018 to step 1024.

In step 1020, the subscriber sentry application determines and/or generates a groupid for each of the identified/determined/extracted subscriber numbers. For example, if the calling number of the call record is matched to a subscriber number then a groupid for the matched subscriber calling number is determined/generated and if a called number of the call record is matched to a subscriber number then a groupid for the matched subscriber called number is determined/generated. In some embodiments, step 1020 includes sub-step 1022. In sub-step 1022 the subscriber sentry application determines or generates the subscriber groupid using a hash function, e.g., a Fowler_Noll-Vo hash function. In one embodiment the hash of the identified/determined/extracted subscriber telephone number or a portion of it is used as the groupid. In another embodiment, the subscriber sentry application uses the return value of the hash function to perform bucketing to safe guard the application with defined capacity by restricting the value to a particular range. In some embodiments, a valid range is achieved by using an expression that includes ABS( ) function and the % (module) operator. For example, to produce a hash value in the range of 0-999,999, the expression ABS(FNV_HASH (X))% 100,000 may be, and in some embodiments is used wherein the FNV_HASH is the Fowler-Noll_Vo hash function and X is the extracted/identified/determined subscriber telephone number or a portion of the subscriber telephone number. Operation proceeds from step 1020 to step 1024.

In decision step 1024, a determination is made by the subscriber sentry application as to whether there are additional customer call detail records to be processed in the prior time interval. When the determination is that the there are additional call detail records to be processed operation returns to step 1014, wherein processing of the next call record proceeds as previously discussed. When the determination is that there are no additional customer call detail records to be processed operation proceeds via connection node A 1026 to step 1028 shown on FIG. 10B.

In step 1028 a for loop is initiated by the subscriber sentry application where N=1 to M, M being the number of subscriber groupids determined in the previous time interval. Operation proceeds from step 1028 to step 1032.

In step 1032, the subscriber sentry application generates, e.g., computes, one or more subscriber Key Performance Indicator (KPI) variables for the (groupid N, timegroup) tuple for the (groupid N, timegroup) tuple using the information contained in the call detail records of the previous time interval and wherein the groupid N is the Nth groupid. Where N is 1, the groupid N is the first of the 1 to M groupids. Operation proceeds from step 1032 to decision step 1034.

In decision step 1034, if an EMA, EMV exist for (groupid N, timegroup) then operation proceeds to decision step 1036 otherwise operation proceeds to step 1043.

In decision step 1036, the subscriber sentry application determines whether the EMA, EMV for (groupid N, timegroup) covers at least a predetermined number samples, in the example, the predetermined number of samples is 10. The predetermined number of samples is used to ensure that a sufficient number of samples has been processed before determining whether the KPI variables are valid and/or useful for use in determining violations. When it is determined that the (groupid N, timegroup) covers at least 10 samples operation proceeds from step 1036 to step 1038. When it is determined that the (groupid N, timegroup) does not cover at least 10 samples operation proceeds to decision step 1044.

In step 1038, for each generated KPI variable value generated, the subscriber sentry application determines whether the KPI variable value exceeds
(EMA+K√EMV) for (groupid N, timegroup), where K is a predetermined sensitivity threshold value in the range 1≤K≤10 determined during the training routine. While the threshold value range of 1 to 10 has been used in this example other sensitivity ranges may be used such as for example 1≤K≤5. Unlike in the training routine the KPI variable is checked to see if it exceeds the (EMA+K√EMV) for (groupid N, timegroup) for a specific K sensitivity threshold value selected during the training routine or configured by the analyst after the training routine. Step 1038 includes sub-steps 1040 and 1042.

In sub-step 1140 when the generated KPI variable value generated exceeds the (EMA+K√EMV) for (groupid N, timegroup) value, the subscriber sentry application determines that a violation has occurred for that KPI variable for (groupid N, timegroup) tuple. The count of the number of violations is increased by one for the KPI variable for the (groupid N, timegroup) tuple and stored in memory. Operation proceeds from step 1038 to decision step 1044.

In sub-step 1142 when the generated KPI variable value generated does not exceed the (EMA+K√EMV) for (groupid N, timegroup) value, the subscriber sentry application determines that a violation has not occurred for the KPI variable for (groupid N, timegroup) tuple. Operation proceeds from step 1038 to decision step 1046.

Returning to step 1034, when in step 1034, it is determined that the EMA, EMV does not exist for the (groupid N, timegroup) tuple operation proceeds from step 1034 to step 1043 wherein the subscriber sentry application generates initial EMA and EMV for (groupid N, timegroup). Operation proceeds from step 1043 to decision step 1046.

In decision step 1046, the subscriber sentry application determines whether the EMA, EMV for (*, timegroup) covers at least a predetermined number of samples. In this example, the predetermined number of samples is 100. The predetermined number of samples is a sufficient number of samples so that the value is valid and/or useful as a representative of the traffic and can therefore be used to determine violations. If the subscriber sentry application determines that the EMA, EMV for (*, timegroup) covers at least 100 samples then operation proceeds via connection node D 1047 to step 1048 shown on FIG. 11C. If the subscriber sentry application determines that the EMA, EMV for (*, timegroup) does not cover at least 100 samples then operation proceeds from step 1046 via connection node B 1054 to step 1056 shown on FIG. 11C.

In step 1048, for each generated KPI variable value the subscriber sentry application determines whether the generated KPI variable value exceeds the (EMA+K√EMV) for (*, timegroup) value where * is a wildcard representing all generated subscriber groupids and where K is a predetermined sensitivity level value in the range 1≤K≤10. While the range 1 to 10 has been used in this example other sensitivity ranges may be used such as for example 1≤K≤5. The K sensitivity value is the same value used in step 1038 and was selected during the training routine or thereafter by the analyst. Unlike in the training routine in step 1048 only the predetermined value of K is utilized. Step 1048 includes sub-steps 1050 and 1052.

In sub-step 1050 when the generated KPI variable value generated exceeds the (EMA+K√EMV) for (*, timegroup) value, the subscriber sentry application determines that a violation has occurred for that KPI variable for (*, timegroup) tuple. The count of the number of violations is increased by one for the KPI variable for the (*, timegroup) tuple and stored in memory. Operation proceeds from step 1048 to decision step 1056.

In sub-step 1052 when the generated KPI variable value generated does not exceed the (EMA+K√EMV) for (*, timegroup) value, the subscriber sentry application determines that a violation has not occurred for the KPI variable for (*, timegroup) tuple. Operation proceeds from step 1048 to decision step 1056.

In step 1056, the subscriber sentry application folds the generated current KPI variable values into the EMA, EMV for (groupid N, timegroup), e.g., it re-generates or re-computes the EMA, EMV values for (groupid N, timegroup) using the determined KPI variable values and previously generated EMA, EMV values for (groupid N, timegroup). Operation proceeds from step 1056 to step 1058.

In step 1058, the subscriber sentry application folds the generated current KPI variable values into the EMA, EMV for (*, timegroup), e.g., it re-generates or re-computes the EMA, EMV values for (*, timegroup) using the determined KPI variable values and previously generated EMA, EMV values for (*, timegroup). Operation proceeds from step 1058 to decision step 1060.

In decision step 1060, the subscriber sentry application determines if N=M to determine whether there are additional subscriber groupids. If N does not equal M then there are additional subscriber groupids and operation proceeds from step 1060 to step 1062. In step 1062, N is incremented by one as part of the for loop for N=1 to M. Operation proceeds from step 1062 via connection node E 1064 to step 1032 shown on FIG. 10B where processing continues with respect to the (groupid N, timegroup) as previously described. If in decision step 1060, the subscriber sentry application determines that the N=M then there are no additional subscriber groupids to be processed and operation proceeds from step 1060 to step 1068.

In step 1068, the subscriber sentry application determines whether for each generated groupid determined to have a KPI violation whether that groupid is already being tracked. Operation proceeds from step 1068 to step 1072 shown on FIG. 10D via connection node F 1070.

In step 1072, for each groupid determined to have a KPI violation and which is not being tracked, the subscriber sentry application creates a control block or control record. Operation proceeds from step 1072 to step 1074.

In step 1074 the subscriber sentry application determines the subscriber numbers that are part of each groupid determined to have a KPI violation. This may be achieved through a memory look up wherein the groupid corresponding to each subscriber may be stored when the subscribe number is used to generate the groupid. Sub-step 1074 includes sub-step 1076. In sub-step 1076 when the groupid represents multiple subscriber numbers the subscriber sentry application identifies the smallest set of subscriber numbers comprising the aggregate majority of the metric in the last interval. Operation proceeds from step 1074 to step 1080.

In step 1080, the subscriber sentry application determines a severity incident and level for each determined groupid KPI violation. Sub-step 1080 includes sub-steps 1082, 1084 and 1086.

In sub-step 1082, the subscriber sentry application raises a low severity incident level to the incident manager for an initial violation, e.g., the subscriber reports or notifies the incident manager that an initial violation has occurred via text report or notification, an audio alarm and/or visual alarm.

In sub-step 1084, the subscriber sentry application elevates the severity incident level to the incident manager if this is an additional groupid KPI violation.

In sub-step 1086, when the severity incident level exceeds a threshold value the subscriber sentry application causes or controls the system to undertake an anomaly mitigation action or operation, e.g., implement a mitigation policy rule that operates to give calls to or from subscriber numbers in the subscriber group with the groupid in violation lower priority than calls to or from subscriber numbers not in the subscriber group with the groupid having a KPI violation. Operation proceeds from step 1080 to step 1088.

In step 1088, if a groupid is not in violation in the last interval, then the subscriber sentry application reduces the severity level and updates the incident manager. When the severity level becomes zero subscriber sentry application stops tracking the violation and deletes the tracking control block or control record.

Operation proceeds from step 1088 via connection node G 1090 to step 1008 where the subscriber sentry application receives call details records of the customer for a prior time interval which is now the subsequent 15 minutes of call details records from the time interval records that were just processed. Operation then continues as previously described for each subsequent time interval.

The subscriber sentry application may be implemented on a virtual machine on a compute node including at least one processor and memory. The subscriber sentry application may be implemented as a computing device in accordance with the computing device/node 600 illustrated in FIG. 6.

The method 1000 allows for the tracking of only a small subset of the overall set of subscriber numbers in a constrained or bounded manner by grouping subscriber numbers using hashing which compacts the mapping space required and results in the complete predictability of the maximum number of separate instance entries to be handled by the system.

Table 1200 shown in FIG. 12 illustrates how EMA and EMV for KPI BIDs and STOPs are generated, recorded/saved, and updated as the system continuously processes CDRs on a periodic basis.

In the determining the EMA and EMV values shown in table 1200:

alpha=0.02439 (based on 40 hours window size: 1/41)

delta=current KPI value−previous KPI EMA

KPI EMA=previous KPI EMA+alpha*delta

KPI EMV=(1−alpha)*((previous KPI EMV)+(alpha*(delta)))

For the very first run, KPI EMA is recorded/stored with its current KPI value, and KPI EMV will be recorded/saved with a "0".

While FIGS. 10 and 11 have illustrated the steps for implementing an exemplary method of the invention with respect to a subscriber group, the same steps with different keys can be used to implement the invention with respect to other groupings including for example called destination groups, ingress and egress trunk groups, destination country codes, and ingress and egress IP signaling networks.

Figure 13A:
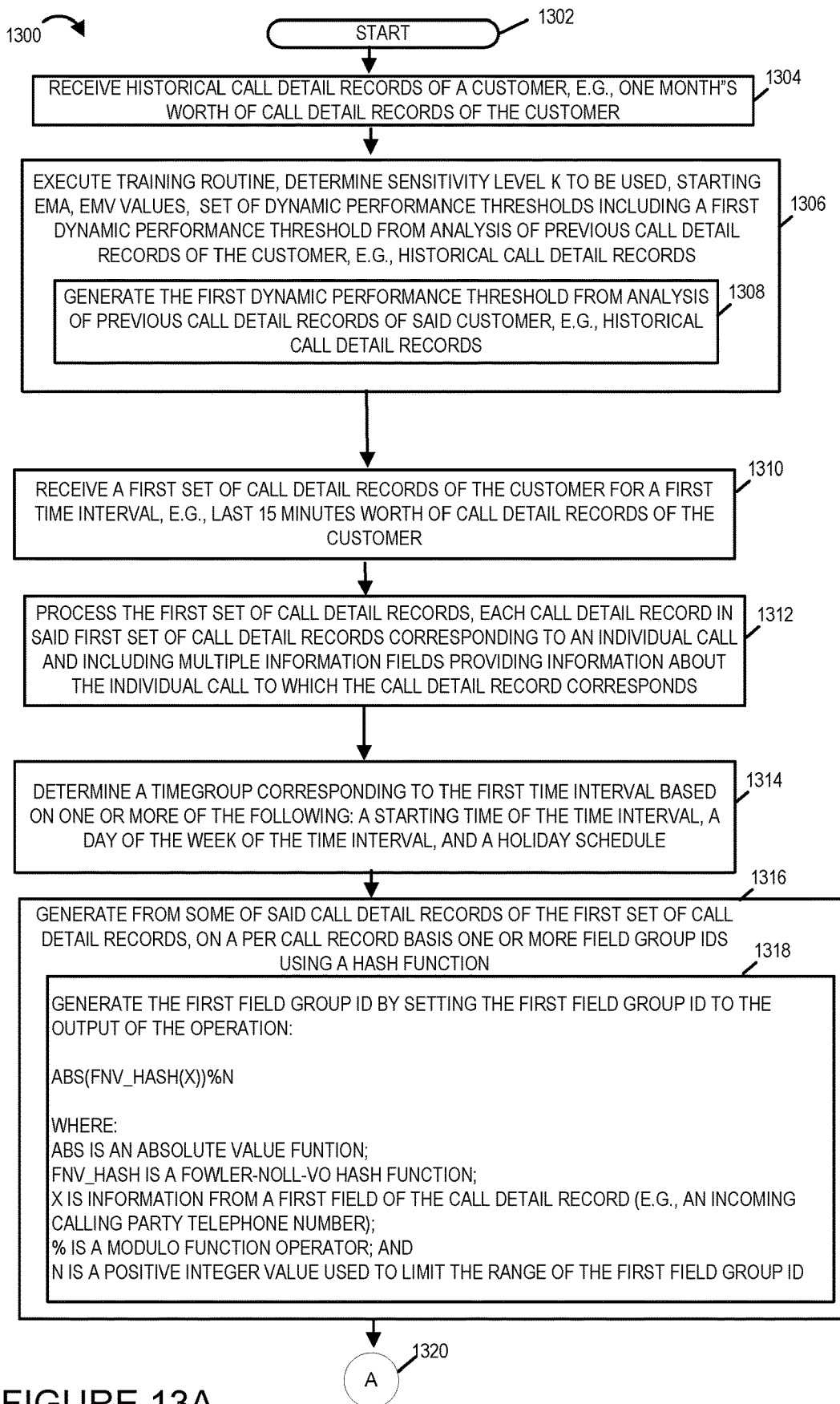
FIG. 13A illustrates the first part of a flowchart of a method in accordance with one embodiment of the present invention.
Figure 13C:
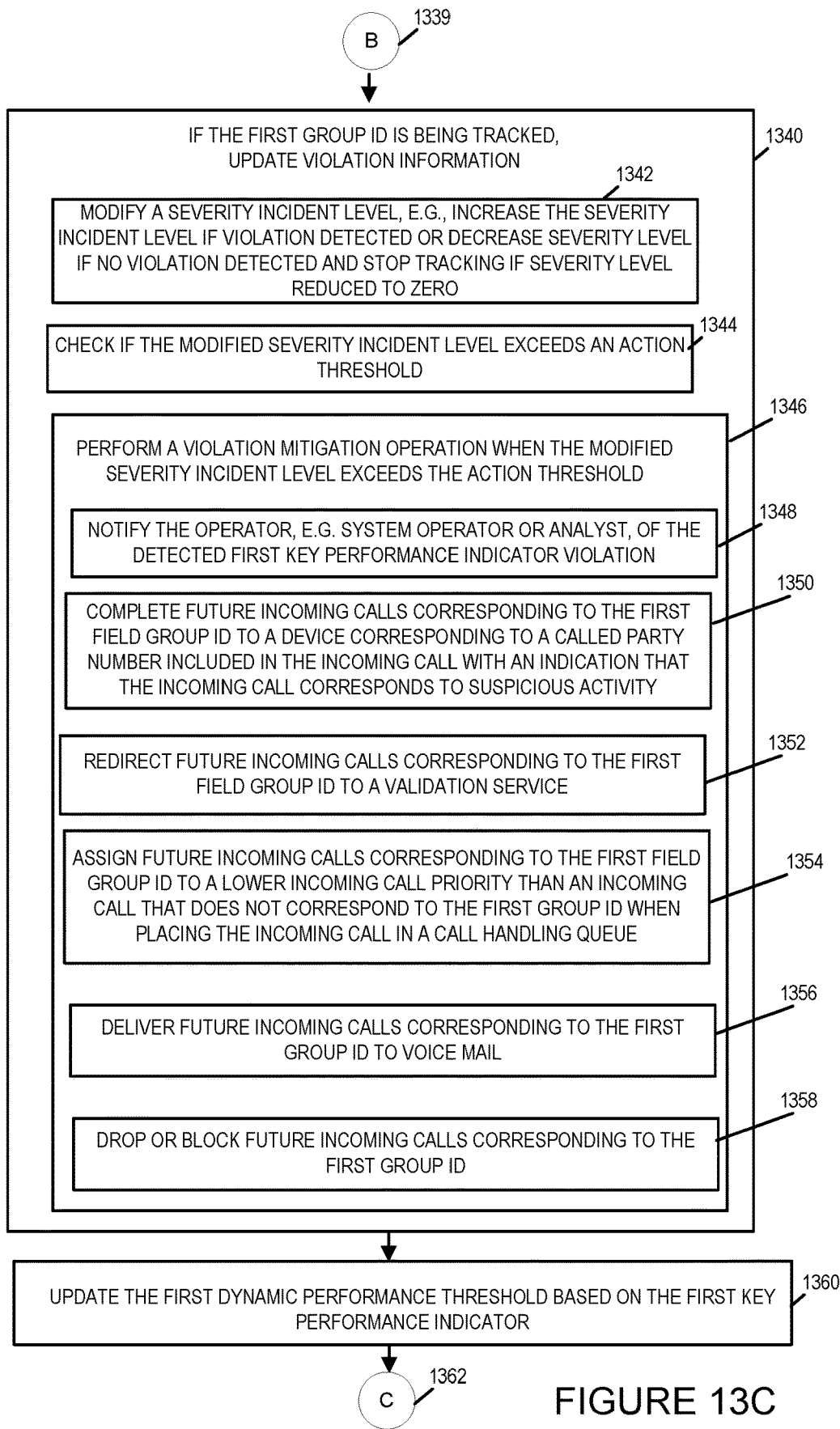
FIG. 13C illustrates a third part of a flowchart of a method in accordance with one embodiment of the present invention.
Figure 13D:
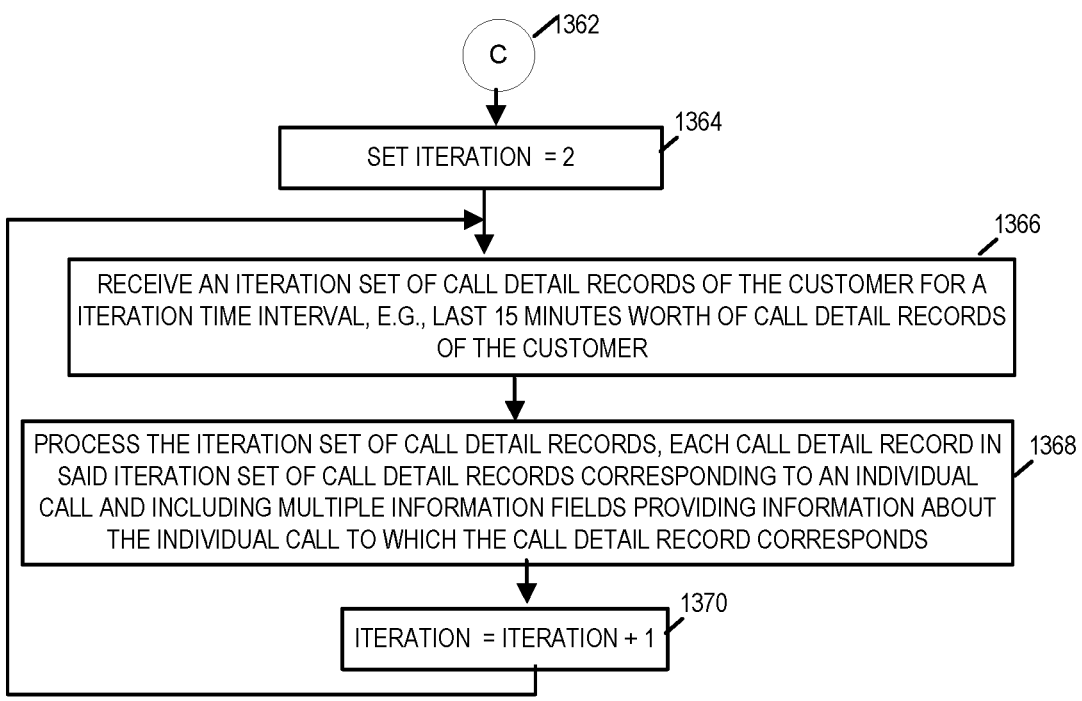
FIG. 13D illustrates a fourth part of a flowchart of a method in accordance with one embodiment of the present invention.

FIG. 13 comprises FIGS. 13A, 13B, 13C and 13D. FIG. 13 illustrates a flowchart of another exemplary method embodiment 1300 in accordance with the present invention. FIG. 13A illustrates the first part of a flowchart of an exemplary method in accordance with one embodiment of the present invention. FIG. 13B illustrates the second part of a flowchart of the exemplary method in accordance with one embodiment of the present invention. FIG. 13C illustrates a third part of a flowchart of a method in accordance with one embodiment of the present invention. FIG. 13D illustrates a fourth part of a flowchart of a method in accordance with one embodiment of the present invention. The flowchart shown in FIG. 13 illustrates the steps of an exemplary method embodiment with respect to monitoring a field group for traffic anomalies and/or for undertaking mitigation operations when a traffic anomaly is detected. The method 1300 may be implemented on one or more of the exemplary systems and using he exemplary nodes illustrated in the FIGS. 1, 2, 3, 4, 5, 8 and/or with the devices/nodes illustrated in FIG. 6.

The method 1300 begins in start 1302. Operation proceeds from start step 1302 to step 1304.

In step 1304, the field group sentry node receives historical call detail records of a customer, e.g., at least one month's work of call detail records of the customer. Operation proceeds from step 1304 to step 1306. The field group sentry node may be a node in the context engine 106.

In step 1306, the field group sentry node executes a training routine. During the training routine the field group sentry node determines a sensitivity level K to be used during run time operation, starting EMA and EMV values for a first set of key performance indicators, a set of dynamic performance thresholds corresponding to key performance indicators including a first dynamic performance threshold from analysis of previous call detail records of the customer, e.g., the received historical call detail records. In some embodiments, the customer is an enterprise customer while in other embodiments the customer is network operator or carrier. In some embodiments step 1306, includes sub-step 1308.

In sub-step 1308, the field group sentry node generates the first dynamic performance threshold from analysis of previous call detail records of the customer, e.g., the historical call detail records received in step 1304. Operation proceeds from step 1306 to step 1310.

In step 1310, the field group sentry node receives a first set of call detail records of the customer for a first time interval, e.g., the last 15 minutes worth of call detail records of the customer. The first set of call detail records may be, and typically is, generated by an enforcing sensor device (e.g., enforcer sensor devices 218 of FIG. 1) such as a session border controller, telephony switch, or PBX through which call traffic is processed, e.g., Voice Over Internet Protocol (VOIP) calls. The first set of call detail records may be provided directly to the field sentry node or stored in a call detail records database system such as for example analytics database system 108 illustrated in FIG. 1 and provided to the field sentry node in response to a query request to the database system from the field sentry node. Operation proceeds from step 1310 to step 1312.

In step 1312, the field group sentry node processes the received first set of call detail records of the customer. Each call detail record in the first set of call detail records corresponding to an individual call and includes multiple information fields providing information about the individual call to which the call detail record corresponds. As part of the processing of the first set of call detail records, steps 1314, 1316, 1324, 1326, 1328, 1330, 1332, 1334, 1336, 1338, 1340, 1350, and 1370 are performed.

In step 1314, the field group sentry node determines a timegroup corresponding to the first time interval based on one or more of the following: a starting time of the time interval, a day of the week of the time interval, and a holiday schedule. The starting time of the time interval and the day of the week of the time interval may be based on time and date information included in or derived from the first set of call detail records. In some embodiments, the start time and the day of the week of the time interval are based on information contained in or derived from the first oldest call record in the first set of call records. In some embodiments, there are two timegroups a busy hour timegroup and off hour timegroup as previously discussed in connection with the method 1000. Operation proceeds from step 1314 to step 1316.

In step 1316, the field group sentry generates from some of the call detail records of the first set of call detail records, on a per call record basis one or more filed group IDs (identifiers) using a hash function. In some embodiments, a mapping of the generated field group ID to a subscriber telephone number is also stored in memory so that when mitigation operations are undertaken the subscriber telephone numbers corresponding to the field group ID are known and can be provided to or made available to an enforcement node or device e.g., via a database lookup. In some embodiments, a mapping of the field group ID to a subscriber telephone number is not stored in memory. In some of said embodiments, an enforcement node or device implements mitigation operations on an incoming or outgoing call by determining whether the call is subject to mitigation operations by generating at least one field group ID in the same or a similar way to which the field group sentry generated the field group ID(s) for a call. In some embodiments, the step 1316 includes sub-step 1318.

In sub-step 1318, the field group sentry generates the first field group ID by by setting the first field group ID to the output of the operation:

$$\text{ABS}(\text{FNV\_HASH}(X))\% N$$

where:
ABS is an absolute value function;
FNV_HASH is a Fowler-Noll-Vo hash function;
X is information from a first field of the call detail record (e.g., an incoming calling party telephone number);
% is a modulo function operator; and
N is a positive integer value used to limit the range of the first Field Group ID.

It is to be understood that while the Fowler-Noll-Vo hash function has utilized it is only exemplary and hash functions with similar properties may also be used. Operation proceeds from step 1318 to step 1324 shown on FIG. 13B via connection node A 1320.

In step 1324, the field group sentry generates for call detail records corresponding to a first field group ID a first set of key performance indicators, said first set of key performance indicators including one or more key performance indicators corresponding to the first field group ID, the one or more of the key performance indicators including at least a first key performance indicator. In some embodiments, the set of key performance indicators further correspond to the timegroup determined in step 1314, that is the set of key performance indicators correspond to the (field group ID, timegroup) tuple. Operation proceeds from step 1324 to step 1326.

In step 1326, the field group sentry compares the first key performance indicator to a first dynamic performance threshold. Operation proceeds from step 1326 to step 1328.

In step 1328, the field group sentry determines that a first performance indicator violation has not occurred for the first field group ID when the first key performance indicator does not exceed the first dynamic performance threshold. Operation proceeds from step 1328 to step 1330.

In step 1330, the field group sentry determines that a first performance indicator violation has occurred for the first field group ID when the first key performance indicator exceeds the first dynamic performance threshold. Operation proceeds from step 1330 to step 1332.

In step 1332, the field group sentry in response to determining that a first key performance indicator violation has occurred for the first field group ID determines if the first field group ID is being tracked, e.g., for violation purposes. Operation proceeds from step 1332 to step 1334. For example, the field group sentry may determine that the first field group ID is not being tracked if no tracking record or control block exists for the first field group ID.

In step 1334, if the first field group ID is not being tracked the field group sentry initiates tracking of violations for the first field group ID. In some embodiments, step 1334 includes sub-steps 1336 and 1338.

In sub-step 1336, the field group sentry generates a violation incident tracking record with violation information, e.g., incident and corresponding first/lowest incident severity level rating.

In sub-step 1338, the field group sentry notifies an operator of the customer, e.g., system operator or analyst, of the incident violation, e.g., reporting the incident violation and severity level for the first field group ID. The notification may be in any number of manners such as for example, text message displayed, e-mail, text message, warning alarm, visual flashing light on control panel, audio alarm, or audio speech message. Operation proceeds from step 1334 to step 1340 shown on FIG. 13C via connection node B 1339.

In step 1340, if the first group ID is being tracked the field group sentry updates violation information for the first group ID, e.g., violation information stored in the violation records which may be stored in memory of the field group sentry or coupled to the field group sentry. In some embodiments, the step 1340 includes one or more of sub-steps 1342, 1344 and 1346.

In sub-step 1346, the field group sentry modifies a severity incident level. In sub-step 1344 the field group sentry checks if the modified severity incident level exceeds an action threshold.

In sub-step 1346, the field group sentry performs a violation mitigation operation when the modified severity incident level exceeds the action threshold. In some embodiments, the sub-step 1346 includes sub-steps 1348, 1350, 1352, 1354, 1356, and 1358.

In sub-step 1348, the field group sentry notifies the operator, e.g., system operator or analyst, of the detected first key performance indicator violation in one or more of the exemplary ways described in connection with step 1338.

In sub-step 1350, the call processing node, e.g., SBC, handling incoming calls to the customer, e.g., enterprise, completes future calls corresponding to the first field group ID to a device corresponding to the a called party number included in the incoming call with an indication that the incoming call corresponds to suspicious activity.

In sub-step 1352, the call processing node, e.g., SBC, handling incoming calls to the customer redirects future incoming calls corresponding to the first field group ID to a validation service.

In sub-step 1354, the call processing node, e.g., SBC, handling incoming calls to the customer assigns future incoming calls corresponding to the first field group ID to a lower incoming call priority than an incoming call that does not correspond to the first group ID when placing the future incoming call in a call handling queue.

In sub-step 1356, the call processing node, e.g., SBC, handling incoming calls to the customer delivers future incoming calls corresponding to the first group ID to voice mail service.

In sub-step 1358, the call processing node, e.g., SBC, handling incoming calls to the customer drops or blocks future incoming calls corresponding to the first group ID.

In some embodiments, mitigation operations are applied to outgoing calls. Exemplary mitigation operations which may be, and in some embodiments are, applied to outgoing calls include: restricting and/or blocking outgoing calls, e.g., toll calls, long distance calls, calls to foreign countries from subscriber numbers for which a mitigation operation has been determined or providing a lower priority service or Quality of Service, e.g., reducing the amount bandwidth, for outgoing calls from subscriber numbers for which a mitigation operation has been determined.

Each of steps 1350, 1352, 1354, 1356, and 1358 may be, and in some embodiments is, achieved by the field group sentry obtaining anomaly mitigation operation policy rules from a policy database, e.g., policy system database 104 and distributing the anomaly mitigation operation policy rules to the call processing node, e.g., SBC, which then enforces the anomaly mitigation operation policy rules. The call processing node may be either an enforcing node/device such as for example EP 1 116 or a node acting as both enforcement point and sensor such as ES 130. Each of the operations in steps 1348, 1350, 1352, 1354, 1356 and 1358 may be considered an anomaly mitigation operation policy rule which defines an anomaly mitigation operation to be performed. In some embodiments, the call processing node, e.g., SBC, determines which incoming or outgoing calls require anomaly mitigation call handling by determining if the incoming or outgoing call matches to a field group ID that has been designated for anomaly mitigation call handling. In some embodiments, the call processing device makes this determination by generating one or more field group IDs in the same or a similar way as the field group sentry and compares the result to a list of field group IDs provided that identify calls requiring mitigation call handling. In some embodiments, the call processing device extracts information from the incoming or outgoing call being processed, e.g., calling and/or called party telephone number, and performs a database look up in a database of calling and called party telephone numbers requiring mitigation call handling that is populated by the field group sentry. When a match occurs, a mitigation call handling operation is performed on the call. In some embodiments, the instructions for the mitigation call handling operation to be performed is associated with the calling or called telephone number in the database and is retrieved by the call processing node as part of the lookup. In some embodiments, a mitigation call handling operation identifier which identifies the mitigation call handling operation to be performed is associated with the calling or called telephone number in the database and is retrieved by the call processing node as part of the lookup. In some of these cases, the instructions for implementing the mitigation call handling operation for which identifiers are stored in the database are loaded onto or distributed to the call processing node in advance and therefore only the identifier is required by the call processing node to implement the mitigation call handling operation. Operation proceeds from step 1358 to step 1360.

In step 1360, the field group sentry updates the first dynamic performance threshold based on the first key performance indicator. Operation proceeds from step 1360 via connection node C 1362 to step 1364 shown on FIG. 13D.

In step 1364, an iteration variable is set to two. The iteration variable has been introduced to help explain that the process is repeated for additional iterations of processing of subsequently received sets of call detail records for subsequent time intervals, the time intervals typically being consecutive time intervals so that all call traffic is being analyzed. Operation proceeds from step 1364 to step 1366.

In step 1366, the field group sentry receives an iteration=2 or second set of call detail records of the customer for an iteration=2 or second time interval, e.g., last 15 minutes of call detail records of the customer. Operation proceeds from step 1366 to step 1368.

In step 1368, the field group sentry processes the iteration=2 or second set of call detail records, each call detail record in said iteration set of call detail records corresponding to an individual call and including multiple information fields providing information about the individual call to which the call detail record corresponds. As part of the processing of the iteration set of call detail records, steps 1314, 1316, 1324, 1326, 1328, 1330, 1332, 1334, 1336, 1338, 1340, 1350, and 1370 are performed wherein the iteration set of call detail records are utilized in place of the first set of call detail records and the iteration time interval is used in place of the first time interval. Operation proceeds from step 1368 to step 1370.

In step 1370 the iteration variable is incremented by 1. Operation proceeds from step 1370 back to step 1366 where the process continues.

Various additional features and/or aspects of different embodiments of the method 1300 will now be discussed. It should be appreciated that not necessarily all embodiments include the same features and some of the features described are not necessary but can be desirable in some embodiments.

In some embodiments, the first dynamic performance threshold is a threshold which was generated from analysis of previous call detail records of said customer.

In some embodiments, the method 1300 further includes as part of processing the first set of call detail records, excluding one or more individual call detail records that include calling party telephone numbers which are not assigned to the customer. For example, telephone numbers not assigned to an enterprise customer.

In some embodiments, the method 1300 further includes the step of the field group sentry generating the first dynamic performance threshold, said generating the first dynamic performance threshold including determining an exponentially weighted moving average (EMA) for the first key performance indicator corresponding to the first Field Group ID from said previous call detail records of said customer, e.g., the historical call detail records received in step 1304. In some such embodiments, the step of generating the first dynamic performance threshold further includes generating an exponentially weighted moving variance (EMV) for the first key performance indicator corresponding to the first Field Group ID from said previous call detail records of said customer. In some embodiments, the step of generating the first dynamic performance threshold further includes generating a sensitivity parameter which is a threshold number of standard deviations, said sensitivity parameter (SP) being based on the EMV and a predetermined sensitivity threshold value K. In some embodiments, the method 1300 step of generating the first dynamic performance metric includes performing the computation: $EMA+K\sqrt{EMV}$, where K is a constant positive integer, e.g., $1 \leq K \leq 10$.

In some embodiments, the customer is an enterprise customer and the step of processing call detail records of said customer is performed by the field group sentry on a periodic basis for calls to said enterprise customer, e.g., in intervals of every 15 minutes. In some embodiments, the periodicity of which the step of processing call detail records of the customer is dynamically configurable.

In some embodiments of the method 1300, the field group sentry node is a subscriber group sentry node and the field group ID is a subscriber group ID that is generated from information included in a call detail record's calling party number field and/or called party number field, the first Field Group ID being a first Subscriber Group Id generated from information in a call detail record's calling party number field, e.g., calling party telephone number or portion thereof and/or called party number field, e.g., called party telephone number or portion thereof.

In some such embodiments, the first set of key performance indicators for said first Subscriber Group Id include one or more of the following: (i) number of calls corresponding to the first Subscriber Group Id that were made in a given interval, (ii) number of completed or connected calls corresponding to the first Subscriber Group Id made in a given interval, (iii) minutes of usage from connected calls corresponding to the first Subscriber Group Id made in a given interval, (iv) number of calls corresponding to the first Subscriber Group Id received in a given interval, (v) number of completed or connected calls corresponding to the first Subscriber Group Id received in a given interval, (vi) minutes of usage from connected calls corresponding to the first Subscriber Group Id received in a given interval, (vii) number of calls corresponding to the first Subscriber Group Id made or received in a given interval, (viii) number of completed or connected calls made or received in a given interval corresponding to the first Subscriber Group Id, and (ix) minutes of usage from connected calls made or received in a given interval corresponding to the first Subscriber Group Id.

In some embodiments of the method 1300, the first set of call detail records of said customer correspond to a first time interval. The first time interval may be, and in some embodiments is, configurable or dynamically adjustable. In some embodiments, the first time interval is 15 minutes.

In some embodiments, the first set of key performance indicators of the first Field Group ID is for said determined timegroup; and the first dynamic performance threshold is also for said determined timegroup.

In some embodiments, the first set of call detail records correspond to a first time interval of said customer, said first time interval being 15 minutes and the previous call detail records of said customer correspond to at least one month of call detail records of said customer.

In some embodiments of the method 1300, the field group sentry node is a call destination sentry node, the first called destination group ID generated from information contained in a called party telephone number field of a call detail record, e.g., the called party telephone number or a portion of the called party telephone number. The first group ID is generated from a first called party telephone number or portion thereof in a called detail record. In some such embodiments, the key performance indicators are BIDS, STOPS and MOU. BIDS are the number of calls made toward a specific monitored destination, e.g., first called destination group ID, in a given time interval, e.g., first time interval. STOPS are the number of completed/connected calls made toward a specific monitored destination, e.g., first called destination group ID, in a given time interval, e.g., first time interval. MOU is the minutes of usage from connected calls made toward a specific monitored destination, e.g., first called destination group ID, in a given time interval, e.g., first time interval.

While the method 1300 illustrates the steps for a single field group sentry, typically multiple field group sentries are employed. For example, there may be and in some embodiment are field group sentries employed for monitoring subscriber number groups, called destination groups, ingress and egress trunk groups, destination country code groups, and ingress and egress IP signaling networks which are concurrently performing monitoring and implementing the steps of method 1300.

FIG. 7 as discussed above is a drawing illustrating an assembly of components 700 which may be included in an exemplary computing node or device 600 when implemented as a traffic monitoring node or device, e.g., traffic monitoring node or device 3100 of FIG. 8 implemented in accordance with exemplary embodiment component 600. Assembly of components 700 can be, and in some embodiments is, used in computing node 600. The components in the assembly of components 700 can, and in some embodiments are, implemented fully in hardware within the processor 606, e.g., as individual circuits. The components in the assembly of components 700 can, and in some embodiments are, implemented fully in hardware within the assembly of components 619, e.g., as individual circuits corresponding to the different components. In other embodiments some of the components are implemented, e.g., as circuits, within the processor 606 with other components being implemented, e.g., as circuits within assembly of components 619, external to and coupled to the processor 606. As should be appreciated the level of integration of components on the processor and/or with some components being external to the processor may be one of design choice. Alternatively, rather than being implemented as circuits, all or some of the components may be implemented in software and stored in the memory 610 of the computing node 600, with the components controlling operation of computing node 600 to implement the functions corresponding to the components when the components are executed by a processor, e.g., processor 606. In some such embodiments, the assembly of components 700 is included in the memory 610 as assembly of components 618. In still other embodiments, various components in assembly of components 700 are implemented as a combination of hardware and software, e.g., with another circuit external to the processor providing input to the processor 606 which then under software control operates to perform a portion of a component's function. While shown in the FIG. 6 embodiment as a single processor, e.g., computer, it should be appreciated that the processor 606 may be implemented as one or more processors, e.g., computers.

When implemented in software the components include code, which when executed by the processor 606, configure the processor 606 to implement the function corresponding to the component. In embodiments where the assembly of components 700 is stored in the memory 610, the memory 610 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the computing node or device 600 or elements therein such as the processor 606, to perform the functions of corresponding steps illustrated and/or described in the method of one or more of the flowcharts of FIG. 10, 11 or 13, and/or described with respect to any of the Figures. Thus the assembly of components 700 includes various components that perform functions of corresponding steps of one or more of FIGS. 1, 2, 3, 4, 5, 6, 9, 10, 11, 12 and 13.

Assembly of components 700 includes components 702, 704, 706, 708, 710, 712, 714, 716, 718, 720, 722, 724, 726, 730, 732. The control routines component 702 is configured to control the operation of the traffic monitoring node or device. The communications component 704 is configured to provide communications functionality including communications signaling and support for various communications protocols and interfaces. Training component 706 determines EMA/EMV models and values for key performance indicators also a sensitivity level, e.g., K as discussed in connection with FIG. 11.

The timegroup component 708 is configured determine a timegroup for a set of CDRs corresponding to a time interval.

The subscriber number determination component 710 is configured to extract potential subscriber numbers, e.g., called or calling party telephone number or portions thereof, from information contained or derived from a call detail record and make a determination as to whether the extracted potential subscriber numbers are known subscriber numbers of a customer using regular expression pattern matching against a customer subscriber number plan.

The field group ID, e.g., subscriber group ID, call destination group ID, determination component 712 is configured to determine a field group ID from information contained or derived from a call detail record, e.g., a call detail record field, using a hash function.

The mitigation operation component 714 is configured to provide mitigation operation and/or send instructions or commands to enforcement devices or sensor enforcement devices, e.g., call processing devices such as SBCs, to implement one or more mitigation operations such as those discussed in connection with step 1340.

Database storage component 716 is configured to access, retrieve, store and delete information, e.g., CDRs, mitigation operation policy rules, customer subscriber numbers, call handling rules, in databases.

The generator of key performance indicators component 718 is configured to generate key performance indicators based on analysis of call detail records, e.g., call detail records for one or more time intervals.

The CDR processing component 720 is configured to process CDRs, e.g., as described in connection with step 1312 of flowchart 1300.

The dynamic performance threshold generator component 722 is configured to generate dynamic performance threshold for example for a KPI.

The comparator component 724 is configured to provide comparison and determination function such as for example comparing calling and called calling party numbers to subscriber numbering plan information and/or subscriber numbers for matching purposes and performing comparison of key performance indicator values to a dynamic performance threshold.

The determinator component 726 is configured to determine when a key performance indicator violation has occurred.

The groupID violation tracking component 728 is configured to determine when a group ID is being tracked for traffic anomaly identified violations.

The notifier component 730 is configured to provide notifications of the status of traffic anomalies, e.g., notifications of incident violations and/or status and effect of anomaly mitigation operations which have been undertaken.

The EMA/EMV model key performance indicator generator 732 generates an EMA/EMV model for a key performance indicator.

LIST OF NUMBERED EXEMPLARY METHOD EMBODIMENTS

Method Embodiment 1

A method of processing calls to a customer, the method comprising: processing a first set of call detail records of a customer, each call detail record in said first set of call detail records corresponding to an individual call and including multiple information fields providing information about the individual call to which the call detail record corresponds, said processing including: (i) generating from some of said call detail records, on a per call detail record basis, one or more Field Group IDs using a hash function; (ii) generating for call detail records corresponding to a first Field Group ID a first set of key performance indicators, said first set of key performance indicators including one or more key performance indicators corresponding to the first Field Group ID, said one or more key performance indicators including at least a first key performance indicator; and (iii) determining that a first key performance indicator violation has occurred for the first Field Group ID when the first key performance indicator exceeds a first dynamic performance threshold. Generating from some of said call detail records of the first set of call detail records may, and in some instances does, include all of said call detail records of the first set of call detail records.

Method Embodiment 2

The method of method embodiment 1 wherein generating from some of said call detail records of the first set of call detail records, on a per call detail record basis one or more Field Group IDs using a hash function includes generating the first Field Group ID by setting the first Field Group ID to the output of the operation:

$$ABS(FNV\_HASH(X))\% N$$

where:
ABS is an absolute value function;
FNV_HASH is a Fowler-Noll-Vo hash function;
X is information from a first field of the call detail record (e.g., an incoming calling party telephone number);
% is a modulo function operator; and
N is a positive integer value used to limit the range of the first Field Group ID.

Method Embodiment 3

The method of method embodiment 1, further comprising determining that a first key performance indicator violation has not occurred for the first Field Group ID when the first key performance indicator does not exceed a first dynamic performance threshold.

Method Embodiment 4

The method of claim 1, further comprising: in response to determining that a first key performance indicator violation has occurred for the first Field Group ID, determining if the first Field Group ID is being tracked.

Method Embodiment 5

The method of method embodiment 4, further comprising: if the First Group ID is not being tracked, initiate tracking of violations for the first Field Group ID; and if the First Group ID is being tracked update violation information.

Method Embodiment 6

The method of method embodiment 5, wherein updating violation information includes modifying a severity incident level; and checking if the modified severity incident level exceeds an action threshold; and performing a violation mitigation operation when the modified severity level exceeds said action threshold.

Method Embodiment 7

The method of method embodiment 6, wherein performing a violation mitigation operation includes at least one of: i) notifying a system operator or analyst of the detected first key performance indicator violation; ii) completing future incoming calls corresponding to the first Field Group ID to a device corresponding to a called party number included in the incoming call with an indication that the incoming call corresponds to suspicious activity; iii) redirecting future incoming calls corresponding to the first Field Group ID to a validation service; iv) assigning future incoming calls corresponding to the first Field Group ID to a lower incoming call priority than an incoming call that doesn't correspond to first Group ID when placing the incoming call in a call handling queue; v) delivering future incoming calls corresponding to the first Group ID to voice mail or vi) dropping or blocking future incoming calls corresponding to the first Group ID.

Method Embodiment 8

The method of method embodiment 1, wherein the first dynamic performance threshold is a threshold which was generated from analysis of previous call detail records of said customer.

Method Embodiment 9

The method of method embodiment 1, further comprising: updating the first dynamic performance threshold based on the first key performance indicator.

Method Embodiment 10

The method of method embodiment 1, further comprising, as part of processing the first set of call detail records, excluding one or more individual call detail records that include both calling and called party telephone numbers which are not assigned to the customer.

Method Embodiment 11

The method of method embodiment 1, further comprising: generating the first dynamic performance threshold, said generating the first dynamic performance threshold includes determining an exponentially weighted moving average (EMA) for the first key performance indicator corresponding to the first Field Group ID from said previous call detail records of said customer.

Method Embodiment 12

The method of method embodiment 11, wherein generating the first dynamic performance threshold further includes generating an exponentially weighted moving variance (EMV) for the first key performance indicator corresponding to the first Field Group ID from said previous call detail records of said customer.

Method Embodiment 13

The method of method embodiment 12, wherein generating the first dynamic performance threshold further includes generating a margin value which is a number based on or proportional to a selected number of standard deviations, the selected number of standard deviations being a sensitivity parameter, K, which defines a threshold number of standard deviations. In some embodiments, the sensitivity parameter is a positive scalar. In some embodiments, the margin value is based on the EMV for the first key performance indicator and the sensitivity parameter K.

Method Embodiment 14

The method of method embodiment 13, wherein generating the first dynamic performance threshold includes performing the computation: EMA+K√EMV, where K is a constant positive integer.

Method Embodiment 15

The method of method embodiment 14 wherein 1≤K≤10.

Method Embodiment 16

The method of method embodiment 1, wherein said customer is an enterprise customer; and wherein said step of processing call detail records of said customer is performed on a periodic basis for calls to or from said enterprise customer.

Method Embodiment 17

The method of method embodiment 1 wherein the first Field Group ID is a first Subscriber Group Id.

Method Embodiment 18

The method of method embodiment 17 wherein said first set of key performance indicators for said first Subscriber Group Id includes one or more of the following: (i) number of calls corresponding to the first Subscriber Group Id that were made in a given interval, (ii) number of completed or connected calls corresponding to the first Subscriber Group Id made in a given interval, (iii) minutes of usage from connected calls corresponding to the first Subscriber Group Id made in a given interval, (iv) number of calls corresponding to the first Subscriber Group Id received in a given interval, (v) number of completed or connected calls corresponding to the first Subscriber Group Id received in a given interval, (vi) minutes of usage from connected calls corresponding to the first Subscriber Group Id received in a given interval, (vii) number of calls corresponding to the first Subscriber Group Id made or received in a given interval, (viii) number of completed or connected calls made or received in a given interval corresponding to the first Subscriber Group Id, and (ix) minutes of usage from connected calls made or received in a given interval corresponding to the first Subscriber Group Id.

Method Embodiment 19

The method of method embodiment 1 wherein the first set of call detail records of said customer correspond to a first time interval.

Method Embodiment 20

The method of method embodiment 19 wherein the first time interval is configurable or dynamically adjustable.

Method Embodiment 21

The method of method embodiment 19 wherein the first time interval is 15 minutes.

Method Embodiment 22

The method of claim 19 further comprising: determining a timegroup corresponding to said first time interval based on one or more of the following: a starting time of the time interval, an ending time of the time interval, a day of the week of the time interval, and a holiday schedule.

Method Embodiment 23

The method of method embodiment 22, wherein said first set of key performance indicators generated from said first set of call detail records for said first Field Group ID are for said determined timegroup; and wherein said first dynamic performance threshold is for said determined timegroup.

Method Embodiment 24

The method of method embodiment 8, wherein the first set of call detail records corresponds to a first time interval of said customer, said first time interval being 15 minutes; and wherein the previous call detail records of said customer correspond to at least one month of call detail records of said customer.

Method Embodiment 25

The method of method embodiment 9 further comprising: processing a second set of call detail records of a customer, each call detail record in said second set of call detail records corresponding to an individual call and including multiple information fields providing information about the individual call to which the call detail record corresponds, said processing including: generating from some of said second set of call detail records, on a per call detail record basis, one or more Field Group IDs using said hash function; generating for call detail records of the second set of call detail records corresponding to the first Field Group ID the first set of key performance indicators, said first set of key performance indicators including one or more key performance indicators corresponding to the first Field Group ID, said one or more key performance indicators including at least the first key performance indicator; determining that a first key performance indicator violation has occurred for the first Field Group ID when the first key performance indicator exceeds said updated first dynamic performance threshold. Generating from some of said second set of call detail records may, and in some instances does, including generating from all of said second set of call detail records.

Method Embodiment 26

The method of method embodiment 25, wherein the second set of call detail records corresponds to a second time interval of said customer, said first time interval being 15 minutes.

Method Embodiment 27

The method of method embodiment 1 wherein said one or more key performance indicators further includes a second key performance indicator and a third key performance indicator; determining that a second key performance indicator violation has occurred for the first Field Group ID when the second key performance indicator exceeds a second dynamic performance threshold; and determining that a third key performance indicator violation has occurred for the second Field Group ID when the third key performance indicator exceeds a third dynamic performance threshold.

Method Embodiment 28

The method of method embodiment 25, wherein the second dynamic performance threshold is a threshold which was generated from analysis of said previous call detail records of said customer; and wherein the third dynamic performance threshold is a threshold which was generated from analysis of said previous call detail records of said customer.

Method Embodiment 29

The method of method embodiment 27, further comprising: determining that a second key performance indicator violation has not occurred for the first Field Group ID when the second key performance indicator does not exceed a second dynamic performance threshold.

Method Embodiment 30

The method of method embodiment 27, further comprising: in response to determining that the second key performance indicator violation has occurred for the first Field Group ID, determining if the first Field Group ID is being tracked.

Method Embodiment 31

The method of method embodiment 30, further comprising: if the First Group ID is not being tracked, initiate tracking of violations for the first Field Group ID; and if the First Group ID is being tracked update violation information.

Method Embodiment 32

The method of method embodiment 31, wherein updating violation information includes modifying a severity incident level; and checking if the modified severity incident level exceeds an action threshold; and performing a violation mitigation operation when the modified severity level exceeds said action threshold.

Method Embodiment 33

The method of embodiment 32, wherein performing a violation mitigation operation includes at least one of: i) notifying a system operator or analyst of the detected second key performance indicator violation; ii) completing future incoming calls corresponding to the first Field Group ID to a device corresponding to a called party number included in the incoming call with an indication that the incoming call corresponds to suspicious activity; iii) redirecting future incoming calls corresponding to the first Field Group ID to a validation service; iv) assigning future incoming calls corresponding to the first Field Group ID to a lower incoming call priority than an incoming call that doesn't correspond to first Group ID when placing the incoming call in a call handling queue; v) delivering future incoming calls corresponding to the first Group ID to voice mail or vi) dropping or blocking future incoming calls corresponding to the first Group ID.

Method Embodiment 34

The method of method embodiment 27, wherein the second dynamic performance threshold is a threshold which was generated from analysis of previous call detail records of said customer.

Method Embodiment 35

The method of method embodiment 27, further comprising: updating the second dynamic performance threshold based on the second key performance indicator.

Method Embodiment 36

The method of method embodiment 27, further comprising, as part of processing the second set of call detail records, excluding one or more individual call detail records that include both calling and called party telephone numbers which are not assigned to the customer.

Method Embodiment 37

The method of method embodiment 27, further comprising: generating the second dynamic performance threshold, said generating the second dynamic performance threshold includes determining an exponentially weighted moving average (EMA) for the second key performance indicator corresponding to the first Field Group ID from said previous call detail records of said customer.

Method Embodiment 38

The method of method embodiment 37, wherein generating the second dynamic performance threshold further includes generating an exponentially weighted moving variance (EMV) for the second key performance indicator corresponding to the first Field Group ID from said previous call detail records of said customer.

Method Embodiment 39

The method of method embodiment 38, wherein generating the second dynamic performance threshold further includes selecting a sensitivity parameter which defines a threshold number of standard deviations; and generating a margin value based on or proportional to the EMV for the second key performance indicator and the selected sensitivity parameter. The sensitivity parameter may be a positive scalar number.

Method Embodiment 40

The method of method embodiment 39, wherein generating the second dynamic performance metric includes performing the computation: $EMA+K\sqrt{EMV}$, where K is a constant positive integer.

Method Embodiment 41

The method of method embodiment 1, wherein said first set of key performance indicators includes a second key performance indicator, said method further comprising: determining that a second key performance indicator violation has occurred for the first Field Group ID when the second key performance indicator exceeds a second dynamic performance threshold.

Method Embodiment 42

The method of method embodiment 41 further comprising: determining an aggregate key performance indicator based on said first and second key performance indicators; determining that an aggregate key performance indicator violation has occurred for the first Field Group ID when the aggregate key performance indicator exceeds an aggregate dynamic performance threshold.

Method Embodiment 43

The method of method embodiment 1, further comprising, as part of processing the first set of call detail records, excluding one or more individual call detail records that include calling party telephone numbers which are not assigned to the customer.

Method Embodiment 44

The method of method embodiment 1, further comprising, as part of processing the first set of call detail records, excluding one or more individual call detail records that include called party telephone numbers which are not assigned to the customer.

Method Embodiment 43

The method of method embodiment 36, further comprising, as part of processing the second set of call detail records, excluding one or more individual call detail records that include calling party telephone numbers which are not assigned to the customer.

Method Embodiment 44

The method of method embodiments 36, further comprising, as part of processing the second set of call detail records, excluding one or more individual call detail records that include called party telephone numbers which are not assigned to the customer.

LIST OF NUMBERED EXEMPLARY SYSTEM EMBODIMENTS

System Embodiment 1

A system of processing calls to a customer, the system comprising: a traffic monitoring node including: memory; and a processor that controls the traffic monitoring node to process a first set of call detail records of a customer, each call detail record in said first set of call detail records corresponding to an individual call and including multiple information fields providing information about the individual call to which the call detail record corresponds, said processing a first set of call detail records including: (i) generating from some of said call detail records of the first set of call detail records, on a per call detail record basis, one or more Field Group IDs using a hash function; (ii) generating for call detail records corresponding to a first Field Group ID a first set of key performance indicators, said first set of key performance indicators including one or more key performance indicators corresponding to the first Field Group ID, said one or more key performance indicators including at least a first key performance indicator; and (iii) determining that a first key performance indicator violation has occurred for the first Field Group ID when the first key performance indicator exceeds a first dynamic performance threshold. Generating from some of said call detail of the first set of call detail records may, and in some instances does, include all of said call detail records in the first set of call detail records.

System Embodiment 2

The system of system embodiment 1 wherein generating from some of said call detail records of said first set of call detail records, on a per call detail record basis one or more Field Group IDs using a hash function includes generating the first Field Group ID by setting the first Field Group ID to the output of the operation:

$$ABS(FNV\_HASH(X))\% N$$

where:
ABS is an absolute value function;
FNV_HASH is a Fowler-Noll-Vo hash function;
X is information from a first field of the call detail record (e.g., an incoming calling party telephone number);
% is a modulo function operator; and
N is a positive integer value used to limit the range of the first Field Group ID.

System Embodiment 3

The system of system embodiment 1, wherein said processing further includes: determining that a first key performance indicator violation has not occurred for the first Field Group ID when the first key performance indicator does not exceed a first dynamic performance threshold.

System Embodiment 4

The system of system embodiment 1, wherein said processing further includes: in response to determining that a first key performance indicator violation has occurred for the first Field Group ID, determining if the first Field Group ID is being tracked.

System Embodiment 5

The system of system embodiment 4, wherein said processing further includes: if the First Group ID is not being tracked, initiate tracking of violations for the first Field Group ID; and if the First Group ID is being tracked update violation information.

System Embodiment 6

The system of system embodiment 5, wherein updating violation information includes modifying a severity incident level; and checking if the modified severity incident level exceeds an action threshold; and said system further including an enforcement node, said enforcement node including a second processor, said second processor configured to control the enforcement node to perform a violation mitigation operation when the modified severity level exceeds said action threshold.

System Embodiment 7

The system of system embodiment 6, wherein performing a violation mitigation operation includes at least one of: i) notifying a system operator or analyst of the detected first key performance indicator violation; ii) completing future incoming calls corresponding to the first Field Group ID to a device corresponding to a called party number included in the incoming call with an indication that the incoming call corresponds to suspicious activity; iii) redirecting future incoming calls corresponding to the first Field Group ID to a validation service; iv) assigning future incoming calls corresponding to the first Field Group ID to a lower incoming call priority than an incoming call that doesn't correspond to first Group ID when placing the incoming call in a call handling queue; v) delivering future incoming calls corresponding to the first Group ID to voice mail or vi) dropping or blocking future incoming calls corresponding to the first Group ID.

System Embodiment 8

The system of system embodiment 1, wherein the first dynamic performance threshold is a threshold which was generated from analysis of previous call detail records of said customer.

System Embodiment 9

The system of system embodiment 1, wherein said processing further includes: updating the first dynamic performance threshold based on the first key performance indicator.

System Embodiment 10

The system of system embodiment 1, wherein as part of processing the first set of call detail records, said processor controls said traffic monitoring node to exclude one or more individual call detail records that include both calling and called party telephone numbers which are not assigned to the customer.

System Embodiment 11

The system of system embodiment 1, wherein said processing further includes generating the first dynamic performance threshold, said generating the first dynamic performance threshold includes determining an exponentially weighted moving average (EMA) for the first key performance indicator corresponding to the first Field Group ID from said previous call detail records of said customer.

System Embodiment 12

The system of system embodiment 11, wherein generating the first dynamic performance threshold further includes generating an exponentially weighted moving variance (EMV) for the first key performance indicator corresponding to the first Field Group ID from said previous call detail records of said customer.

System Embodiment 13

The system of system embodiment 12, wherein generating the first dynamic performance threshold further includes selecting a sensitivity parameter which defines a threshold number of standard deviations and generating a margin value based on the selected sensitivity parameter and the EMV for the first key performance indicator. The sensitivity parameter may be a positive scalar number.

System Embodiment 14

The system of system embodiment 13, wherein generating the first dynamic performance metric includes performing the computation: $EMA+K\sqrt{EMV}$, where K is a constant positive integer.

System Embodiment 15

The system of system embodiment 14 wherein $1 \leq K \leq 10$.

System Embodiment 16

The system of system embodiment 1, wherein said customer is an enterprise customer; and wherein said step of processing call detail records of said customer is performed on a periodic basis for calls to or from said enterprise customer.

System Embodiment 17

The system of system embodiment 1 wherein the first Field Group ID is a first Subscriber Group Id.

System Embodiment 18

The system of system embodiment 17 wherein said first set of key performance indicators for said first Subscriber Group Id include one or more of the following: (i) number of calls corresponding to the first Subscriber Group Id that were made in a given interval, (ii) number of completed or connected calls corresponding to the first Subscriber Group Id made in a given interval, (iii) minutes of usage from connected calls corresponding to the first Subscriber Group Id made in a given interval, (iv) number of calls corresponding to the first Subscriber Group Id received in a given interval, (v) number of completed or connected calls corresponding to the first Subscriber Group Id received in a given interval, (vi) minutes of usage from connected calls corresponding to the first Subscriber Group Id received in a given interval, (vii) number of calls corresponding to the first Subscriber Group Id made or received in a given interval, (viii) number of completed or connected calls made or received in a given interval corresponding to the first Subscriber Group Id, and (ix) minutes of usage from connected calls made or received in a given interval corresponding to the first Subscriber Group Id.

System Embodiment 19

The system of system embodiment 1 wherein the first set of call detail records of said customer correspond to a first time interval.

System Embodiment 20

The system of system embodiment 19 wherein the first time interval is configurable or dynamically adjustable.

System Embodiment 21

The system of system embodiment 19 wherein the first time interval is 15 minutes.

System Embodiment 22

The system of system embodiment 19 wherein said processing further comprises determining a timegroup corresponding to said first time interval based on one or more of the following: a starting time of the time interval, an ending time of the time interval, a day of the week of the time interval, and a holiday schedule.

System Embodiment 23

The system of system embodiment 22, wherein said first set of key performance indicators generated from said first set of call detail records for said first Field Group ID are for said determined timegroup; and wherein said first dynamic performance threshold is for said determined timegroup.

System Embodiment 24

The system of system embodiment 8, wherein the first set of call detail records corresponds to a first time interval of said customer, said first time interval being 15 minutes; and wherein the previous call detail records of said customer correspond to at least one month of call detail records of said customer.

System Embodiment 25

The system of system embodiment 9 further comprising: processing a second set of call detail records of a customer, each call detail record in said second set of call detail records corresponding to an individual call and including multiple information fields providing information about the individual call to which the call detail record corresponds, said processing including: generating from some of said second set of call detail records, on a per call detail record basis, one or more Field Group IDs using said hash function; generating for call detail records of the second set of call detail records corresponding to the first Field Group ID the first set of key performance indicators, said first set of key performance indicators including one or more key performance indicators corresponding to the first Field Group ID, said one or more key performance indicators including at least the first key performance indicator; determining that a first key performance indicator violation has occurred for the first Field Group ID when the first key performance indicator exceeds said updated first dynamic performance threshold. Generating from some of said second set of call detail records may, and in some instances does, include all of said call detail records of said second set of call detail records.

System Embodiment 26

The system of system embodiment 25, wherein the second set of call detail records corresponds to a second time interval of said customer, said first time interval being 15 minutes.

System Embodiment 27

The system of system embodiment 1, wherein said one or more key performance indicators further includes a second key performance indicator and a third key performance indicator; and wherein said processing further includes: determining that a second key performance indicator violation has occurred for the first Field Group ID when the second key performance indicator exceeds a second dynamic performance threshold; and determining that a third key performance indicator violation has occurred for the second Field Group ID when the third key performance indicator exceeds a third dynamic performance threshold.

System Embodiment 28

The system of system embodiment 25, wherein the second dynamic performance threshold is a threshold which was generated from analysis of said previous call detail records of said customer; and wherein the third dynamic performance threshold is a threshold which was generated from analysis of said previous call detail records of said customer.

System Embodiment 29

The system of system embodiment 27, wherein said processing further comprises determining that a second key performance indicator violation has not occurred for the first Field Group ID when the second key performance indicator does not exceed a second dynamic performance threshold.

System Embodiment 30

The system of system embodiment 27, wherein said processing further comprises: in response to determining that the second key performance indicator violation has occurred for the first Field Group ID, determining if the first Field Group ID is being tracked.

System Embodiment 31

The system of system embodiment 30, wherein said processing further comprises: if the First Group ID is not being tracked, initiate tracking of violations for the first Field Group ID; and if the First Group ID is being tracked update violation information.

System Embodiment 32

The system of system embodiment 31, wherein updating violation information includes modifying a severity incident level; and checking if the modified severity incident level exceeds an action threshold; and controlling an enforcement node to perform a violation mitigation operation when the modified severity level exceeds said action threshold.

System Embodiment 33

The system of system embodiment 32, wherein performing a violation mitigation operation includes at least one of: i) notifying a system operator or analyst of the detected second key performance indicator violation; ii) completing future incoming calls corresponding to the first Field Group ID to a device corresponding to a called party number included in the incoming call with an indication that the incoming call corresponds to suspicious activity; iii) redirecting future incoming calls to corresponding to the first Field Group ID to a validation service; iv) assigning future incoming calls corresponding to the first Field Group ID to a lower incoming call priority than an incoming call that doesn't correspond to first Group ID when placing the incoming call in a call handling queue; v) delivering future incoming calls corresponding to the first Group ID to voice mail or vi) dropping or blocking future incoming calls corresponding to the first Group ID.

System Embodiment 34

The system of system embodiment 27, wherein the second dynamic performance threshold is a threshold which was generated from analysis of previous call detail records of said customer.

System Embodiment 35

The system of system embodiment 27, wherein said processing further includes: updating the second dynamic performance threshold based on the second key performance indicator.

System Embodiment 36

The system of system embodiment 27, wherein said processor further controls the traffic monitoring node as part of processing the second set of call detail records to exclude one or more individual call detail records that include both calling and calling party telephone numbers which are not assigned to the customer.

System Embodiment 37

The system of system embodiment 27, wherein said processing further includes: generating the second dynamic performance threshold, said generating the second dynamic performance threshold includes determining an exponentially weighted moving average (EMA) for the second key performance indicator corresponding to the first Field Group ID from said previous call detail records of said customer.

System Embodiment 38

The system of system embodiment 37, wherein said processing further includes generating the second dynamic performance threshold further includes generating an exponentially weighted moving variance (EMV) for the second key performance indicator corresponding to the first Field Group ID from said previous call detail records of said customer.

System Embodiment 39

The system of system embodiment 38, wherein generating the second dynamic performance threshold further includes selecting a sensitivity parameter which defines a threshold number of standard deviations and generating a margin value based on or proportional to the EMV of the second key performance indicator and the selected sensitivity parameter. In some embodiments, the sensitivity parameter is a positive scalar number.

System Embodiment 40

The system of system embodiment 39, wherein generating the second dynamic performance metric includes performing the computation: $EMA + K\sqrt{EMV}$, where K is a constant positive integer.

System Embodiment 41

The system of system embodiment 1, wherein said first set of key performance indicators includes a second key performance indicator, said processing further includes: determining that a second key performance indicator violation has occurred for the first Field Group ID when the second key performance indicator exceeds a second dynamic performance threshold.

System Embodiment 42

The system of system embodiment 41 wherein said processing further includes: determining an aggregate key performance indicator based on said first and second key performance indicators; determining that an aggregate key performance indicator violation has occurred for the first Field Group ID when the aggregate key performance indicator exceeds an aggregate dynamic performance threshold.

System Embodiment 43

The system of system embodiment 1 wherein said traffic monitoring node is implemented as a virtual machine on a compute node in the cloud.

System Embodiment 44

The system of system embodiment 7, wherein said traffic monitoring node is implemented as a virtual machine on a first compute node in the cloud and said enforcement node is implemented as a virtual machine on a second compute node in the cloud.

System Embodiment 45

The system of system embodiment 44 wherein said session border controller generates said first set of call detail records from calls sent to and from said customer processed by said session border controller.

Method Embodiment 43

The system of system embodiment 1, further comprising, as part of processing the first set of call detail records, excluding one or more individual call detail records that include calling party telephone numbers which are not assigned to the customer.

Method Embodiment 44

The system of system embodiment 1, further comprising, as part of processing the first set of call detail records, excluding one or more individual call detail records that include called party telephone numbers which are not assigned to the customer.

Method Embodiment 45

The system of system embodiment 36, further comprising, as part of processing the second set of call detail records, excluding one or more individual call detail records that include calling party telephone numbers which are not assigned to the customer.

Method Embodiment 46

The system of system embodiment 36, further comprising, as part of processing the second set of call detail records, excluding one or more individual call detail records that include called party telephone numbers which are not assigned to the customer.

LIST OF NUMBERED EXEMPLARY
COMPUTER READABLE MEDIUM
EMBODIMENTS

Computer Readable Medium Embodiment 1

A non-transitory computer readable medium including a first set of computer executable instructions which when executed by a processor of a traffic monitoring node cause the traffic monitoring node to: process a first set of call detail records of a customer, each call detail record in said first set of call detail records corresponding to an individual call and including multiple information fields providing information about the individual call to which the call detail record corresponds, said processing including: (i) generating from some of said call detail records of the first set of call detail records, on a per call detail record basis, one or more Field Group IDs using a hash function; (ii) generating for call detail records corresponding to a first Field Group ID a first set of key performance indicators, said first set of key performance indicators including one or more key performance indicators corresponding to the first Field Group ID, said one or more key performance indicators including at least a first key performance indicator; and (iii) determining that a first key performance indicator violation has occurred for the first Field Group ID when the first key performance indicator exceeds a first dynamic performance threshold. Generating from some of said call detail records of the first set of call detail records may, and in some instances does, including generating from all of said call detail records of the first set of call detail records.

The techniques of various embodiments may be implemented using software, hardware and/or a combination of software and hardware. Various embodiments are directed to apparatus, e.g., sensors, call processing devices, gateways, session border, network nodes and/or network equipment devices. Various embodiments are also directed to methods, e.g., method of controlling and/or operating devices such as sensors, call processing devices, gateways, session border, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps or elements of the described methods.

In various embodiments each of the steps or elements of a method are implemented using one or more processors. In some embodiments, each of the steps or elements is implemented using hardware circuitry.

In various embodiments nodes and/or elements described herein are implemented using one or more components to perform the steps corresponding to one or more methods, for example, message reception, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., sensors, call processing devices, gateways, session border, network nodes and/or network equipment devices, including a processor configured to implement one, multiple or all of the steps of one or more methods of the invention.

In some embodiments, the processor or processors, e.g., CPUs, of one or more devices, e.g., computing nodes such as call processing devices, session border controllers are configured to perform the steps of the methods described as being performed by the computing nodes, e.g., sensors, call processing devices, gateways, session border controllers, network nodes and/or network equipment devices. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., computing node such as sensors, call processing devices, gateways, session border controllers, network nodes and/or network equipment devices with a processor which includes a component corresponding to each of the steps of the various described methods performed by the device in which the processor is included. In some but not all embodiments a device, e.g., computing node such as sensors, call processing devices, gateways, session border controller, network nodes and/or network equipment devices, includes a component corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a computing device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of processing calls to the customer, the method comprising:
   processing a first set of call detail records of the customer, each call detail record in said first set of call detail records corresponding to an individual call and including multiple information fields providing information about the individual call to which the call detail record corresponds, said processing including:
   generating from some of said call detail records of the first set of call detail records, on a per call detail record basis, one or more Field Group IDs using a hash function;
   generating for call detail records corresponding to a first Field Group ID a first set of key performance indicators, said first set of key performance indicators including one or more key performance indicators corresponding to the first Field Group ID, said one or more key performance indicators including at least a first key performance indicator; and
   determining that a first key performance indicator violation has occurred for the first Field Group ID when the first key performance indicator exceeds a first dynamic performance threshold.

2. The method of claim 1, further comprising:
   in response to determining that a first key performance indicator violation has occurred for the first Field Group ID, determining if the first Field Group ID is being tracked.

3. The method of claim 2, further comprising:
   if the First Field Group ID is not being tracked, initiating tracking of violations for the first Field Group ID; and
   if the First Field Group ID is being tracked updating violation information.

4. The method of claim 3,
   wherein updating violation information includes modifying a severity incident level; and
   checking if the modified severity incident level exceeds an action threshold; and
   performing a violation mitigation operation when the modified severity level exceeds said action threshold.

5. The method of claim 4, wherein performing a violation mitigation operation includes at least one of: i) notifying a system operator or analyst of the detected first key performance indicator violation; ii) completing future incoming calls corresponding to the first Field Group ID to a device corresponding to a called party number included in the incoming call with an indication that the incoming call corresponds to suspicious activity; iii) redirecting future incoming calls corresponding to the first Field Group ID to a validation service; iv) assigning future incoming calls corresponding to the first Field Group ID to a lower incoming call priority than an incoming call that doesn't correspond to the first Field Group ID when placing the incoming call in a call handling queue; v) delivering future incoming calls corresponding to the first Field Group ID to voice mail or vi) dropping or blocking future incoming calls corresponding to the first Field Group ID.

6. The method of claim 1, further comprising:
   updating the first dynamic performance threshold based on the first key performance indicator.

7. The method of claim 1, further comprising: generating the first dynamic performance threshold, said generating the first dynamic performance threshold including determining an exponentially weighted moving average (EMA) for the first key performance indicator corresponding to the first Field Group ID from said previous call detail records of said customer.

8. The method of claim 7, wherein generating the first dynamic performance threshold further includes generating an exponentially weighted moving variance (EMV) for the first key performance indicator corresponding to the first Field Group ID from said previous call detail records of said customer.

9. The method of claim 8, wherein generating the first dynamic performance threshold further includes selecting a sensitivity parameter which defines a threshold number of standard deviations and generating a margin value based on the EMV of the first key performance indicator and the selected sensitivity parameter.

10. The method of claim 1,
    wherein said customer is an enterprise customer; and
    wherein said step of processing call detail records of said customer is performed on a periodic basis for calls to or from said enterprise customer.

11. The method of claim 6 further comprising:
    processing a second set of call detail records of the customer, each call detail record in said second set of call detail records corresponding to an individual call and including multiple information fields providing information about the individual call to which the call detail record corresponds, said processing including:
    generating from some of said second set of call detail records, on a per call detail record basis, one or more Field Group IDs using said hash function;
    generating for call detail records of the second set of call detail records corresponding to the first Field Group ID a first set of key performance indicators for the second set of call detail records, said first set of key performance indicators for the second set of call detail records including one or more key performance indicators corresponding to the first Field Group ID, said one or more key performance indicators including at least the first key performance indicator;
    determining that a first key performance indicator violation has occurred for the first Field Group ID when the first key performance indicator for the second set of call detail records exceeds said updated first dynamic performance threshold.

12. The method of claim 1, wherein said first set of key performance indicators includes a second key performance indicator, said method further comprising:
determining that a second key performance indicator violation has occurred for the first Field Group ID when the second key performance indicator exceeds a second dynamic performance threshold.

13. The method of claim 12 further comprising:
determining an aggregate key performance indicator based on said first and second key performance indicators; and
determining that an aggregate key performance indicator violation has occurred for the first Field Group ID when the aggregate key performance indicator exceeds an aggregate dynamic performance threshold.

14. A system of processing calls to a customer, the system comprising:
a traffic monitoring node including:
memory; and
a processor that controls the traffic monitoring node to:
process a first set of call detail records of the customer, each call detail record in said first set of call detail records corresponding to an individual call and including multiple information fields providing information about the individual call to which the call detail record corresponds, said processing including:
generating from some of said call detail records of the first set of call detail records, on a per call detail record basis, one or more Field Group IDs using a hash function;
generating for call detail records corresponding to a first Field Group ID a first set of key performance indicators, said first set of key performance indicators including one or more key performance indicators corresponding to the first Field Group ID, said one or more key performance indicators including at least a first key performance indicator; and
determining that a first key performance indicator violation has occurred for the first Field Group ID when the first key performance indicator exceeds a first dynamic performance threshold.

15. The system of claim 14, wherein said processing further includes:
in response to determining that a first key performance indicator violation has occurred for the first Field Group ID, determining if the first Field Group ID is being tracked;
if the First Group ID is not being tracked, initiating tracking of violations for the first Field Group ID; and
if the First Group ID is being tracked updating violation information.

16. The system of claim 15,
wherein updating violation information includes modifying a severity incident level; and
checking if the modified severity incident level exceeds an action threshold; and
wherein said system further includes an enforcement node, said enforcement node including a second processor, said second processor configured to control the enforcement node to perform a violation mitigation operation when the modified severity level exceeds said action threshold.

17. The system of claim 14, wherein the first dynamic performance threshold is a threshold which was generated from analysis of previous call detail records of said customer.

18. The system of claim 14, wherein said processing further includes:
updating the first dynamic performance threshold based on the first key performance indicator.

19. The system of claim 14, wherein said processing further includes generating the first dynamic performance threshold, said generating the first dynamic performance threshold includes determining an exponentially weighted moving average (EMA) for the first key performance indicator corresponding to the first Field Group ID from said previous call detail records of said customer.

20. A non-transitory computer readable medium including a first set of computer executable instructions which when executed by a processor of a traffic monitoring node cause the traffic monitoring node to:
process a first set of call detail records of a customer, each call detail record in said first set of call detail records corresponding to an individual call and including multiple information fields providing information about the individual call to which the call detail record corresponds, said processing including:
generating from some of said call detail records of the first set of call detail records, on a per call detail record basis, one or more Field Group IDs using a hash function;
generating for call detail records corresponding to a first Field Group ID a first set of key performance indicators, said first set of key performance indicators including one or more key performance indicators corresponding to the first Field Group ID, said one or more key performance indicators including at least a first key performance indicator; and
determining that a first key performance indicator violation has occurred for the first Field Group ID when the first key performance indicator exceeds a first dynamic performance threshold.

* * * * *